(12) United States Patent
Kawasaki et al.

(10) Patent No.: US 10,667,318 B2
(45) Date of Patent: May 26, 2020

(54) TERMINAL DEVICE AND PCRF

(71) Applicant: SHARP KABUSHIKI KAISHA, Sakai, Osaka (JP)

(72) Inventors: Yudai Kawasaki, Sakai (JP); Masafumi Aramoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/576,569

(22) PCT Filed: May 25, 2016

(86) PCT No.: PCT/JP2016/065470
§ 371 (c)(1),
(2) Date: Feb. 5, 2018

(87) PCT Pub. No.: WO2016/190359
PCT Pub. Date: Dec. 1, 2016

(65) Prior Publication Data
US 2018/0167992 A1 Jun. 14, 2018

(30) Foreign Application Priority Data

May 25, 2015 (JP) ................. 2015-105448

(51) Int. Cl.
H04W 76/16 (2018.01)
H04W 48/18 (2009.01)
H04W 88/06 (2009.01)
H04W 76/10 (2018.01)
H04W 80/00 (2009.01)
H04L 29/08 (2006.01)
H04W 80/04 (2009.01)
H04W 72/04 (2009.01)
H04W 84/12 (2009.01)

(52) U.S. Cl.
CPC ....... H04W 76/16 (2018.02); H04L 29/08036 (2013.01); H04L 69/325 (2013.01); H04W 48/18 (2013.01); H04W 72/0493 (2013.01); H04W 76/10 (2018.02); H04W 80/00 (2013.01); H04W 80/04 (2013.01); H04W 84/12 (2013.01); H04W 88/06 (2013.01)

(58) Field of Classification Search
CPC .. H04L 29/08036; H04W 48/18; H04W 4/00; H04W 72/0493; H04W 76/10; H04W 76/16; H04W 80/04; H04W 84/12; H04W 88/06
See application file for complete search history.

(56) References Cited

PUBLICATIONS

3GPP TR 23.861 V13.0.0 (Jun. 2015), Technical Report, 3rd Generation Partnership Project; Technical Specification Group Services and System Aspects; Network based IP flow mobility (Release 13).

(Continued)

Primary Examiner — Kan Yuen
(74) Attorney, Agent, or Firm — Birch, Stewart, Kolasch & Birch, LLP

(57) ABSTRACT

Communication control for establishing a multi-access PDN connection is performed based on a response to a PDN connectivity establishment request from a terminal device. Communication control for transmitting and/or receiving user data using one or more default bearers for a multi-access PDN connection is performed. This provides a communication control method and the like along with a multi-access PDN connectivity establishment request from the terminal device.

9 Claims, 16 Drawing Sheets

(56) References Cited

PUBLICATIONS

Huawei, Hisilicon, China Telecom, "NBIFOM Indications in Call Flows," SA WG2 Meeting #108, S2-150818, Apr. 13-17, 2015, San Jose Cabo, Mexico.
ZTE, "Resolving Clause 7.4.2 in TR 23.861 for FFS items in Solution A," SA WG2 Meeting #94, S2-124418, New Orleans, USA, Nov. 12-16, 2012.
English translation of International Preliminary Report on Patentability issued in corresponding International Application No. PCT/JP2016/065470 dated Dec. 7, 2017.
SA WG2 Temporary Document, 3GPP SA WG2 Meeting #107, S2-150528 (revision of S2-150503), "IP Flow Mobility Using the IFMP Protocol", Jan. 26-30, 2015, Sorrento, Italy,
SA WG2 Temporary Document, SA WG2 Meeting #108, S2-150861, "Resolving the Default Access Negotiation and Determination", Apr. 13-17, 2015, San Jose Del Cabo, Mexico (revision of S2-15xxxx).
SA WG2 Temporary Document; SA WG2 Meeting #108, S2-151393, Removing Alternatives from S2a call flows; Apr. 13-17, 2015, San Jose Del Cabo, Mexico (revision of S2-151252, S2-150996).

FIG. 4A

| TWAG ID | NBIFOM capability |
|---|---|

FIG. 4B

| PGW ID 1 | NBIFOM capability |
|---|---|
| PGW ID 2 | NBIFOM capability |

FIG. 4C

| UE NBIFOM capability |
|---|
| NBIFOM allowed |

FIG. 4D

| PDN connection ID |
|---|
| Network allowed mode |
| Operation mode |
| User Plane Connection ID |
| TWAG MAC address |
| NBIFOM permission |

FIG. 4E

| TRANSFER PATH IDENTIFICATION INFORMATION |
|---|
| Routing rule |

| IMSI |
| MSISDN |
| IMEI / IMEISV |
| Access Restriction |
| UE NBIFOM capability |

| Context ID |
| PDN Address |
| PDN Type |
| Access Point Name (APN) |
| WLAN offload ability |
| PDN GW ID |
| NBIFOM permission |

FIG. 8A

| IMSI |
|---|
| EMM State |
| GUTI |
| ME Identity |
| UE NBIFOM capability |

FIG. 8B

| PDN connection id |
|---|
| APN in Use |
| IP Address |
| Default Bearer |
| WLAN offload ability |
| UE allowed mode |
| Operation mode |

FIG. 8C

| TRANSFER PATH IDENTIFICATION INFORMATION |
|---|
| routing rule |

FIG. 8D

| TWAG ID | NBIFOM capability |
|---|---|

FIG. 8E

| PGW ID 1 | NBIFOM capability |
|---|---|
| PGW ID 2 | NBIFOM capability |

FIG. 10A

| IMSI |
| --- |
| ME Identity |
| MSISDN |
| UE NBIFOM capability |

FIG. 10B

| IP Address |
| --- |
| PDN type |
| APN |
| Network allowed mode |
| Operation mode |

FIG. 10C

| TRANSFER PATH IDENTIFICATION INFORMATION |
| --- |
| routing rule |

FIG. 10D

| TWAG ID | NBIFOM capability |
| --- | --- |

FIG. 10E

| PGW ID 1 | NBIFOM capability |
| --- | --- |
| PGW ID 2 | NBIFOM capability |

FIG. 12A

| Subscriber ID |
| UE NBIFOM capability |

FIG. 12B

| APN |
| Operation mode |
| Network Policy |
| Charging rule |
| PCC rule |
| QoS rule |

FIG. 12C

| routing rule |

FIG. 12D

| TWAG ID | NBIFOM capability |

FIG. 12E

| PGW ID 1 | NBIFOM capability |
| PGW ID 2 | NBIFOM capability |

TERMINAL DEVICE AND PCRF

TECHNICAL FIELD

The present invention relates to a terminal device and a PCRF.

BACKGROUND ART

The 3rd Generation Partnership Project (3GPP), which undertakes activities for standardizing recent mobile communication systems, is in the process of creating specifications for the Evolved Packet System (EPS), for achieving an all-IP architecture, as described in NPL 1. The EPS is a mobile communication system through which mobile operators and the like provide mobile telephone services, and is structured including a core network called Evolved Packet Core (EPC), an access network based on the radio communication standard called Long Term Evolution (LTE), and the like.

Furthermore, in the process by the 3GPP of creating EPS specifications, the Network-based IP flow Mobility (NBI-FOM) is discussed (see NPL 1). The NBIFOM is a technical item that aims to allow one device to simultaneously utilize a 3GPP interface and a non-3GPP interface (for example, WLAN).

In the related art, one PDN connection accommodates a communication path, a bearer, or a transfer path through either a 3GPP access network (for example, LTE access network) or a non-3GPP access network (for example, a WLAN access network).

The NBIFOM maintains a state in which a single PDN connection simultaneously accommodates a bearer, a communication path, or a transfer path through a 3GPP access network, and a bearer, a communication path, or a transfer path through a non-3GPP access network. Such a single PDN connection is defined as a multi-access PDN connection.

It is also discussed for the NBIFOM to stipulate an operation mode indicating an anchor node with an initiating function of switching a communication path. Specifically, it has been discussed for the NBIFOM to classify an operation mode into a UE-initiated mode and a Network-initiated mode.

Terminal devices and devices included in a core network and an access network are capable of transmitting and/or receiving data on a communication path through an appropriate access network for every application by using an NBIFOM function.

Furthermore, an anchor node configured to initiate switching a flow of the multi-access PDN connection established by using the NBIFOM function is configured based on the operation mode.

CITATION LIST

Non Patent Literature

NPL 1: 3GPP TR 23.861 Technical Specification Group Services and System Aspects, Network based IP flow mobility (Release 13)

SUMMARY OF INVENTION

Technical Problem

In the NBIFOM, a detailed procedure for establishing a multi-access PDN connection is not stipulated.

More specifically, details of accept means from a network for accepting a request for establishing the multi-access PDN connection, in which a terminal device supports an NBIFOM function, are not clarified.

In light of the foregoing, an object of the present invention is to provide a suitable way of implementing a communication control procedure in response to a PDN connectivity establishment request from a terminal device and communication control using a multi-access PDN connection.

Solution to Problem

In view of above-described problems, in one embodiment of the present invention, a terminal device for establishing a Packet Data Network (PDN) connection over a WLAN, the terminal device including:

an LTE interface unit configured to:
transmit a PDN connectivity request message to a Mobility Management Entity (MME), in a case where an Evolved Universal Terrestrial Radio Access Network (E-UTRAN) is added to the PDN connection, and
receive an Activate default EPS bearer context request message from the MME; and
a control unit.

In a case that a Network-based IP flow mobility (NBIFOM) mode of the PDN connection is a UE-initiated NBIFOM mode, the PDN connectivity request message includes first information indicating a default access selected by the terminal device,
the Activate default EPS bearer context request message includes second information indicating a default access determined by a Policy and Charging Rule Function (PCRF) based on the first information, and
the control unit is configured to:
detect the default access indicated by the second information based on reception of the Activate default EPS bearer context request message, and
route a packet not matching any routing filter to the default access indicated by the second information.

A Policy and Charging Rule Function (PCRF), in another embodiment of the present invention, includes:
an IP mobile communication network interface unit configured to:
receive from a terminal device first information indicating a default access selected by the terminal device via a Packet Data Network (PDN) Gateway (PGW), in a case where a Network-based IP flow mobility (NBIFOM) mode of a PDN connection established by a terminal device over a WLAN is a UE-initiated NBIFOM mode and an Evolved Universal Terrestrial Radio Access Network (E-UTRAN) is to be added to the PDN connection; and
a control unit configured to determine the default access, based on the first information, and
the IP mobile communication network interface unit is configured to transmit second information indicating the default access determined by the control unit to the terminal device via the PGW.

Advantageous Effects of Invention

The present invention enables a communication control procedure accompanied with a multi-access PDN connectivity establishment request from a terminal device.

Specifically, according to the present invention, a multi-access PDN connection is established, and communication using the multi-access PDN connection is enabled.

BRIEF DESCRIPTION OF DRAWINGS

FIGS. 2A and 2B are diagrams illustrating a configuration of an IP mobile communication network, and the like.

FIGS. 4A to 4E are diagrams illustrating a configuration of a storage of the TWAG

FIGS. 8A to 8E are diagrams illustrating a configuration of a storage of the UE.

FIGS. 10A to 10E are diagrams illustrating a configuration of a storage of the PGW.

FIGS. 12A to 12E are diagrams illustrating a configuration of a storage of the PCRF.

DESCRIPTION OF EMBODIMENTS

1. First Embodiment

Figure 1:
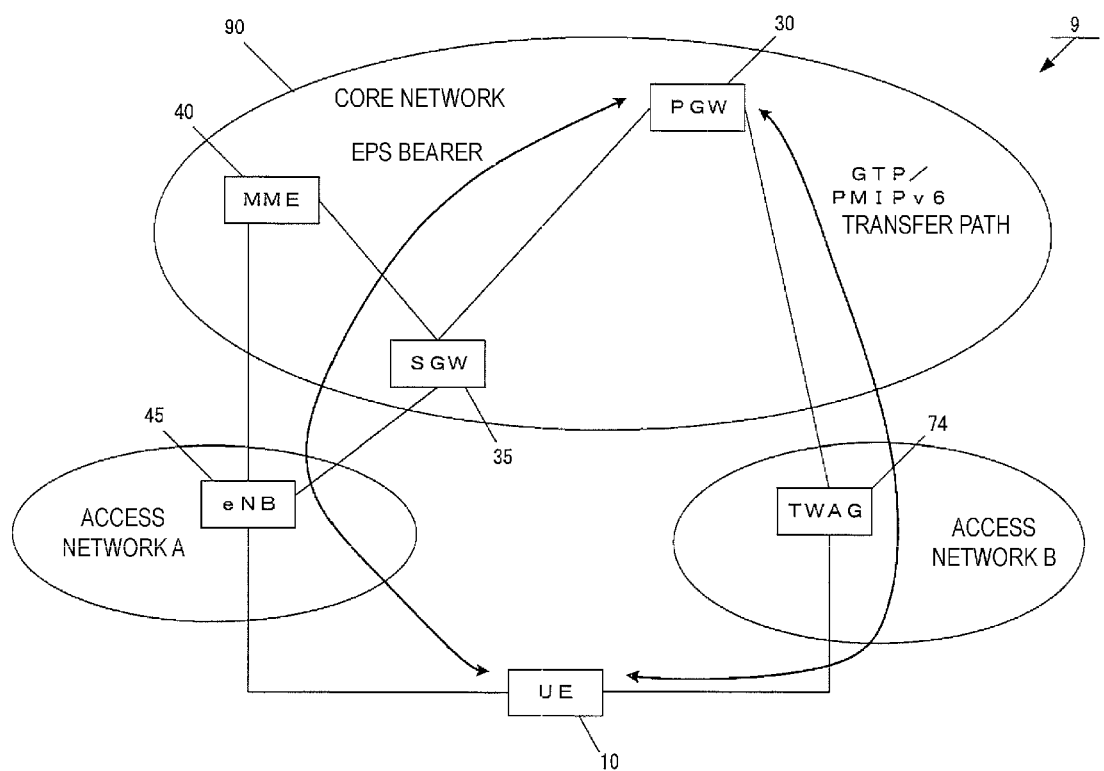
FIG. 1 is a diagram illustrating an overview of a mobile communication system.

Hereinafter, a radio communication technology according to an embodiment of the present invention will be described in detail with reference to the drawings.
1.1. System Overview FIG. 1 is a diagram illustrating an overview of a mobile communication system according to the present embodiment. As illustrated in FIG. 1, a mobile communication system 9 includes a mobile terminal device UE 10, an LTE base station eNB 45 included in an access network A, a Trusted WLAN access gateway (gateway TWAG) 74 included in an access network B, a Mobility Management Entity (MME) 40 included in a core network 90, a Serving Gateway (SGW) 35, and a PDN Gateway (PGW) 30.

Here, the UE 10 may be any mobile terminal device, and may be a User Equipment (UE), a Mobile Equipment (ME), or a Mobile Station (MS).

Furthermore, the access network A may be an LTE access network, and the eNB 45 included in the access network A may be an LTE radio base station. Note that the access network A may include multiple radio base stations. Note that the LTE access network may be an Evolved Universal Terrestrial Radio Access Network (EUTRAN). Alternatively, the access network A may be a Universal Terrestrial Radio Access Network (UTRAN) or a GSM EDGE Radio Access Network (GERAN).

Furthermore, the access network B may be a Wireless LAN (WLAN) access network. The TWAG 74 may be a gateway for connecting to the PGW 30 in the core network 90, and for connecting the core network 90 and the WLAN access network.

In the present embodiment, the UE 10 is capable of establishing a PDN connection using an EPS bearer through the access network A.

Furthermore, the UE 10 is capable of establishing a PDN connection by using a GTP/PMIPv6 transfer path between the PGW 30 and the UE 10. Note that the transfer path may be a bearer.

Here, the core network 90 denotes an IP mobile communication network run by a Mobile Operator.

For example, the core network 90 may be a core network 90 for the mobile operator that runs and manages the mobile communication system 9, or may be a core network 90 for a virtual mobile operator such as a mobile virtual network operator (MVNO).

The MME 40 is a control device configured to perform, through the access network A, location management and access control of the UE 10. Details of the MME 40 will be descried later.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) that provides a communication service to the UE 10.

In the present embodiment, the UE 10 is capable of establishing a first PDN connection and/or a second PDN connection.

Furthermore, in the present embodiment, an NBIFOM is a technology that allows an establishment of a multi-access PDN connection.

Furthermore, in the present embodiment, the multi-access PDN connection denotes a PDN connection capable of accommodating, in one PDN connection, a transfer path and/or a bearer over a 3GPP access and/or a WLAN access. In other words, the multi-access PDN connection is capable of accommodating both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection denotes a PDN connection capable of constituting one or multiple transfer paths.

In the present embodiment, to clearly distinguish from a PDN connection established based on an IP Flow Mobility (IFOM), a PDN connection in which a transfer path of a certain flow is selectable based on the NBIFOM is defined as "multi-access PDN connection".

Note that the IFOM is a technology for switching a communication path of a certain IP flow by using a Dual Stack Mobile IPv6 (DSMIPv6) protocol, and in the present embodiment, a PDN connection capable of switching, based on the IFOM, a communication path of a certain IP flow is described as a PDN connection for the IFOM.

Furthermore, the first PDN connection may be the above-described multi-access PDN connection.

In detail, the first PDN connection is a PDN connection in which, as one PDN connection, a communication path EPS bearer through the access network A and a communication path including a GTP/PMIPv6 tunnel through the access network B can be used. That is, such a PDN connection enables transmission and/or reception of data through the 3GPP access, the WLAN access, or both thereof. The first PDN connection may be the multi-access PDN connection.

Furthermore, the second PDN connection may be a known PDN connection, rather than the multi-access PDN connection. Note that the second PDN connection may be a single-access PDN connection.

Here, the single-access PDN connection refers to one PDN connection constituted of only a transfer path through either the 3GPP access or the WLAN access, unlike the multi-access PDN connection. In detail, the single-access PDN connection is a PDN connection established by the attach of the related art.

That is, the second PDN connection is a PDN connection including the EPS bearer through the access network A or a PDN connection including the GTP/PMIPv6 transfer path through the access network B. The second PDN connection accommodates a transfer path and/or a communication path through either one of the access networks.

As described above, the single-access PDN connection denotes a PDN connection that is different from the multi-access PDN connection and the PDN connection for the IFOM. Moreover, the single-access PDN connection denotes a PDN connection that is also different from a PDN connection for a Local IP Access (LIPA). Here, the LIPA denotes communication control for offloading the connection to a home network. More specifically, the base station to which the terminal device connects performs the offload by transmitting, to the home network to which the base station connects, user data that is conventionally delivered via the core network 90. The PDN connection for the LIPA is a PDN connection for performing such communication based on the LIPA.

Figure 2A:
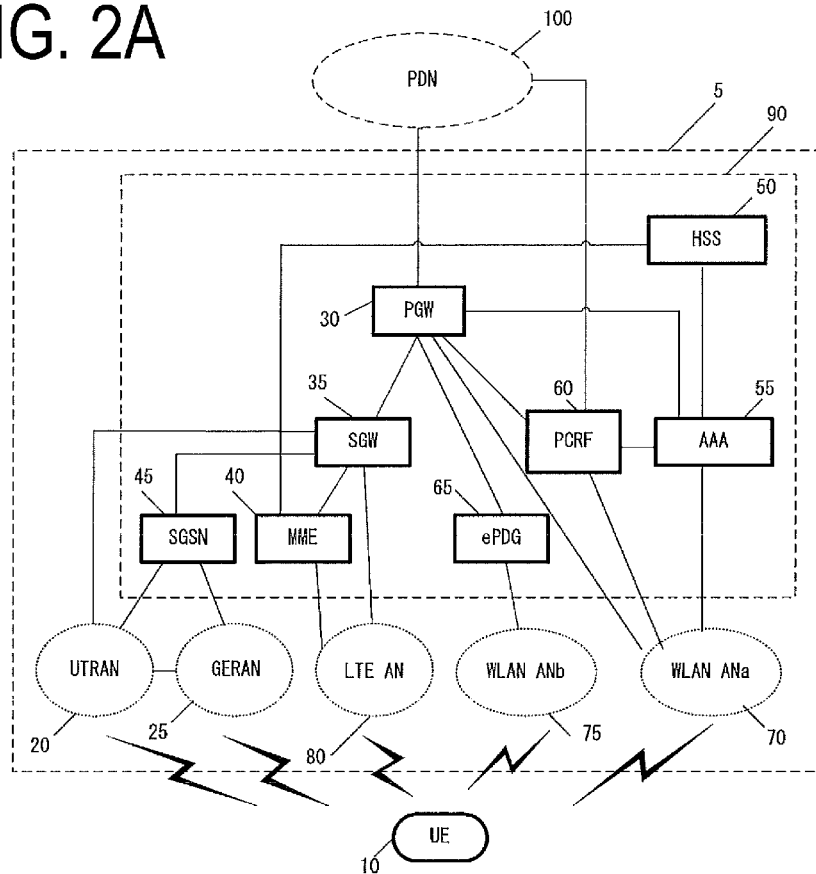

Next, an example of a configuration of the core network 90 will be described. FIG. 2A illustrates an example of a configuration of the IP mobile communication network. As illustrated in FIG. 2A, the core network 90 includes a Home Subscriber Server (HSS) 50, an Authentication, Authorization, Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 is capable of connecting to multiple radio access networks (an LTE AN 80, a WLAN ANb 75, a WLAN ANa 70, a UTRAN 20, and a GERAN 25).

Such a radio access network may be constituted of multiple different access networks, or may be constituted of either one of the access networks. Moreover, the UE 10 is capable of connecting wirelessly to the radio access network.

Moreover, a WLAN Access Network b (WLAN ANb 75) that connects to the core network 90 via an ePDG 65 and a WLAN Access Network a (WLAN ANa 75) that connects to the PGW 30, the PCRF 60, and the AAA 55 can be configured as access networks to be connectable in a WLAN access system.

Note that the devices have a similar configuration to those of the devices in the related art in a mobile communication system using EPS, and thus a detailed descriptions will be omitted. The devices will be described briefly, hereinafter.

The PGW 30 is connected to the PDN 100, the SGW 35, the ePDG 65, the WLAN ANa 70, the PCRF 60, and the AAA 55, and serves as a relay device configured to transfer user data by functioning as a gateway device between the PDN 100 and the core network 90.

The SGW 35 is connected to the PGW 30, the MME 40, the LTE AN 80, the SGSN 45, and the UTRAN 20, and serves as a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 50, and serves as an access control device configured to perform location information management and access control for the UE 10 via the LTE AN 80. Furthermore, the core network 90 may include multiple location management devices. For example, a location management device different from the MME 40 may be constituted. Like the MME 40, the location management device different from the MME 40 may be connected to the SGW 35, the LTE AN 80, and the HSS 50.

Furthermore, when multiple MMEs 40 are included in the core network 90, the MMEs 40 may be connected to each other. With this configuration, the context of the UE 10 may be transmitted and/or received among the MMEs 40.

The HSS 50 is connected to the MME 40 and the AAA 55, and serves as a managing node configured to manage subscriber information. The subscriber information of the HSS 50 is referenced, for example, in the access control for the MME 40. Moreover, the HSS 50 may be connected to the location management device different from the MME 40.

The AAA 55 is connected to the PGW 30, the HSS 50, the PCRF 60, and the WLAN ANa 70 and is configured to perform access control for the UE 10 connected via the WLAN ANa 70.

The PCRF 60 is connected to the PGW 30, the WLAN ANa 75, the AAA 55, and the PDN 100, and is configured to perform QoS management on data delivery. For example, the PCRF 60 manages QoS of a communication path between the UE 10 and the PDN 100.

The ePDG 65 is connected to the PGW 30 and the WLAN ANb 75, and is configured to deliver user data by functioning as a gateway device between the core network 90 and the WLAN ANb 75.

The SGSN 45 is connected to the UTRAN 20, the GERAN 25, and the SGW 35, and serves as a control device for location management between a 3G/2G access network (UTRAN/GERAN) and the LTE access network (E-UTRAN). In addition, the SGSN 45 has a function of selecting the PGW 30 and the SGW 35, a function of managing a time zone of the UE 10; and a function of selecting the MME 40 at the time of handover to the E-UTRAN.

Figure 2B:
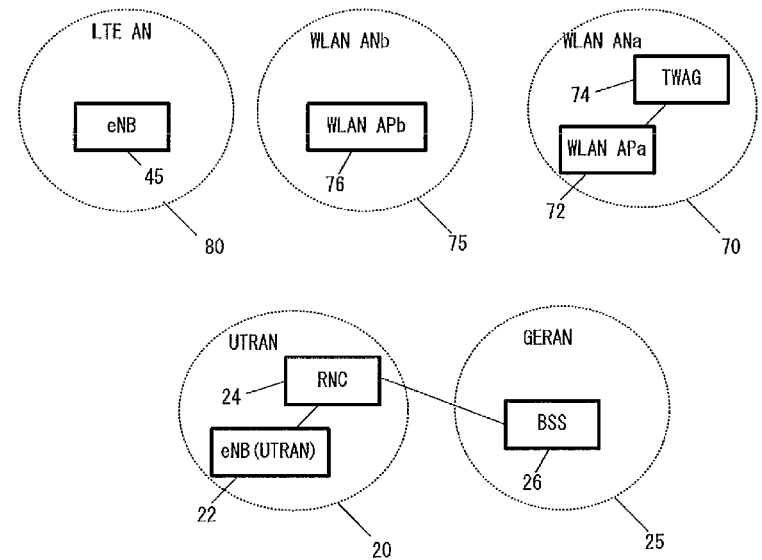

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, the LTE AN 80 may serve as the E-URAN including the eNB 45. The eNB 45 is a radio base station to which the UE 10 connects in an LTE access system, and the LTE AN 80 may include one or multiple radio base stations.

The WLAN ANa 70 includes a WLAN APa 72 and the TWAG 74. The WLAN APa 72 is a radio base station to which the UE 10 connects in the WLAN access system trusted by the operator running the core network 90, and the WLAN ANa 70 may include one or multiple radio base stations. The GW 74 is a gateway device between the core network 90 and the WLAN ANa 70. Furthermore, the WLAN APa 72 and the GW 74 may be constituted as a single device.

Even in a case where the operator running the core network 90 and the operator running the WLAN ANa 70 are different, such a constitution can be implemented through contracts and agreements between the operators.

Furthermore, the WLAN ANb 75 includes a WLAN APb 76. The WLAN APb 76 is a radio base station to which the UE 10 connects in the WLAN access system in a case that no trusting relationship is established with the operator running the core network 90, and the WLAN ANb 75 may include one or multiple radio base stations.

In this manner, the WLAN ANb 75 is connected to the core network 90 via the ePDG 65, which is a device included in the core network 90, serving as a gateway. The ePDG 65 has a security function for ensuring communication security.

The UTRAN 20 includes a radio network controller (RNC) 24 and an eNB (UTRAN) 22. The eNB (UTRAN) 22 is a radio base station to which the UE 10 connects through a UMTS Terrestrial Radio Access (UTRA), and the UTRAN 20 may include one or multiple radio base stations. Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22.

In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through GSM/EDGE radio access (GERA), and the GERAN 25 may be constituted of one or multiple radio base station BSSs. Furthermore, the multiple BSSs may be connected to each other. Moreover, the BSS 26 may be connected to the RNC 24.

Note that in the present specification, the UE 10 being connected to each radio access network refers to the UE 10 being connected to a base station device, an access point, or the like included in each radio access network, and data, signals, and the like being transmitted and/or received also traverse those base station devices, access points, or the like.

1.2. Device Configuration

Configurations of the devices will be described below.

1.2.1. TWAG Configuration

Figure 3:
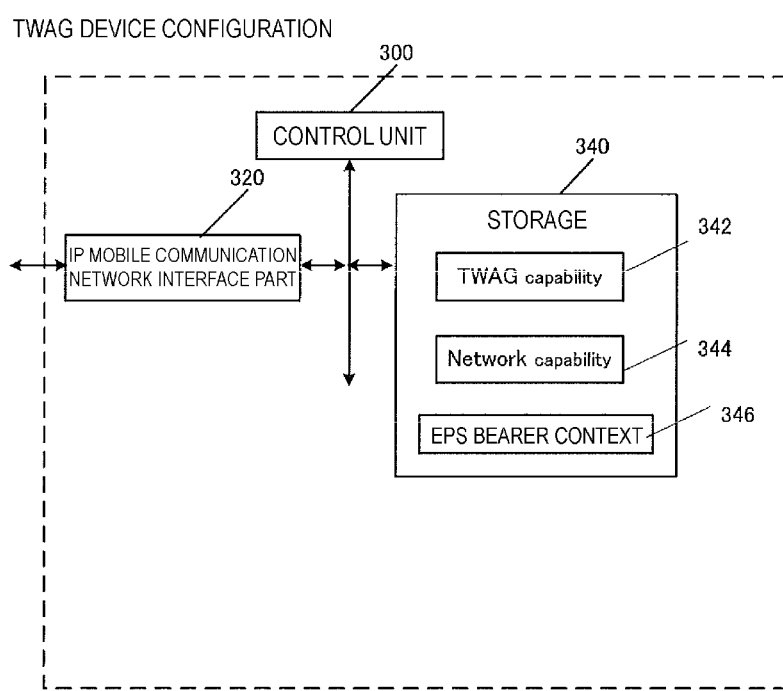
FIG. 3 is a diagram illustrating a functional configuration of a TWAG.

FIG. 3 illustrates a device configuration of the TWAG 74. As illustrated in FIG. 3, the TWAG 74 includes an IP mobile communication network interface unit 320, a control unit 300, and a storage 340. The IP mobile communication network interface unit 320 and the storage 340 are connected to the control unit 300 via a bus.

The control unit 300 serves as a function unit for controlling the TWAG 74. The control unit 300 implements various processes by reading out and executing various programs stored in the storage 340.

The IP mobile communication network interface unit 320 serves as a data transmission and/or reception unit configured to transmit and receive user data and/or a control message, and serves as a function unit through which the TWAG 74 is connected to the PGW 30.

The storage 340 serves as a function unit for storing programs, data, and the like necessary for each operation of the TWAG 74. The storage 340 includes, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4E illustrate the information elements stored in the storage 340. FIG. 4A illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, the NBIFOM capability may be stored in association with a TWAG ID that is the identification information on the TWAG 74. In a case of not being associated with the TWAG ID, the NBIFOM capability may mean a capability of the TWAG 74 to be stored.

If the TWAG ID and the NBIFOM capability are stored in association with each other, the TWAG 74 may store the TWAG capability of multiple TWAGs 74.

In this case, when the UE 10 performs a handover to another TWAG 74, the TWAG 74 may select a TWAG 74 to which the handover is made, based on the TWAG Capability.

Next, the Network capability 344 will be described. FIG. 4B illustrates an example of the Network capability stored in the TWAG 74. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may be information indicating the possession of the function of establishing the multi-access PDN connection.

Alternatively, the NBIFOM capability may be identification information indicating the possession of the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

As illustrated in FIG. 4B, the TWAG 74 stores an NBIFOM capability in association with a PGW ID. Furthermore, as illustrated in FIG. 4B, the NBIFOM capability may be stored in association with each of multiple PGWs 30.

The PGW ID may be any information for identifying the PGW 30, and may be an access point name (APN), for example.

Next, an EPS bearer context will be described. The EPS bearer context may be classified into the EPS bearer context for each UE 10 stored for each UE 10, the EPS bearer context for each PDN connection, and the EPS bearer context for each bearer and/or transfer path.

FIG. 4C illustrates information elements included in the EPS bearer context for each UE 10. As is obvious from FIG. 4C, the TWAG 74 stores, for each UE 10, a UE NBIFOM capability and an NBIFOM allowed.

The UE NBIFOM capability is the NBIFOM capability of the UE 10. The UE NBIFOM capability is identification information for each UE 10 indicating whether capability of establishing the first PDN connection is supported. In other words, the UE NBIFOM capability is identification information indicating whether the UE 10 supports the NBIFOM function. More specifically, for example, the UE NBIFOM capability may include "allowed" or "Not allowed".

Note that the NBIFOM function may be information indicating the possession of the function of establishing the multi-access PDN connection.

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN, which is allowed to establish a PDN connection using the NBIFOM. The NBIFOM may be associated with at least the APN. The NBIFOM allowed may be associated with multiple APNs.

In the present embodiment, an APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the known PDN connection, rather than the multi-access PDN connection.

In addition, in the present embodiment, an APN 2 is not associated with the NBIFOM allowed. That is, in the present embodiment, the APN 2 is not allowed to establish a multi-access PDN connection. That is, in the present embodiment, the UE 10 is not capable of establishing the multi-access PDN connection by using the APN 2.

The NBIFOM allowed may be stored before the PDN connection is established.

The TWAG 74 may access the HSS 50 to acquire the NBIFOM allowed before the PDN connection is established and/or during the establishment procedure.

Furthermore, the EPS bearer context for each UE 10 may include identification information on the UE 10. The identification information on the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be the UEinitiated mode.

Furthermore, an Operation mode that allows the network and/or the PGW 30 and/or the PCRF 60 to initiate the communication control may be a Network initiated mode.

The Network allowed mode indicates an Operation mode allowed by a network. The Network allowed mode may include the UEinitiated mode, the Network initiated mode, or both thereof.

The User plane connection ID is identification information for identifying a connection used for transmission of user data in a case where the UE 10 establishes a transfer path via the TWAG 74.

A TWAG MAC address is a physical address of the TWAG 74.

The NBIFOM permission is information indicating that this PDN connection has established the multi-access PDN connection. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

The TWAG 74 may access the HSS 50 to acquire the NBIFOM permission during the establishment of the PDN connection. Alternatively, the TWAG 74 may store the NBIFOM Permission, on the basis of the fact that the multi-access PDN connection has been established.

Next, the EPS bearer context for each bearer and/or transfer path will be described. As illustrated in FIG. 4E, the EPS bearer context for each bearer and/or transfer path may include transfer path identification information and a Routing Rule.

The transfer path identification information is information for identifying a transfer path and/or bearer. The transfer path identification information may be an EPS bearer ID, for example.

The Routing Rule indicates an association of a Routing Filter with a Routing address or Routing access type. Whether using a communication path through the 3GPP access network or using a communication path through the WLAN access network is determined, based on such an association.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the TWAG 74 stores beforehand as a default value.

An IP flow may be switched by including an IP header in a Routing Filter. Alternatively, the flow can be switched for each application by including an application ID in the Routing Filter. Alternatively, the Routing Filter may include a TFT.

The Routingu Rule may store multiple rules. Furthermore, the Routing rule may include priority for each rule.

The TWAG Capability and the Network capability may be included in the EPS bearer context.

1.2.2. HSS Configuration

Figures 5, 6A, 6B:
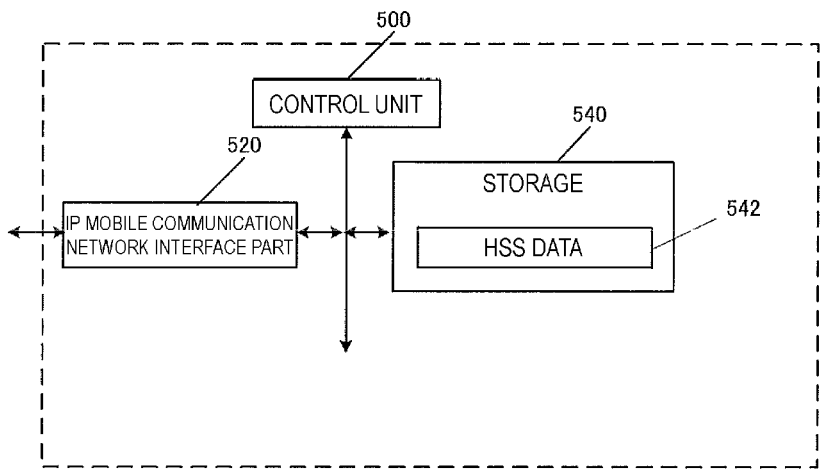
FIG. 5 is a diagram illustrating a functional configuration of an HSS.
FIGS. 6A and 6B are diagrams illustrating a configuration of a storage of the HSS.

Next, the configuration of the HSS 50 will be described. FIG. 5 illustrates a device configuration of the HSS 50. As illustrated in FIG. 5, the HSS 50 includes an IP mobile communication network interface unit 520, a control unit 500, and a storage 540. The IP mobile communication network interface unit 520 and the storage 540 are connected to the control unit 500 via a bus.

The control unit 500 serves as a function unit for controlling the HSS 50. The control unit 500 implements various processes by reading out and executing various programs stored in the storage 540.

The IP mobile communication network interface unit 520 serves as a data transmission and/or reception unit configured to transmit and/or receive user data and/or a control message, and also serves as a function unit for connecting the HSS 50 to the MME 40 and/or another MME 40, and the AAA 55.

The storage 540 serves as a function unit for storing programs, data, and the like necessary for each operation of the HSS 50. The storage 540 includes, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements to be stored in the storage 540. FIG. 6A illustrates an example of HSS data for each UE 10 to be stored in the HSS 50.

As illustrated in FIG. 6A, the HSS data for each UE 10 includes an IMSI, an MSISDN, an IMEI/IMEISV, an Access Restriction, a UE NBIFOM capability, and an NBIFOM allowed.

The IMSI is identification information to be assigned to a user (subscriber) using the UE 10.

The MSISDN represents the phone number of the UE 10.

The IMEI/IMISV is identification information assigned to the UE 10.

The Access Restriction indicates registration information for an access restriction.

The UE NBIFOM capability indicates the NBIFOM capability of the UE 10. The UE NBIFOM capability is identification information for each UE 10 indicating whether capability of establishing the first PDN connection is supported. In other words, the UE NBIFOM capability indicates whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the known PDN connection, rather than the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established.

FIG. 6B illustrates an example of HSS data for each PDN connection stored in the HSS 50. As seen from FIG. 6B, the HSS data for each PDN connection includes at least a Context ID, a PDN address, a PDN Type, an Access Point Name (APN), a WLAN offload ability, a PDN GW ID, and an NBIFOM Permission.

The Context ID is identification information of the context storing the HSS data for each PDN connection.

The PDN Address represents a registered IP address. The PDN Address is an IP address of the UE 10.

The PDN Type indicates the type of PDN Address. That is, the PDN Type is identification information for identifying IPv4, IPv6, or IPv4v6, for example.

The APN is a label indicating an access destination in the network, in accordance with the DNS naming convention.

The WLAN offload ability is identification information indicating whether traffic connected through this APN can perform offload to the WLAN by utilizing a cooperative function between the WLAN and the 3GPP, or maintains the 3GPP connection. The WLAN offload ability may vary for each RAT type. Specifically, the LTE (E-UTRA) and the 3G (UTRA) may have different WLAN offload ability.

The PDN GW identity is identification information for identifying the PGW 30 utilized in this APN. This identification information may be a Fully Qualified Domain Name (FQDN) or an IP address.

The NBIFOM permission is information indicating that this PDN connection has established the multi-access PDN connection. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

Specifically, for example, the HSS data for each PDN connection including the APN 1 may include the NBIFOM permission, and the HSS data for each PDN connection including the APN 2 need not include the NBIFOM permission.

In other words, the PDN connection based on the APN 1 may be the first PDN connection, and the PDN connection based on the APN 2 cannot be the first PDN connection.

1.2.3. UE Configuration

Figure 7:
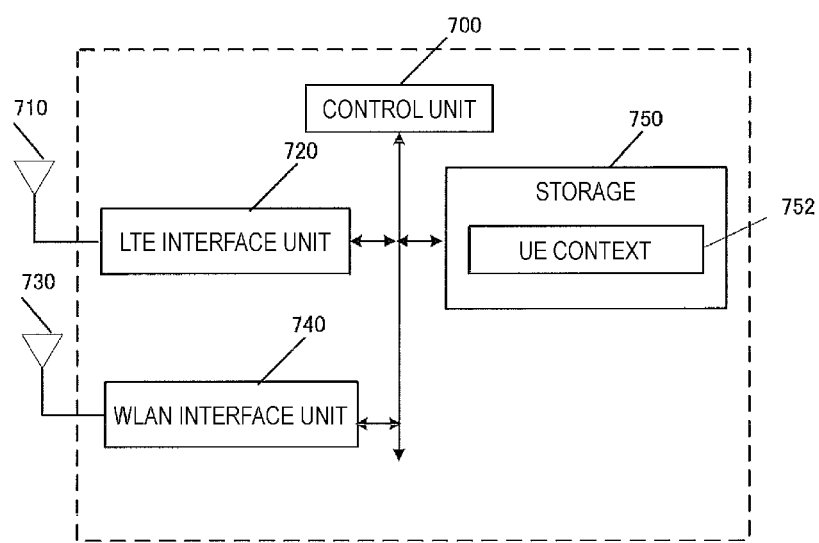
FIG. 7 is a diagram illustrating a functional configuration of a UE.

Next, the configuration of a UE 10 will be described. FIG. 7 illustrates a device configuration of the UE 10. As illustrated in FIG. 7, the UE 10 includes an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 serves as a function unit for controlling the UE 10. The control unit 700 implements various processes by reading out and executing various programs stored in the storage 750.

The LTE interface unit 720 serves as a data transmission and/or reception unit configured to transmit and/or receive user data and/or a control message, and also serves as a function unit through which the UE 10 connects to an IP access network via an LTE base station. Furthermore, an external antenna 710 is connected to the LTE interface unit 720.

The WLAN interface unit 740 serves as a data transmission and/or reception unit configured to transmit and/or receive user data and/or a control message, and also serves as a function unit through which the UE 10 connects to a WLAN AP and connects to the IP access network. Furthermore, an external antenna 730 is connected to the WLAN interface unit 740.

The control unit 700 serves as a function unit for controlling the UE 10. The control unit 700 implements various processes by reading out and executing various programs stored in the storage 750.

The storage 740 is a function unit for storing programs, data, and the like necessary for each operation of the UE 10. The storage 740 is constituted of, for example, a semiconductor memory, a hard disk drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability.

The IMSI is identification information to be assigned to a user (subscriber) using the UE 10.

The EMM State indicates a mobility management state of the UE 10. For example, the EMM State may be EMM-REGISTERED in which the UE 10 is registered with the network (registered state) or EMM-REREGISTERED in which the UE 10 is not registered with the network (reregistered state).

The GUTI is an abbreviation of "Globally Unique Temporary Identity," and is temporary identification information of the UE 10. The GUTI is configured with identification information of the MME 40 (Globally Unique MME Identifier (GUMMEI)) and identification information of the UE 10 in a specific MME 40 (M-TMSI).

The ME identity is an ID of an ME, and may be the IMEI/IMISV, for example.

The UE NBIFOM capability is the NBIFOM capability of the UE 10. The UE NBIFOM capability is identification information for each UE 10 indicating whether capability of establishing the first PDN connection is supported. In other words, the UE NBIFOM capability is identification information for each UE 10 indicating whether the NBIFOM function is supported. More specifically, for example, the NBIFOM capability may include "allowed" or "Not allowed".

Note that the NBIFOM function may be information indicating the possession of the function of establishing the multi-access PDN connection.

Alternatively, the UE NBIFOM capability may be identification information indicating that the UE 10 has capability of establishing the first PDN connection. That is, the existence of the UE NBIFOM capability in the storage of the UE 10 may mean that the UE 10 has the function of establishing the first PDN connection.

In other words, the UE NBIFOM capability may be identification information indicating that the UE 10 supports the NBIFOM function. That is, the existence of the UE NBIFOM capability in the storage of the UE 10 may mean that the UE 10 supports the NBIFOM function.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UEallowed mode, and an Operation mode.

The PDN connection ID is identification information for identifying a PDN connection. The UE 10, the TWAG 74, and the PGW 30 may store the same identification information.

The APN in Use is an APN that has been used by the UE 10 most recently. This APN may be constituted of identification information on the network and identification information on a default operator.

The IP Address is an IP address assigned to the UE 10 through the PDN connection, and may be an IPv4 address or an IPv6 prefix.

The Default Bearer is EPS bearer identification information for identifying a default bearer in this PDN connection.

Note that the UE 10 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the UE 10 may manage a default bearer and an access network in association with each other.

Specifically, the UE 10 may store the EPS bearer identification information identifying each of the default bearer for the access network A and the default bearer for the access network B. Here, the default bearer for an access network may be a default bearer for an access system of the access network. Therefore, the UE 10 may store a default bearer for a 3GPP access and a default bearer for a WLAN access in association with a multi-access PDN connection.

The default bearer for the multi-access PDN may be a default bearer established by the UE 10. In other words, the UE 10 stores one default bearer for the multi-access PDN connection in a state where only one default bearer is established for the multi-access PDN connection, and the UE 10 may store two default bearers for the multi-access PDN connection in a state where two default bearers are established for the multi-access PDN connection.

Furthermore, the UE 10 may store, with respect to the multi-access PDN connection, information indicating default access (Default Assess) in the multi-access PDN connection. Note that the default access may be information indicating the 3GPP access or the WLAN access. The 3GPP access may be an access system that is not the WLAN access. More specifically, the 3GPP access may be information indicating an access network including an E-UTRAN access, a UTRAN access, and a GERAN access.

Alternatively, the default access may include more detailed information. For example, the default access may be one of E-UTRAN access, UTRAN access, and GERAN access.

In a case where multiple default bearers are established, the UE 10 may select a default bearer based on the default access, and may transmit and/or receive user data by using the selected default bearer.

The WLAN off loadability is WLAN offload permission information indicating whether a communication associated with the PDN connection is allowed for offload to the WLAN using an interworking function between the WLAN and the 3GPP, or maintains the 3GPP access.

The UE allowed mode is an operation mode allowed by the UE 10. This identification information may indicate the UE intiated mode, the Network initiated mode, or both thereof.

The Operation mode is identification information on a mode that indicates which of the UE 10 and the network takes an initiative in transmitting and/or receiving data or is allowed to initiate communication control in a case that the current PDN connection is the first PDN connection.

FIG. 8C illustrates the UE context for each bearer. The UE context for each bearer includes transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing Rule may be a value that the UE 10 prestores as a default value.

An IP flow may be switched by including an IP header in a Routing Filter. Alternatively, the UE 10 may switch the flow for each application by including an application ID in the Routing Filter. Alternatively, the Routing Filter may include a TFT.

The Routingu Rule may store multiple rules (regulations). Furthermore, the Routing rule may include priority for each rule.

FIG. 8D illustrates the TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The UE 10 may store the NBIFOM capability associated with the TWAG ID. Furthermore, the NBIFOM capability of multiple TWAGs 74 may be stored.

FIG. 8E illustrates an example of the Network capability. In the Network capability, the NBIFOM capability is stored for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 8E, the TWAG 74 stores the NBIFOM capability in association with the PGW ID. Furthermore, as illustrated in FIG. 8E, the NBIFOM capability may be stored in association with each of multiple PGWs 30.

The PGW ID is information for identifying the PGW 30. The PGW ID may be an APN, for example.

The TWAG Capability and the Network capability may be included in the UE context, or may be information separated from the UE context.

That is, the UE 10 may store the TWAG Capability and the Network capability included in the UE context, or may store the TWAG Capability and the Network capability separately from the UE context.

1.2.4. PGW Components

Figure 9:
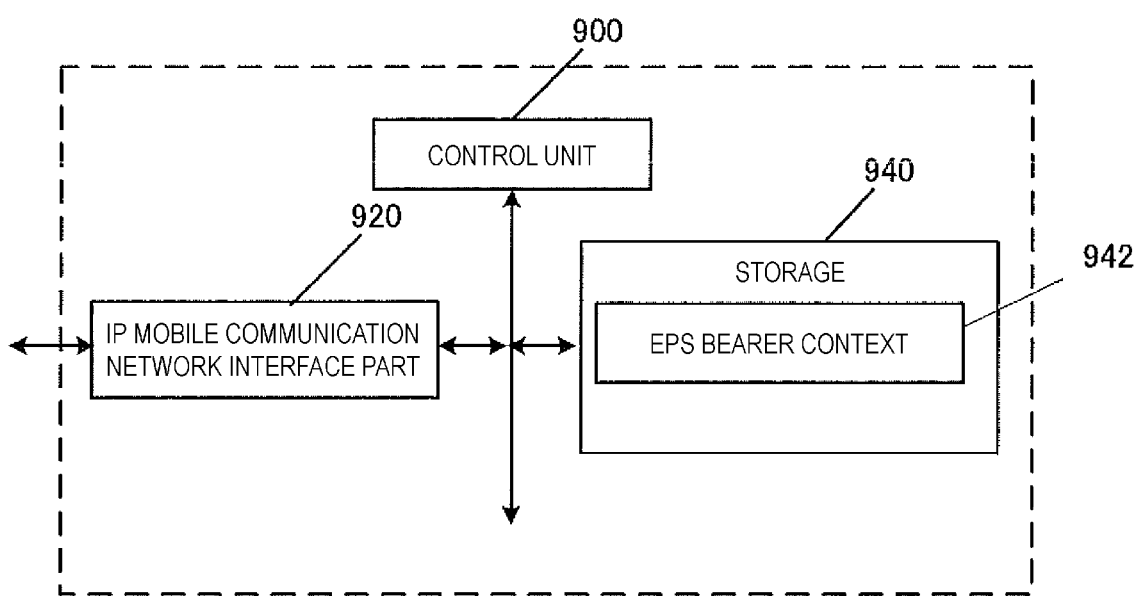
FIG. 9 is a diagram illustrating a functional configuration of a PGW.

Next, the components of the PGW 30 will be described. FIG. 9 illustrates a device configuration of the PGW 30. As illustrated in FIG. 9, the PGW 30 includes an IP mobile communication network interface unit 920, a control unit 900, and a storage 940. The IP mobile communication network interface unit 920 and the storage 940 are connected to the control unit 900 via a bus.

The control unit 900 serves as a function unit for controlling the PGW 30. The control unit 900 implements various processes by reading out and executing various programs stored in the storage 940.

The IP mobile communication network interface unit 920 serves as a data transmission and reception unit configured to transmit and/or receive user data and/or a control message, and also serves as a function unit through which the PGW 30 is connected to the SGW 35 and/or the PCRF 60 and/or the ePDG 65 and/or the AAA 55 and/or the GW 74.

The storage 940 serves as a function unit for storing programs, data, and the like necessary for each operation of the PGW 30. The storage 940 is configured with, for example, a semiconductor memory, a Hard Disk Drive (HDD), or the like.

As illustrated in FIG. 9, the storage 940 stores an EPS bearer context 942. Note that an EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability.

The IMSI is information for identifying a user of the UE 10.

The ME identity is an ID of an ME, and may be the IMEI/IMISV, for example.

The MSISDN represents the phone number of the UE 10.

The UE NBIFOM capability is the NBIFOM capability of the UE 10. The UE NBIFOM capability is identification information for each UE 10 indicating whether the UE 10 has capability of establishing the first PDN connection. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, and the PGW 30 may store the same identification information.

The IP Address indicates an IP address assigned to the UE 10 for the PDN connection. The IP address may be an IPv4 and/or IPv6 prefix.

The PDN type indicates the type of the IP address. The PDN type indicates IPv4, IPv6, or IPv4v6, for example.

The APN is a label indicating an access destination in the network, in accordance with the DNS naming convention.

The Network allowed mode indicates an Operation mode allowed by the network. The Network allowed mode may include the UEinitiated mode, the Network initiated mode, or both thereof.

The Operation mode is identification information of a mode that indicates which one of the UE 10 and a network takes an initiative in transmitting and/or receiving data or is allowed to initiate communication control in a case where the current PDN connection is the first PDN connection.

More specifically, for example, the UE initiated mode in which the UE 10 is allowed to initiate the communication control or the Network initiated mode in which the network is allowed to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a mobile access gateway (MAG).

The Routing Rule may be notified from the PGW 30 or the PCRF 60. Alternatively, the Routing Rule may be a value that the UE 10 prestores as a default value.

The PGW 30 may switch the IP flow by including an IP header in the Routing Filter. Alternatively, the PGW 30 may switch the flow for each application by including an application ID in Routing Filter. Alternatively, the Routing Filter may include a TFT.

The Routingu Rule may store multiple rules. Furthermore, the Routing rule may include priority for each rule.

Furthermore, the PGW 30 may establish the default bearer for each PDN connection established with the UE 10, and store the EPS bearer identification information identifying the default bearer.

Note that the PGW 30 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the PGW 30 may manage the default bearers and the access network in association with each other.

Specifically, the PGW 30 may store the EPS bearer identification information identifying each of the default bearer for the access network A and the default bearer for access network B. Here, the default bearer for an access network may be a default bearer for an access system of the access network. Therefore, the PGW 30 may store the default bearer for 3GPP access and the default bearer for a WLAN access in association with the multi-access PDN connection.

The default bearer for the multi-access PDN may be a default bearer that is being established between the PGW 30 and the UE 10. In other words, the PGW 30 stores one default bearer for the multi-access PDN connection in a state where only one default bearer is established for the multi-access PDN connection, and the PGW 30 may store two default bearers for the multi-access PDN connection in a state where two default bearers are established for the multi-access PDN connection.

Furthermore, the PGE 30 may store information indicating a default access (Default Assess) in the multi-access PDN connection, for the multi-access PDN connection. Note that the default access may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the default access may include more detailed information. For example, the default access may be one of E-UTRAN access, UTRAN access, and GERAN access.

When multiple default bearers are established, the PGW 30 may select a default bearer based on the default access, and transmit and/or receive user data by using the selected default bearer.

FIG. 10D illustrates the TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBI- FOM function. Specifically, the NBIFOM capability may include "allowed" or "Not allowed".

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The PGW 30 may store the NBIFOM capability associated with the TWAG ID.

FIG. 10E illustrates an example of the Network capability. In the Network capability, the NBIFOM capability is stored for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 10E, the PGW 30 stores the NBIFOM capability in association with the PGW ID. Furthermore, as illustrated in FIG. 10E, the NBIFOM capability may be stored in association with each of the multiple PGWs 30.

The PGW ID may be any information for identifying the PGW 30, and may be an APN, for example.

The TWAG Capability and the Network capability may be included in the EPS bearer context, or may be information separated from the UE context.

1.2.5. PCRF Components

Figure 11:
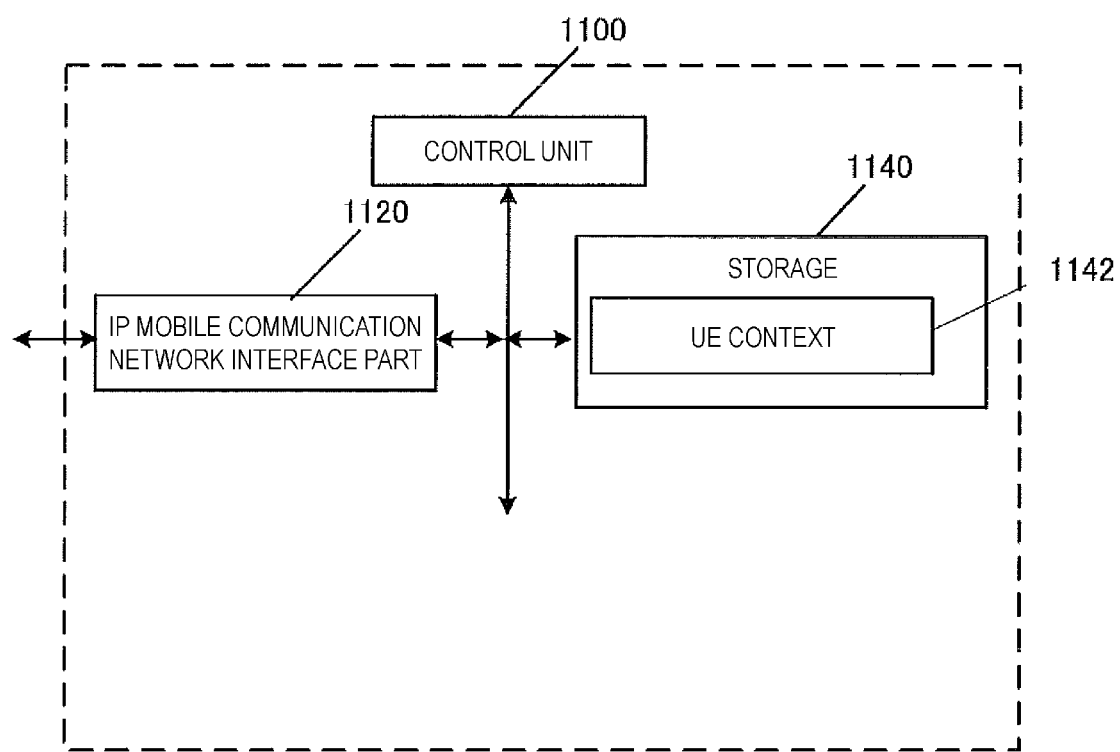
FIG. 11 is a diagram illustrating a functional configuration of a PCRF.

Next, the components of the PCRF 60 will be described. FIG. 11 illustrates a device configuration of the PCRF 60. As illustrated in FIG. 11, the PCRF 60 includes an IP mobile communication network interface unit 1120, a control unit 1100, and a storage 1140. The IP mobile communication network interface unit 1120 and the storage 1140 are connected to the control unit 1100 via a bus.

The control unit 1100 serves as a function unit for controlling the PCRF 60. The control unit 1100 implements various processes by reading out and executing various programs stored in the storage 1140.

The IP mobile communication network interface unit 1120 serves as a data transmission and/or reception unit configured to transmit and/or receive user data and/or a control message, and also serves as a function unit through which the PCRF 60 is connected to the PGW 30 and/or the TWAG 74 and/or the AAA 55.

The storage 1140 serves as a function unit for storing programs, data, and the like necessary for each operation of the PCRF 60. The storage 940 is configured with, for example, a semiconductor memory, a Hard Disk Drive (HDD), or the like.

As illustrated in FIG. 11, the storage 1140 stores UE context 1142. Note that the UE context may be classified into a UE context stored for each UE 10 and a UE context stored for each PDN connection.

FIG. 12A illustrates the UE context for each UE 10. As illustrated in FIG. 12A, the context includes at least a Subscriber ID and UE NBIFOM capability.

The Subscriber ID is identification information of a user. For example, the subscriber ID may be an IMSI.

The UE NBIFOM capability is the NBIFOM capability of the UE 10. The UE NBIFOM capability is identification information for each UE 10 indicating whether capability of establishing the first PDN connection is supported. In other words, the UE NBIFOM capability is identification information indicating whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule.

The APN is a label indicating an access destination in the network, in accordance with the DNS naming convention. The Operation mode is identification information on a mode that indicates which of the UE and the network takes an initiative in transmitting and/or receiving data or is allowed to initiate communication control when the PDN connection is the first PDN connection.

More specifically, for example, an Operation mode in which the UE 10 is allowed to initiate the communication control may be the UE initiated mode.

Furthermore, an Operation mode that allows the network and/or the PGW 30 and/or the PCRF 60 to initiate the communication control may be a Network initiated mode.

The Network Policy is a communication control policy on the network side, and may include the Network allowed mode. Alternatively, the PCRF 60 may store the Network allowed mode separately from the Network Policy.

The Charging Rule is a regulation on charging. In accordance with the Charging Rule determined by the PCRF 60, a PCEF performs charging.

The PCC Rule is a regulation relating to control of the Network Policy and Charging Rule. In accordance with the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and/or bearer includes at least a Routing Rule.

The Routing Rule indicates an association of a Routing Filter, and a Routing address or Routing access type. Based on this association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the UE 10 and/or the TWAG 74 and/or the PGW 30. Alternatively, the Routing Rule may be a value that the PCRF 60 prestores as a default value. In this case, the PCRF 60 may determine the default value of the Routing Rule in accordance with the PCC Rule.

An IP flow may be switched by including an IP header in the Routing Filter. Alternatively, the flow may be switched for each application by including an application ID in the Routing Filter. Alternatively, the Routing Filter may include the TFT.

The Routingu Rule may store multiple rules. Furthermore, the Routing rule may include priority for each rule.

FIG. 12D illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the possession of the function of establishing the multi-access PDN connection.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 12D, the NBIFOM capability may be stored in association with the TWAG ID that is the identification information on the TWAG 74. If not associated with the TWAG ID, the NBIFOM capability may mean the capability of the TWAG 74 to be stored.

If the TWAG ID and the NBIFOM capability are stored in association with each other, the PCRF 60 may store the TWAG capability of multiple TWAGs 74.

FIG. 12E illustrates an example of the Network capability stored in the PCRF 60. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may be information indicating the possession of the function of establishing the multi-access PDN connection.

Alternatively, the NBIFOM capability may be identification information indicating the possession of the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

1.3. Description of Initial State

An initial state in the present embodiment will be described. The initial state in the present embodiment may be a first initial state or a second initial state, both of which will be described later.

Note that the initial state in the present embodiment need not be limited to the first or second initial state.

1.3.1. Description of First Initial State

The first initial state will be described. In the first state, the UE 10 has not established the first PDN connection with the core network 90. However, the UE 10 has already established the second PDN connection. In greater detail, the UE 10 has not established the first PDN connection with a PGW_A 1310. However, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_B 1320. Here, the transfer path may be a bearer.

As described above, in a first state early stage, the UE 10 may be in a state of being connected to the core network 90 via the access network B.

Note that the UE 10 need not be connected to the core network 90 via the access network A. In other words, the UE 10 need not perform an attach through the LTE access network.

Alternatively, the UE 10 may be in a state of being connected to the core network 90 via the access network A. In this case, the UE 10 may perform an Attach procedure initiated by the UE 10 to establish a third PDN connection.

Note that the third PDN connection may be established with the gateway selected by using the APN 2. Alternatively, the third PDN connection may be established with a gateway selected by using an APN different from the APN 1 and the APN 2.

The first initial state has been described above; however, the first initial state is not limited to the above-described state, and only needs to be a state in which the multi-access PDN connection has not been established through the access network B, for example.

1.3.2. Description of Procedure for Leading to First Initial State

Figure 15:
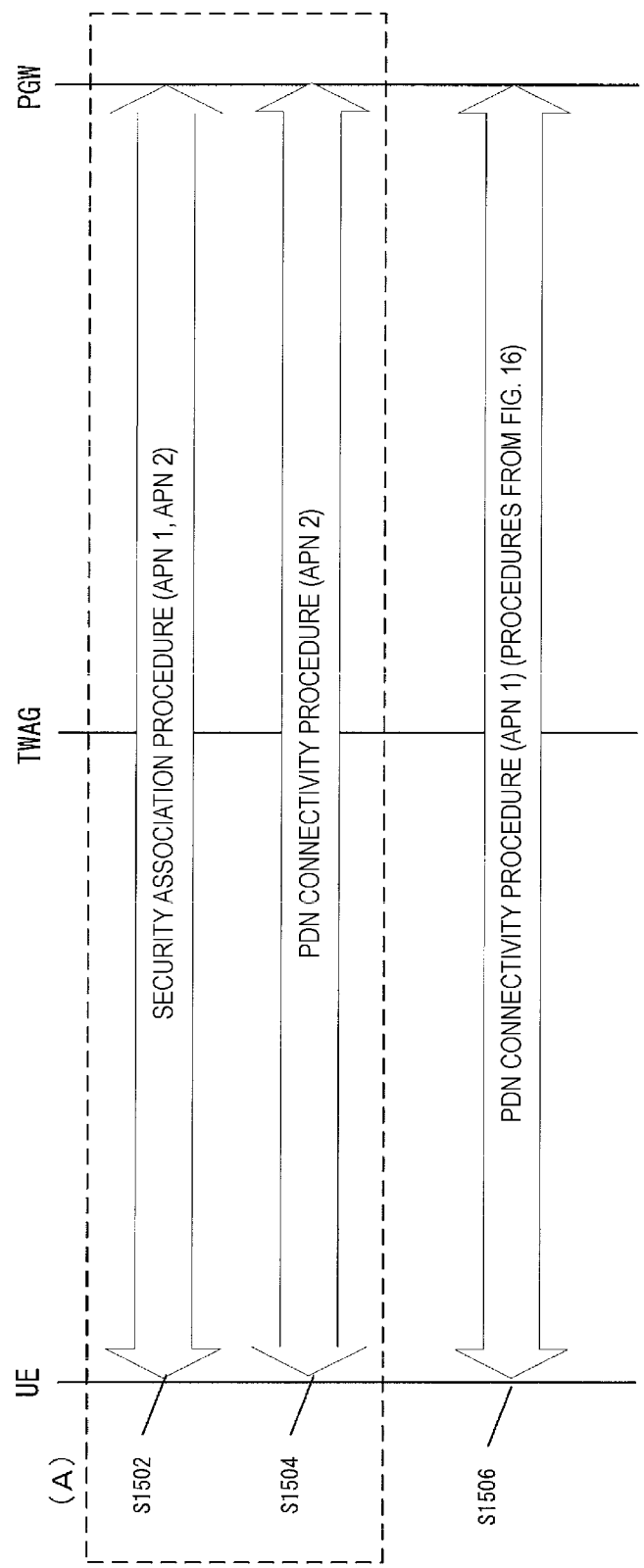
FIG. 15 is a diagram illustrating a procedure for leading to an initial state.

A procedure for leading to a first initial state will be described with reference to FIG. 15. In the procedure for leading to the first initial state, at least an Attach procedure to the core network 90 through the access network B, illustrated in (A) of FIG. 15, is performed. The first initial state is a state after at least the Attach procedure to the core network 90 through the access network B, illustrated in (A) of FIG. 15, is performed.

Next, details of the Attach procedure to the core network 90 through the access network B will be described. The UE 10 first performs authentication for accessing the access network B and the core network 90 and a security association procedure for establishing a security association for transmitting and/or receiving a message with the core network 90 (S1502).

More specifically, the UE 10 performs an authentication procedure for accessing the TWAG 74 arranged in the access network B and the PGW 30 arranged in the core network 90. Upon the completion of the authentication procedure, the UE 10 performs a procedure for establishing security associations between the UE 10 and the TWAG 74 and between the TWAG 74 and the PGW 30. In the authentication procedure and the procedure for establishing security associations, the UE 10 may transmit control information including an Access Point Name (APN) to the core network 90. The procedures for authentication and for establishing security associations may be performed in accordance with an EAP or other techniques. The UE 10 can obtain the authentication for accessing the PGW 30 selected by the TWAG 74 using the APN.

Furthermore, the UE 10 may transmit multiple APNs. For example, by transmitting APN 1 and APN 2, the UE 10 can obtain the authentication for accessing a PGW 30 selected by the TWAG 74 using the APN 1 and a PGW 30 selected using the APN 2 upon completion of the procedures for authentication and for establishing a security association.

Upon the establishment of the security association, the UE 10 performs a PDN connectivity procedure for establishing the second PDN connection with the core network 90 through the access network B (S1504). In greater detail, the UE 10 establishes, via the TWAG 74, the PDN connection with the PGW_B 1320 arranged in the core network 90.

Specifically, the UE 10 transmits a PDN connectivity request to the TWAG 74 and/or the network. The UE 10 may transmit the PDN connectivity request including the APN 2.

The TWAG 74 and/or the network receives the PDN connectivity request transmitted from the UE 10. The TWAG 74 and/or the network transmits a PDN connectivity accept to the UE 10 upon the reception of the PDN connectivity request. The TWAG 74 and/or the network may transmit the PDN connectivity accept including APN 2.

The UE 10 receives the PDN connectivity accept transmitted from the TWAG 74 and/or the network. The UE 10 transmits a PDN connectivity complete to the TWAG 74 and/or the network based on the PDN connectivity accept.

The TWAG 74 and/or the network receives the PDN connectivity complete transmitted from the UE 10.

1.3.3. Description of Second Initial State

The second initial state will be described. In the second initial state, the UE 10 has not established a connection with the core network 90. In other words, the UE 10 has not established the first PDN connection and the second PDN connection with the core network 90. In greater detail, the UE 10 has not established the first PDN connection with the PGW_A 1310 included and arranged in the core network 90. Furthermore, the UE 10 has not established the second PDN connection with the PGW_B 1320 included and arranged in the core network 90.

Note that the PGW_A 1310 may be a gateway device selected by using the APN 1. The PGW_B 1320 may be a gateway device selected by using the APN 2. Furthermore, the selection of gateway using the APN 1 and/or the APN 2 may be performed by the TWAG 74 included and arranged in the access network B and/or the MME 40 included and arranged in the core network 90.

As described above, in the second initial state, the UE 10 may have no connection with the core network 90. In other words, the UE 10 may be in a state of not being connected to the core network 90 through either the access network A or access network B. Therefore, the UE 10 may be in a state of not being established any PDN connection.

The second initial state has been described above; however, the second initial state is not limited to the above-described state, and only needs to be a state in which the connection to the core network 90 through the access network B has not been established, for example.

1.3.4. Description of Procedure for Leading to Second Initial State

A procedure for leading (changing the state) to the second initial state will be described with reference to FIG. 15. In the procedure for leading (changing the state) to the second initial state, the procedure illustrated in a section (A) of FIG. 15 may not be performed. In other words, the second initial state may be a state in which no particular procedures for making a connection with the core network 90 through the access network B is not performed. In other words, the second initial state may be a state in which the UE 10 makes an initial connection to the core network 90 through the access network B.

1.3.5. Description of Multi-Access PDN Connectivity Establishment Procedure

Next, an establishment procedure of the first PDN connection will be described. Here, the initial state may be the first initial state or the second initial state. In the present embodiment, after the establishment of the initial state, the UE 10 performs a PDN connectivity procedure for establishing the first PDN connection with the core network 90 through the access network B (S1506). In greater detail, the UE 10 establishes, via the TWAG 74, the first PDN connection with the PGW_A 1310 arranged in the core network 90.

Note that the first PDN connection may be constituted of a path that is a combination of a transfer path between the UE 10 and the TWAG 74 and a transfer path between the TWAG 74 and the PGW_A 1310. Here, the transfer path may be a bearer.

As illustrated in FIG. 15, the procedure for establishing the first PDN connection may be a PDN connectivity procedure using the APN 1.

A specific example of the PDN connectivity procedure will be described below.

1.4. Examples of PDN Connectivity Procedure

Examples of the PDN connectivity procedure for establishing the first PDN connection will be described with reference to FIG. 16.

1.4.1. Example of First PDN Connectivity Procedure

An example of the first PDN connectivity procedure will be described with reference to FIG. 16.

Figure 16:
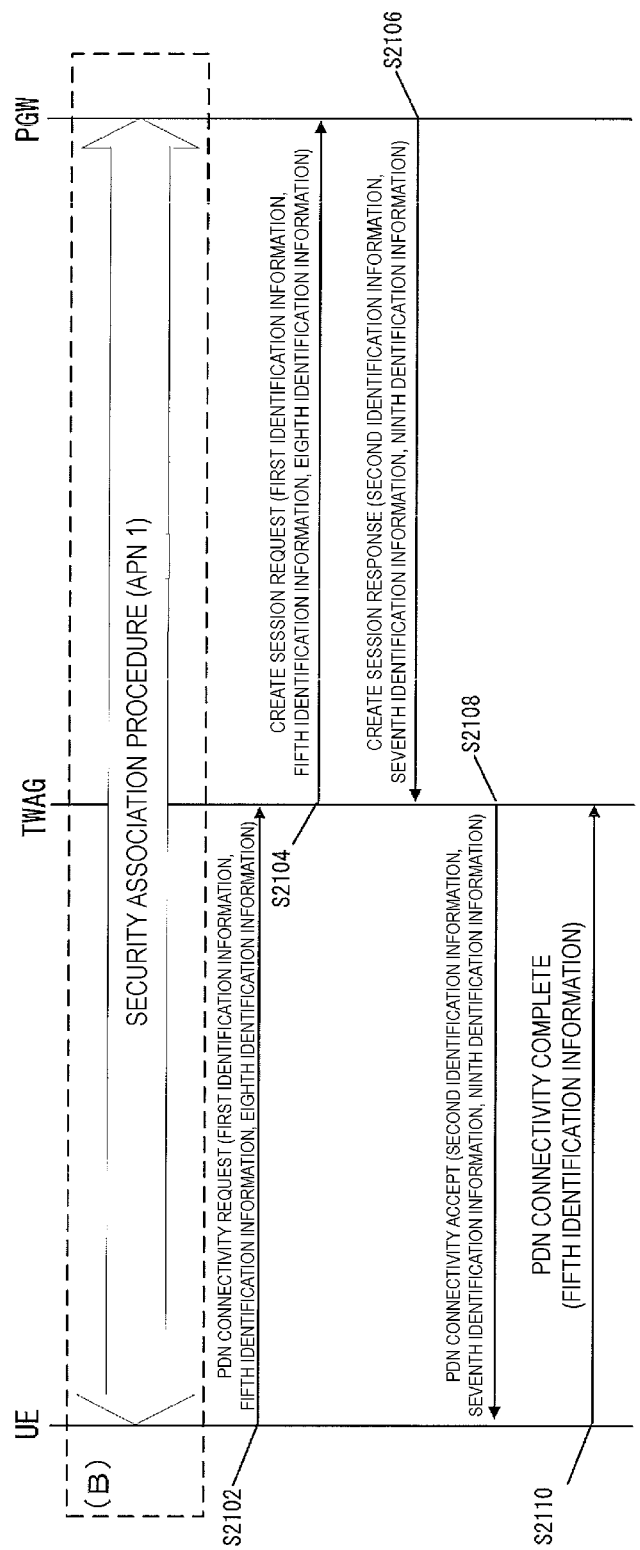
FIG. 16 is a diagram illustrating a first PDN connectivity procedure.

As illustrated in (B) of FIG. 16, the UE 10 first performs the authentication and the security association procedure for establishing the security association. Note that the UE 10 may perform the security association procedure in a case that its initial state is the second initial state. In other words, in a case that the initial state is the first initial state, the UE 10 need not perform the security association procedure. In this way, in the case that the initial state is the first initial state, the UE 10 may omit the security association procedure because the security association has already been established.

Note that the security association procedure performed by the UE 10 may be similar to the security association procedure described with reference to (A) of FIG. 15. Therefore, detailed description of the procedure is omitted.

Next, the UE 10 transmits a PDN connectivity request to the TWAG 74 (S2102). The UE 10 may transmit the PDN connectivity request including at least the PDN connectivity request message identity (PDN connectivity request message ID), the Procedure transaction identity (procedure transaction ID), the Request type (request type), and the PDN type. Furthermore, the UE 10 may include at least first identification information and/or fifth identification information and/or eighth identification information in the PDN connectivity request. Moreover, the UE 10 may include the access point name (APN) and/or protocol configuration options (PCOs) and/or the traffic flow templates (TFTs) in the PDN connectivity request. Note that the UE 10 may transmit the PCO including the first identification information and/or fifth identification information and/or eighth identification information and/or the TFT.

Here, the first identification information may be the UE NBIFOM capability representing that the UE 10 supports the NBIFOM. Note that the NBIFOM capability may be information indicating the provision of the function of establishing the multi-access PDN connection.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used in the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information. Note that the UE 10 may select the access network indicated by the eighth identification information based on the ISRP, only in a case where the ISRP is valid or active.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information when establishing a new multi-access PDN connection, and may be configured not to transmit the eighth identification information when adding a transfer path in a state in which the default bearer is established for the multi-access PDN connection through the LTE access network.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1 in order to establish the multi-access PDN connection. Here, the APN 1 may be an APN that is allowed to establish the multi-access PDN connection and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6.

The PCO may be protocol information associated with the PDN connection. Furthermore, the PCO may include identification information on the request. Note that the UE 10 may transmit the PCO including the first identification information and/or fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection without requesting the certain NBIFOM operation mode, the UE 10 may transmit the PDN connectivity request without including the TFT. More specifically, when the UE 10 includes the first identification information and/or fifth identification information and/or eighth identification information, the UE 10 may transmit the PDN connectivity request without including the TFT. Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or fifth identification information and/or eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request and/or based on the first identification information and/or fifth identification information and/or eighth identification information included in the PDN connectivity request, the TWAG 74 transmits a Create Session Request to the PGW 30 (S2104).

Upon the reception of the PDN connectivity request and/or based on the first identification information and/or fifth identification information and/or eighth identification information included in the PDN connectivity request, the TWAG 74 may transmit the Create Session Request including at least the first identification information and/or fifth identification information and/or eighth identification information. Furthermore, the TWAG 74 may include the TFT in the Create Session Request, upon the reception of the TFT transmitted from the UE 10.

Note that, the TWAG 74 may be configured to transmit the eighth identification information in a case of requesting the establishment of the multi-access PDN connection in the UE-Initiated mode, and not to transmit the eighth identification information in a case of requesting the establishment of the multi-access PDN connection in the Network-Initiated mode.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in a case that none of the first identification information and/or fifth identification information and/or eighth identification information is included in the PDN connectivity request, the TWAG 74 may transmit the Create Session Request without including the first identification information and/or fifth identification information and/or eighth identification information. Moreover, in the case that the first identification information and/or fifth identification information and/or eighth identification information is not included in the PDN connectivity request, the TWAG 74 may perform a procedure for establishing the single-access PDN connection.

The PGW 30 receives the Create Session Request transmitted from the TWAG 74. Upon the reception of the Create Session Request, and/or based on the first identification information and/or fifth identification information and/or eighth identification information included in the Create Session Request, the PGW 30 may perform an IP-CAN session update procedure with the PCRF 60.

Upon the reception of the Create Session Request and/or based on the first identification information and/or fifth identification information and/or eighth identification information included in the Create Session Request, the PGW 30 may perform the IP-CAN session update procedure including at least the first identification information and/or fifth identification information and/or eighth identification information.

Note that the PGW 30 may perform the IP-CAN session update procedure to notify the PCRF 60 of information on the UE 10 and/or TWAG 74.

The PGW 30 may transmit, to the PCRF 60, a control message in the IP-CAN session procedure, including information indicating whether the PDN connection to be established is the multi-access PDN connection or the single-access PDN connection, and/or the first identification information and/or fifth identification information and/or eighth identification information.

More specifically, when the multi-access PDN connection is to be established, the PGW 30 transmits, to the PCRF 60, the information indicating the access network B, the PDN connection ID, the information indicating that the PDN connection is the multi-access PDN connection, and the first identification information and/or the fifth identification information and/or the eighth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, upon the reception of the first identification information and/or fifth identification information and/or eighth identification information, the PCRF 60 may transmit, to the PGW 30, a control message in the IP-CAN session update procedure with the PGW 30, the control message including at least the second identification information and/or seventh identification information and/or ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits a Create Session Response to the TWAG 74 (S2106).

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits the Create Session Response including at least the second identification information and/or seventh identification information and/or ninth identification information.

Furthermore, the PGW 30 may include the PDN Address and/or the PDN connection ID and/or the TFT and/or the bearer identification information identifying the default bearer in the Create Session Response.

Note that a method by which the PGW 30 acquires the second identification information and/or seventh identification information and/or ninth identification information is not limited to the above-described method for acquiring the seventh identification information from the PCRF 60 in the IP-CAN session update procedure, and another example may be employed. For example, the PGW 30 may create the second identification information and/or seventh identification information and/or ninth identification information and transmit the Create Session Response including the second identification information and/or seventh identification information and/or ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be the Allowed Mode representing the NBIFOM operation mode that is allowed for the multi-access PDN connection to be established. In other words, the seventh identification information may be an operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

On the basis of the Allowed Mode, the PCRF 60 or the PGW 30 may include the allowed operation mode in the seventh identification information.

In other words, when only the Network-Initiated mode is allowed, the PCRF 60 or the PGW 30 may include the Network-Initiated mode in the seventh identification information. Alternatively, when only the UE-Initiated mode is allowed, the PCRF 60 or the PGW 30 may include the UE-Initiated mode in the seventh identification information.

Note that when both the UE-Initiated mode and the Network-Initiated mode are allowed, the seventh identification information may include both the operation modes. Alternatively, when both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, when none of the operation modes is allowed for establishment of the PDN connection, the PCRF 60 may transmit, to the PGW 30, the cause information indicating that the requested operation mode is not allowed.

When none of the operation modes is allowed for establishment of the PDN connection, the PGW 30 need not notify the TWAG 74 of the seventh identification information.

When none of the operation modes is allowed for establishment of the PDN connection, the PGW 30 may transmit, to the TWAG 74, the Create Session Response including the cause information indicating that the requested operation mode is not allowed.

When none of the operation modes is allowed for establishment of the PDN connection, the PGW 30 may notify the TWAG 74 that there is no allowed operation.

As described above, on the basis of the Allowed Mode, the PCRF 60 or the PGW 30 may regard an operation mode that is allowed for establishment of the PDN connection as the seventh identification information.

Note that when the Network-Initiated mode is not included in the seventh identification information, the PCRF 60 need not transmit the TFT to the PGW 30.

In other words, note that only when the Network-Initiated mode is included in the seventh identification information, the PCRF 60 may transmit the TFT to the PGW 30.

Note that when the Network-Initiated mode is not included in the seventh identification information, the PGW 30 need not transmit the TFT to the TWAG 74. Thus, in this case, the PGW 30 need not include the TFT in the Create Session Response.

In other words, note that only when the Network-Initiated mode is included in the seventh identification information, the PGW 30 may transmit the TFT to the TWAG 74. Thus, in this case, the PGW 30 may include the TFT in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN address.

Furthermore, the PDN connection ID may be information for uniquely identifying the PDN connection established between the UE 10 and the PGW 30. The PDN connection ID may be assigned by the PGW 30, or may be assigned by the TWAG 74. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and not to transmit the ninth identification information when adding a transfer path in a state in which the default bearer is established for the multi-access PDN connection through the LTE access network.

The TWAG 74 receives the Create Session Response transmitted from the PGW 30. Upon the reception of the Create Session Response and/or based on the second identification information and/or seventh identification information and/or ninth identification information included in the Create Session Response, the TWAG 74 transmits a PDN connectivity accept to the UE 10 (S2108). Note that the PDN connectivity accept message may be any control message indicating that establishment of a PDN connection is allowed, and may be any Activate default EPS bearer context request. The PDN connectivity accept message may be a response message to the PDN connectivity request.

Upon the reception of the Create Session Response and/or based on the second identification information and/or seventh identification information and/or ninth identification information included in the Create Session Response, the TWAG 74 may transmit the PDN connectivity accept including at least a PDN connectivity accept message identity (PDN connectivity accept message ID), the Procedure transaction ID, the APN, the PDN address (PDN Address), the PDN connection ID, and the user plane connection ID (User Plane Connection ID). Furthermore, the TWAG 74 may include at least the second identification information and/or seventh identification information and/or ninth identification information in the PDN connectivity accept. Moreover, the TWAG 74 may include the PCO and/or the Cause and/or the TFT and/or the bearer identification information identifying the default bearer, and/or the PDN connection attribute information, in the PDN connectivity accept. Note that the TWAG 74 may transmit the PCO including the second identification information and/or seventh identification information and/or ninth identification information and/or the TFT.

Here, the PDN connectivity accept message ID may be a message type representing the PDN connectivity accept message.

The APN may be an APN, to which the UE 10 is allowed to connect. More specifically, the APN may be the APN 1. The APN 1 may be an APN that is allowed to establish the multi-access PDN connection. The TWAG 74 may include the APN 1 in the PDN connectivity accept.

The PDN address may be an IP address assigned to the UE 10. For example, the PDN address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The user plane connection ID is information for identifying a user plane. The user plane is a transfer path used for transferring user data in the PDN connection. The TWAG 74 may assign the user plane connection ID.

The Cause may be information representing that the PDN type of the PDN address assigned to the UE 10 is different from the PDN type requested by the UE 10 in the PDN connectivity request.

Note that the TWAG 74 and/or the PGW 30 may include the second identification information and/or the seventh identification information and/or the ninth identification information in the PCO. However, in a case where the TWAG 74 and/or the PGW 30 includes the second identification information and/or the seventh identification information and/or the ninth identification information in the PCO, the TWAG 74 and/or the PGW 30 does not include the IFOM support. In contrast, in a case where the TWAG 74 and/or the PGW 30 includes the IFOM support in the PCO, the TWAG 74 and/or the PGW 30 does not include the second identification information and/or the seventh identification information and/or the ninth identification information. As described above, it may be possible to not configure both the second identification information and/or seventh identification information and/or ninth identification information and the IFOM support to be effective to ensure a clear distinction between the use of the switching of the communication path based on the NBIFOM and the use of the switching of the communication path based on the IFOM.

The PDN connection attribute information may be information indicating that the PDN connection established in the present PDN connectivity procedure is the multi-access PDN connection, and/or information indicating that user data transmitted and/or received by using the PDN connection established in the PDN connection the present PDN connectivity procedure is allowed to be transmitted and/or received through the access network A and the access network B, and/or when there is only one operation mode indicated by the seventh identification information, information indicating that the PDN connection established in the present PDN connectivity procedure is the multi-access PDN connection of the operation mode indicated by the seventh identification information.

Note that the UE 10 may transmit the PDN connectivity accept message that further includes the connectivity type indicating the type of the PDN connection and/or the WLAN offload permission information (WLAN offload acceptablity) indicating whether the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74. Upon the reception of the PDN connectivity accept and/or based on the second identification information and/or seventh identification information and/or ninth identification information included in the PDN connectivity accept, the UE 10 transmits a PDN connectivity complete to the TWAG 74 (S2110).

The UE 10 may transmit the PDN connectivity complete including at least a PDN connectivity complete message ID (PDN connectivity complete), the procedure transaction ID, and the PDN connection ID.

Furthermore, when multiple INFOM operation modes are included in the seventh identification information, the UE 10 may include at least the fifth identification information in the PDN connectivity complete. In other words, when multiple INFOM operation modes are allowed, the UE 10 may select one of the allowed modes and transmit the fifth identification information including the selected mode.

Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, when the UE-Initiated mode and the Network-Initiated mode are included in the seventh identification information included in the PDN connectivity accept, the UE 10 may include the UE-Initiated mode or the Network-Initiated mode in the fifth identification information.

Which of the UE-Initiated mode and the Network-Initiated mode is to be included in the fifth identification information may be determined based on a UE policy. Note that the UE policy may be any information configured for the UE 10. For example, the UE policy may be information configured by a user.

The PDN connectivity complete message ID may be a message type representing the PDN connectivity complete message.

After the first PDN connectivity procedure is completed, the UE 10 and the PGW 30 establish the first PDN connection of the operation mode determined based on the operator policy. Alternatively, the UE 10 establishes the first PDN connection of an operation mode selected from the operation modes allowed based on the operator policy. Note that upon the reception of the PDN connectivity accept and/or based on the PDN connection attribute information and/or the seventh identification information and/or the operation mode selected based on the seventh identification information, the UE 10 may identify the NBIFOM operation mode for the established PDN connection. Upon the establishment of the first PDN connection, the UE 10 and the PGW 30 determine a PDN connection and/or a transfer path, such as an EPS bearer, for transmitting and/or receiving the IP flow by using the TFT, and transmit and/or receive user data corresponding to the IP flow identified by the TFT. More specifically, the UE 10 and the PGW 30 transmit and/or receive a flow identified by the TFT by using the first PDN connection.

Furthermore, in the establishment of the first PDN connection, the UE 10 and the PGW 30 establish a default bearer. The UE 10 and the PGW 30 store the identification information of the default bearer established in the PDN connectivity procedure and the information identifying the WLA access network in association with each other, in response to the completion of the PDN connectivity procedure through the WLAN access network.

Note that the UE 10 performs data transmission and/or reception using the default bearer when the UE 10 does not receive the TFT or transmits and/or receives the user data not matching the held TFT. In addition, the PGW 30 performs data transmission and/or reception using the default bearer when the PGW 30 does not receive the TFT or transmits and/or receives the user data not matching the held TFT.

In this way, the UE 10 and the PGW 30 establish a multi-access PDN connection in the PDN connectivity procedure, and establish a default bearer for the multi-access PDN connection. Furthermore, the UE 10 and the PGW 30 are capable of storing a default access for selecting a default bearer in association with the multi-access PDN connection, in a case where multiple default bearers are established.

Note that in the example of the first PDN connectivity procedure, a case has been described in which transmission and/or reception of the TFT is included in the PDN connectivity procedure; however, the first PDN connectivity procedure is not limited to this case. The transmission and/or reception of the TFT may be performed after the multi-access PDN connection is established.

Therefore, the UE 10 and the TWAG 74 may transmit and/or receive the TFT without including the TFT in the PDN connectivity request and/or a PDN connectivity response (PDN connectivity accept), and establish the multi-access PDN connection. In other words, at a point in time when the PDN connection is established, there may be no IP flow transmitting and/or receiving user data by using the PDN connection. In this case, the UE 10 and the TWAG 74 transmit the TFT after the multi-access PDN connection is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and/or reception using the default bearer when the UE 10 and the PGW 30 transmit and/or receive the user data not matching the held TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and reception using the default bearer when the UE 10 and the PGW 30 transmit and/or receive the user data not matching the held TFT.

Furthermore, in the example of the first PDN connectivity procedure, a case has been described in which the UE 10 and the PGW 30 establish the first PDN connection of an operation mode selected by the UE 10 from the operation modes determined based on the operator policy or the operation modes allowed based on the operator policy; however, the first PDN connectivity procedure is not limited to this case. The UE 10 may reject the establishment of the first PDN connection.

For example, in a case that the UE 10 does not support the operation mode allowed based on the operator policy and/or in a case that the operation mode allowed based on the operator policy does not comply with the policy of the UE 10, the UE 10 may reject the establishment of the first PDN connection.

In greater detail, the UE 10 may transmit a PDN connectivity reject to the TWAG 74, upon the reception of the PDN connectivity accept, and/or on the basis of the seventh identification information included in the PDN connectivity accept and/or the PDN connection attribute information and/or the policy of the UE 10.

The UE 10 may transmit the PDN connectivity reject including at least one or more of a PDN connectivity reject message identity (PDN connectivity reject message ID), the procedure transaction ID, and the Cause. Furthermore, the UE 10 may include fourth identification information in the PDN connectivity reject. Furthermore, the UE 10 may include the PCO and/or a Tw1 value in the PDN connectivity reject. Note that the UE 10 may transmit the PCO including the fourth identification information.

The fourth identification information may be information representing that the UE 10 does not support the operation mode allowed based on the operator policy and/or information representing that the operation mode allowed based on the operator policy does not comply with the policy of the UE 10.

The PDN connectivity reject message ID may be a message type representing a PDN connectivity reject message.

The Cause may be information representing a reason why the PDN connectivity request is rejected. Here, the UE 10 may notify the UE 10 of the fourth identification information included in the Cause.

The Tw1 value may be a value of Tw1 timer included in a case that Cause represents insufficient resources.

The TWAG 74 may receive the PDN connectivity reject transmitted from the UE 10. Upon the reception of the PDN connectivity reject and/or based on the fourth identification information included in the PDN connectivity reject, the TWAG 74 may delete the EPS bearer context, held by the TWAG 74, relating to the established PDN connection. The TWAG 74 may transmit the fourth identification information included in the PDN connectivity reject to the PGW 30.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW

30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

1.4.2. Description of State After PDN Connectivity Establishment Procedure

Performing the above-described first PDN connectivity procedure leads to a first state and a second state, both of which will be described later.

Note that an initial state in the additional Attach procedure may be the first state or the second state. The initial state in the additional Attach procedure may not be limited to the first or second state.

1.4.3. Description of First State

Figure 13:
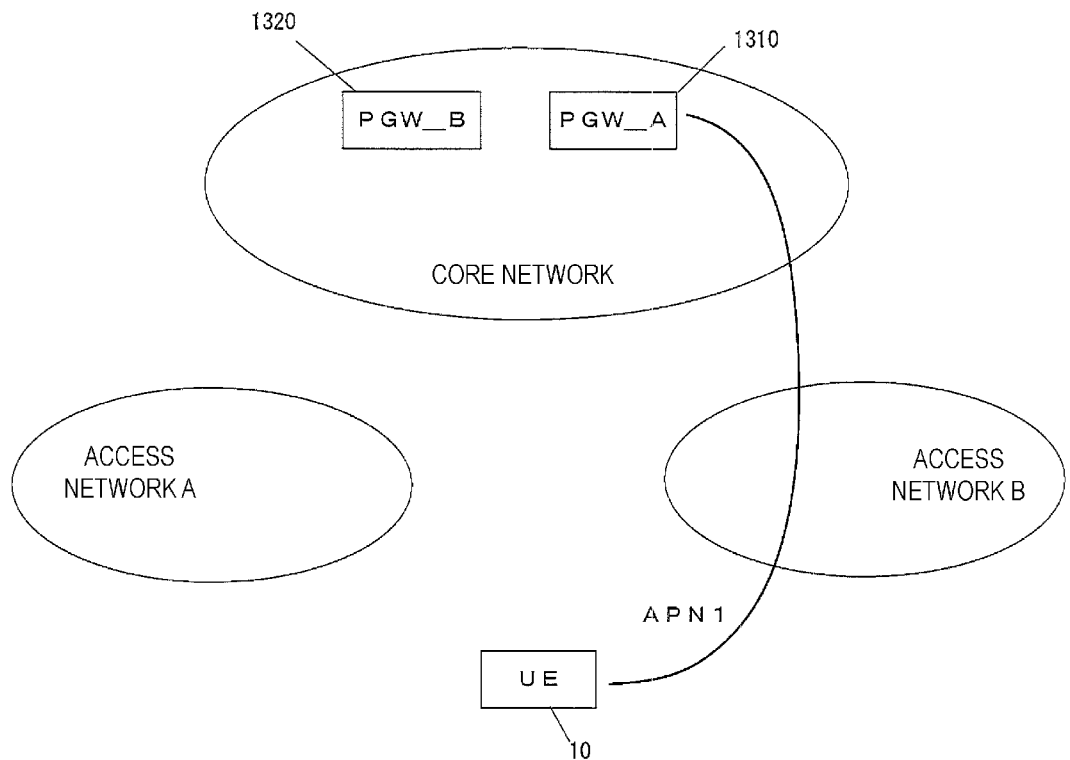
FIG. 13 is a diagram illustrating a state from a first initial state to a state after a PDN connectivity procedure is completed.

The first state will be described with reference to FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_A 1310. Here, the transfer path may be a bearer.

As described above, in the first state, the UE 10 may be in a state in which the multi-access PDN connection has been established via the access network B. In addition, in the first state, the UE 10 may be in a state of not being connected to the core network 90 via the access network A.

Note that the UE 10 need not establish the single-access PDN connection via the access network B.

Alternatively, the UE 10 may be in a state in which the single-access PDN connection is established via the access network B. In this case, the UE 10 performs, in the WLAN access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using an APN different from the APN 1 and the APN 2.

The first state has been described above; however, the first state is not limited to the above-described state, and only needs to be a state in which the multi-access PDN connection has been established through the access network B and the PDN connection has not been established through the access network A, for example.

1.4.4. Description of Second State

Figure 14:
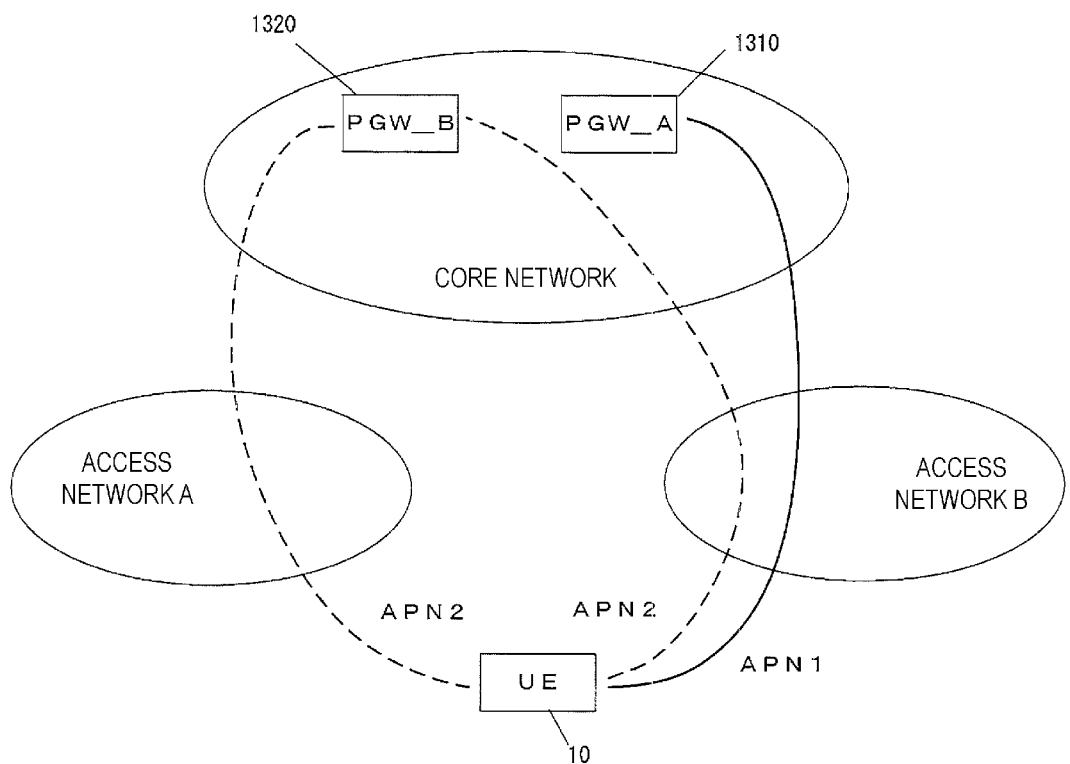
FIG. 14 is a diagram illustrating a state from a second initial state to a state after the PDN connectivity procedure is completed.

The second state will be described with reference to FIG. 14. In the second state, the UE 10 has established the first PDN connection with the core network 90. Furthermore, the UE 10 has established the second PDN connection with the core network 90. In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_B 1320. Here, the transfer path may be a bearer.

In addition, the second PDN connection may be constituted of a transfer path between the UE 10 and the PGW 30 through the access network A. Thus, the second PDN connection may be constituted of a transfer path that is a combination of a transfer path between the UE 10 and the eNodeB 45, a transfer path between the eNodeB 45 and the SGW 35, and a transfer path between the SGW 35 and the PGW_B 1320. Here, the transfer path may be a bearer.

As described above, in the first state, the UE 10 may be in a state in which the multi-access PDN connection has been established via the access network B. Furthermore, the UE 10 may be in a state in which the single-access PDN connection is established via the access network A.

Note that the UE 10 need not establish the single-access PDN connection via the access network B.

Alternatively, the UE 10 may be in a state in which the single-access PDN connection is established via the access network B. In this case, the UE 10 performs, in the WLAN access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using an APN different from the APN 1 and the APN 2.

The second state has been described above; however, the second state is not limited to the above-described state, and only needs to be a state in which the multi-access PDN connection has been established through the access network B and the single-access PDN connection has been established through the access network A, for example.

1.5. Additional Attach Procedure

An additional Attach procedure will be described below. The Operation mode of the first PDN connection being the Network-initiated mode refers to, in other words, flow switching and/or update of the Routing Rule of the PDN connection initiated by the UE 10 being not possible. In contrast, the PDN connectivity procedure and/or the Attach procedure is initiated by the UE 10.

Note that the Routing Rule may be information for selecting a transfer path or bearer through which user data is transmitted and/or received based on the TFT held by the UE 10. More specifically, the Routing Rule may be information in which the TFT and the transfer path or bearer are associated with each other.

As described above, the second state is a state in which the UE 10 establishes the first PDN connection only through the access network B. That is, the transfer path through the LTE access network is not included in the first PDN connection. Note that the transfer path may be a bearer and/or a communication path.

Therefore, when the first PDN connection in the second state is in the Network-initiated mode, the network and/or the PCRF 60 cannot include the transfer path through the access network A in the first PDN connection.

Therefore, based on the state transition to the second state and the fact that the Operation mode is the Network-initiated mode, the UE 10 may perform a procedure for establishing the transfer path through the access network A.

Moreover, also in a case that the Operation mode of the first PDN connection in the first state and/or the second state is the UE-initiated mode, the UE 10 may perform a procedure for establishing the transfer path through the access network A. based on the Routing Rule stored in the UE 10.

Specifically, the UE 10 may perform the procedure for adding a transfer path through the access network A to the first PDN connection in a case that the Routing Rule of the first PDN connection indicates priority to an LTE access.

More specifically, the UE 10 may perform the procedure for adding a transfer path through the access network A, in a case that the UE 10 stores the Routing Rule in which a specific flow and an LTE access are associated with each other for the first PDN connection.

In other words, the UE 10 does not perform the procedure for adding a transfer path through the access network A to the first PDN connection in a case that the Routing Rule of the first PDN connection does not indicate priority to an LTE access.

More specifically, the UE 10 does not perform the procedure for adding a transfer path through the access network A in a case that the UE 10 does not store the Routing Rule in which a specific flow and an LTE access are associated with each other for the first PDN connection.

Hereinafter, details of the procedure will be described.

1.5.1. Example of First Additional Attach Procedure

Figure 17:
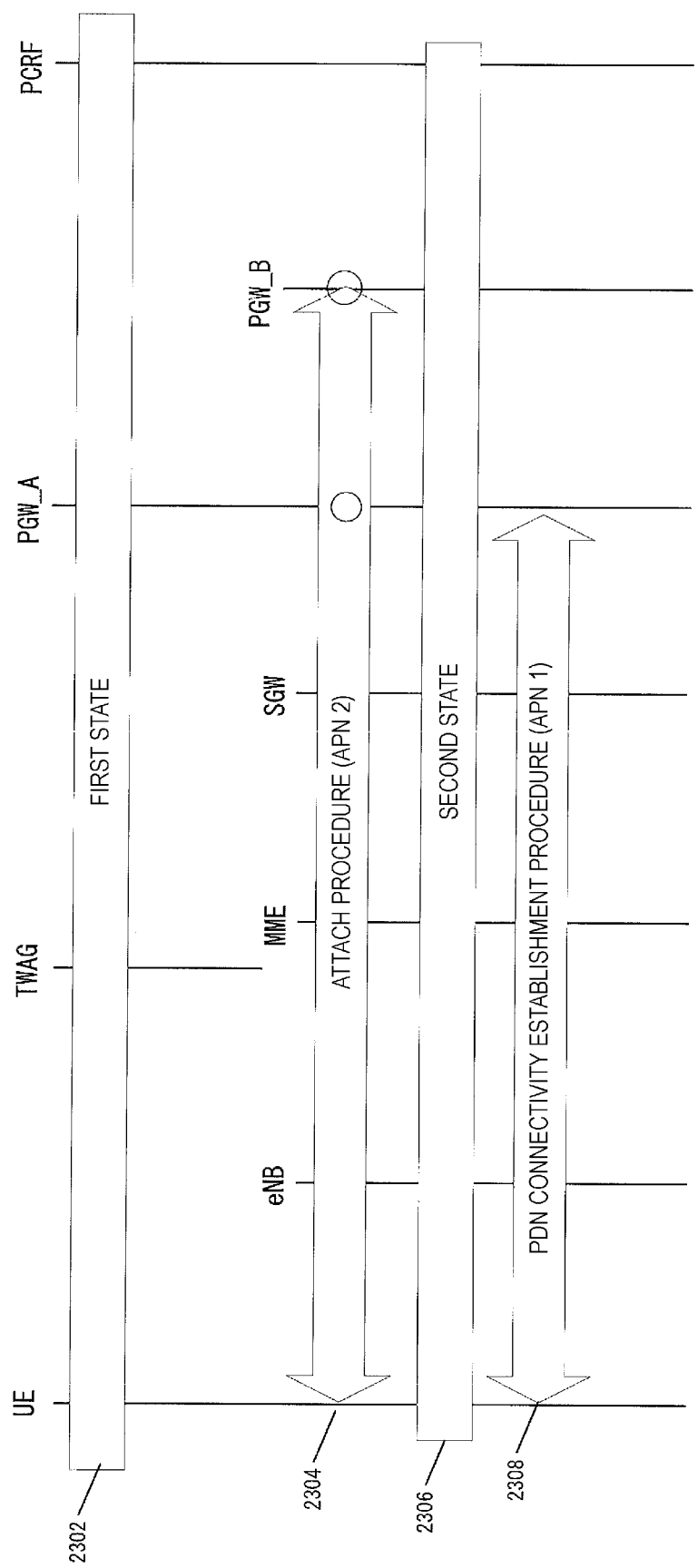
FIG. 17 is a diagram illustrating a first additional Attach procedure.

Next, an example of a first additional Attach procedure will be described with reference to FIG. 17. As illustrated in FIG. 17, the initial state of the present example of procedure is first state (S2302). Note that the procedure for changing the state to the first state may be similar to the procedure described above, therefore the detailed description will be omitted.

In the first state, the UE 10 only needs to have established the first PDN connection with the PGW 30 and/or the network through the access network A. Specifically, the first state is a state in which the UE 10 establishes the first PDN connection, through the TWAG 74, with the PGW_A selected using the APN 1. Note that the first PDN connection may be the multi-access PDN connection.

The UE 10 performs the Attach procedure through the access network A upon transition to the first state and establishment of the first PDN connection in the Network-initiated mode (S2304).

The UE 10 may perform the Attach procedure through the access network A based on transition to the first state in which the first PDN connection in the UE-initiated mode is established and based on the Routing Rule.

Specifically, based on the Routing Rule giving priority to an LTE access, the UE 10 may perform the Attach procedure through the access network A.

Specifically, the UE 10 may perform the Attach procedure through the access network A in a case that the state is changed to the first state in which the first PDN connection in the UE-initiated mode is established and the Routing Rule of the first PDN connection indicates priority to an LTE access.

More specifically, the UE 10 may perform the Attach procedure through the access network A in a case that the state is changed to the first state in which the first PDN connection in the UE-initiated mode is established and the UE 10 stores the Routing Rule in which a specific flow and an LTE access are associated with each other for the first PDN connection.

In other words, the UE 10 does not perform the Attach procedure through the access network A in a case that the Routing Rule of the first PDN connection does not indicate priority to an LTE access, even if the state is changed to the first state in which the first PDN connection in the UE-initiated mode is established.

More specifically, the UE 10 does not perform the Attach procedure through the access network A in a case that the UE 10 does not store the Routing Rule in which a specific flow and an LTE access are associated with each other for the first PDN connection, even if the state is changed to the first state in which the first PDN connection in the UE-initiated mode is established.

Note that the UE 10 may transmit the Attach Request including at least the APN and/or the PDN connection ID.

The APN may be an APN, to which the UE 10 requests a connection. More specifically, the APN may be the APN 2. The UE 10 may include the APN 2 in order to establish the single-access PDN connection. Here, the APN 2 may be an APN that is not allowed to establish the multi-access PDN connection and/or an APN that is not allowed to perform communication based on the NBIFOM.

That is, the UE 10 may request establishment of a single access PDN connection, using different APN 2 from the APN 1 acquired from the network when establishing the first PDN connection.

Furthermore, the PDN connection ID may be an ID assigned when the PGW 30 establishes the PDN connection in the PDN connectivity procedure, or may be information for uniquely identifying the PDN connection that the UE 10 establishes with the PGW 30.

Note that in the Attach procedure, the UE 10 performs authentication and security association procedure with the MME 40 and the PGW_A and the PGW_B.

In addition, the UE 10 may acquire an APN from the network in response to the Attach procedure complete.

The APN may be an APN, to which the UE 10 requests a connection. More specifically, the APN may be the APN 2. The UE 10 may include the APN 2 in order to establish the single-access PDN connection. Here, the APN 2 may be an APN that is not allowed to establish the multi-access PDN connection and/or an APN that is not allowed to perform communication based on the NBIFOM.

That is, the UE 10 may establish a single access PDN connection, using different APN 2 from the APN 1 acquired from the network in response to establishment of the first PDN connection.

Through above procedures, the UE 10 and the core network 90 changes their states from the first state to the second state (S2306).

Next, the UE 10 performs the PDN connectivity procedure through the access network A upon transition to the second state and establishment of the first PDN connection in the Network-initiated mode (S2308).

Alternatively, the UE 10 performs the PDN connectivity procedure through the access network A, upon transition to the second state and based on the Routing Rule of the first PDN connection established in the UE-Initiated mode.

Specifically, based on the Routing Rule giving priority to an LTE access, the UE 10 may perform the Attach procedure through the access network A.

Specifically, the UE 10 may perform the procedure for adding a transfer path through the access network A to the first PDN connection in a case that the state is changed to the second state in which the first PDN connection in the UE-initiated mode is established and the Routing Rule of the first PDN connection indicates priority to an LTE access.

More specifically, the UE 10 may perform the procedure for adding a transfer path through the access network A in a case that the state is changed to the second state in which the first PDN connection in the UE-initiated mode is established and the UE 10 stores the Routing Rule in which a specific flow and an LTE access are associated with each other for the first PDN connection.

In other words, the UE 10 may not perform the procedure for adding a transfer path through the access network A to the first PDN connection in a case that the Routing Rule of the first PDN connection does not indicate priority to an LTE access, even when the state is changed to the second state in which the first PDN connection in the UE-initiated mode is established.

More specifically, the UE 10 does not perform the procedure for adding a transfer path through the access network A in a case that the UE 10 does not store the Routing Rule in which a specific flow and an LTE access are associated with each other for the first PDN connection, even when the state is changed to the second state in which the first PDN connection in the UE-initiated mode is established.

Figure 18:
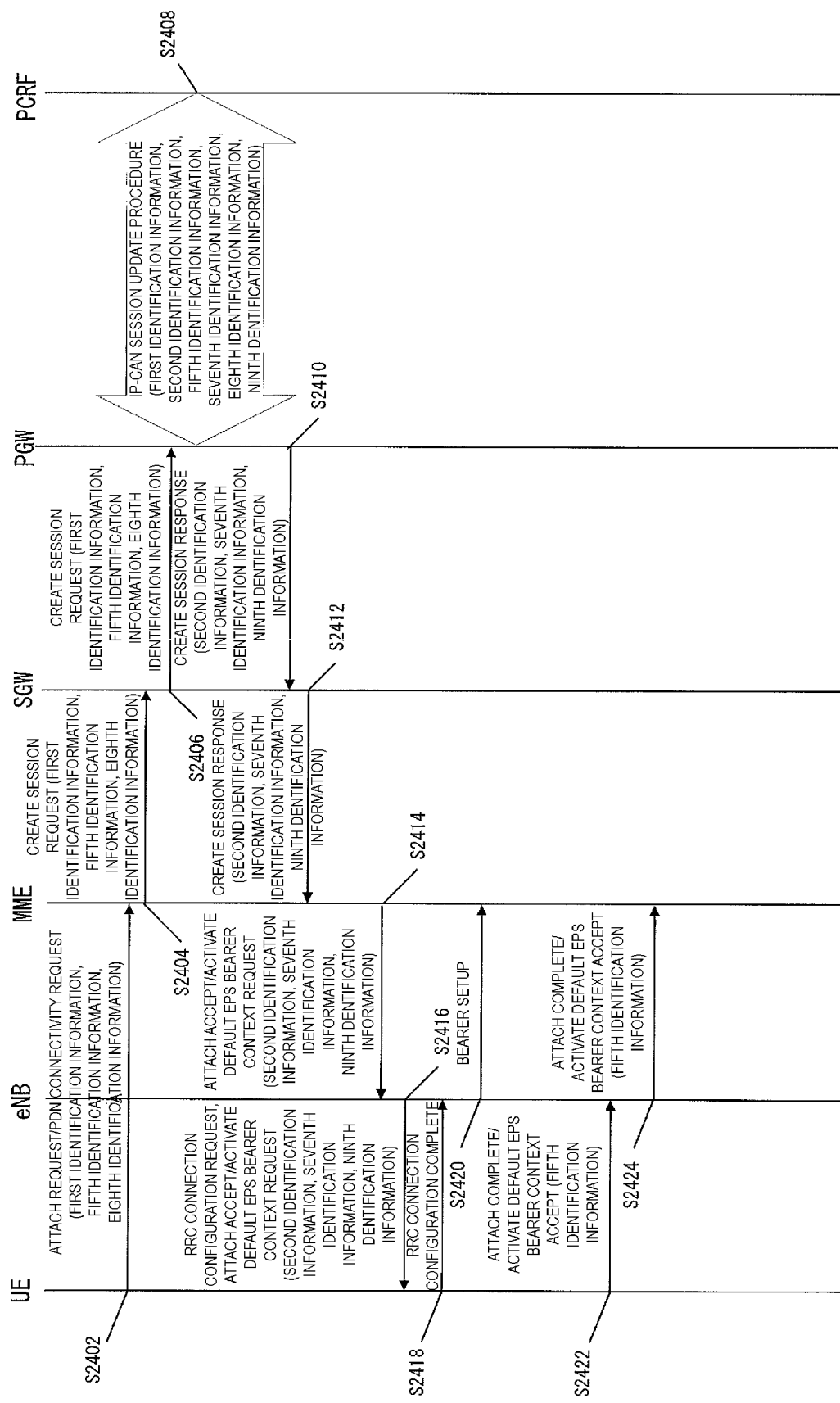
FIG. 18 is a diagram illustrating a PDN connectivity procedure.

A PDN connectivity procedure through an access network A will be described with reference to FIG. 18.

The UE 10 first transmits a PDN connectivity request to the MME 40 via the eNodeB 45 (S2402). The UE 10 may transmit the PDN connectivity request including at least the PDN connectivity request message identity (PDN connectivity request message ID), the Procedure transaction identity (procedure transaction ID), the Request type, the PDN type, the Protocol discriminator, and EPS bearer identity (EPS bearer ID). Furthermore, the UE 10 may include at least first identification information and/or fifth identification information and/or eighth identification information and/or PDN connection ID in the PDN connectivity request. Moreover, the UE 10 may include the access point name (APN) and/or protocol configuration options (PCOs) and/or the traffic flow templates (TFTs) in the PDN connectivity request. Note that the UE 10 may transmit the PCO including the first identification information and/or fifth identification information and/or the eighth identification information and/or the TFT and/or the PDN connection ID.

Here, the first identification information may be the UE NBIFOM capability representing that the UE 10 supports the NBIFOM. Note that the NBIFOM capability may be information indicating the provision of the function of establishing the multi-access PDN connection.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used in the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information. Note that the UE 10 may select the access network indicated by the eighth identification information based on the ISRP, only in a case where the ISRP is valid or active.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information in a case of establishing a new multi-access PDN connection, and may be configured not to transmit the eighth identification information in a case of adding a transfer path in a state in which the default bearer is established for the multi-access PDN connection through the WLAN access network.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1 in order to establish the multi-access PDN connection. Here, the APN 1 may be an APN that is allowed to establish the multi-access PDN connection and/or an APN that is allowed to perform communication based on the NBIFOM. Furthermore, the APN may be identification information identifying the first PDN connection.

The PDN connection ID may be an ID assigned when the PGW 30 establishes the PDN connection in the PDN connectivity procedure, or may be information for uniquely identifying the PDN connection that the UE 10 establishes with the PGW 30. Furthermore, the PDN connection ID may be identification information identifying the first PDN connection The PDN connection ID may be associated with the APN.

Note that the UE 10 may identify the first PDN connection by using the APN and/or the PDN connection ID.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6.

The protocol discriminator may be an identifier representing a protocol type currently used for transmission and/or reception of the PDN connectivity request.

The EPS bearer ID may be information identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information and/or fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection without requesting the certain NBIFOM operation mode, the UE 10 may transmit the PDN connectivity request without including the TFT. More specifically, when the UE 10 includes the first identification information and/or fifth identification information and/or eighth identification information, the UE 10 may transmit the PDN connectivity request without including the TFT.

Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using between the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or fifth identification information and/or eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The MME 40 receives the PDN connectivity request transmitted from the UE 10. Upon the reception of the PDN connectivity request and/or based on the first identification information and/or fifth identification information and/or eighth identification information included in the PDN connectivity request, the MME 40 transmits a Create Session Request to the SGW 35 (S2404).

Upon the reception of the PDN connectivity request and/or based on the first identification information included in the PDN connectivity request, the MME 40 may transmit the Create Session Request including at least the first identification information.

Upon the reception of the PDN connectivity request and/or based on the fifth identification information and/or eighth identification information included in the PDN connectivity request, the MME 40 may transmit the Create Session Request including at least the fifth identification information and/or eighth identification information. Furthermore, the MME 40 may include the TFT in the Create Session Request, upon the reception of the TFT transmitted from the UE 10.

Furthermore, the MME 40 may include the APN and/or PDN connection ID in the Create Session Request, upon the reception of the APN and/or PDN connection ID transmitted from the UE 10. Note that the MME 40 may identify the first PDN connection by using the received APN and/or PDN connection ID.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in a case that none of the first identification information and fifth identification information and/or eighth identification information is included in the PDN connectivity request, the MME 40 may transmit the Create Session Request without including the first identification information and/or fifth identification information and/or eighth identification information. Moreover, in a case that the first identification information and/or fifth identification information and/or eighth identification information is not included in the PDN connectivity request, the MME 40 may perform a procedure for establishing the single-access PDN connection.

The SGW 35 receives the Create Session Request transmitted from the MME 40. Upon the reception of the PDN connectivity request and/or based on the first identification information and/or fifth identification information and/or eighth identification information included in the PDN connectivity request, the SGW 35 transmits the Create Session Request to the PGW 30 (S2406).

Upon the reception of the session connectivity request and/or based on the first identification information and/or fifth identification information and/or eighth identification information included in the session connectivity request, the SGW 35 may transmit the Create Session Request including at least the first identification information and/or fifth identification information and/or eighth identification information. Furthermore, the SGW 35 may include the TFT in the Create Session Request.

Furthermore, the SGW 35 may include the APN and/or PDN connection ID in the Create Session Request, upon the reception of the APN and/or PDN connection ID transmitted from the MME 40. Note that the SGW 35 may identify the first PDN connection by using the received APN and/or PDN connection ID.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in a case that none of the first identification information and the fifth identification information and/or eighth identification information is included in the create session request, the SGW 35 may transmit the Create Session Request without including the first identification information and/or fifth identification information and/or eighth identification information. Moreover, in a case that the first identification information and/or fifth identification information and/or eighth identification information is not included in the PDN connectivity request, the MME 40 may perform a procedure for establishing the single-access PDN connection.

The PGW 30 receives the Create Session Request transmitted from the SGW 35. Upon the reception of the Create Session Request, and/or based on the first identification information and/or fifth identification information and/or eighth identification information included in the Create Session Request, the PGW 30 may perform an IP-CAN session update procedure with the PCRF 60 (S2408).

Upon the reception of the Create Session Request and/or based on the first identification information and/or fifth identification information and/or eighth identification information included in the Create Session Request, the PGW 30 may perform the IP-CAN session update procedure including at least the first identification information and/or fifth identification information and/or eighth identification information.

Furthermore, the PGW 30 may identify the first PDN connection by using the received APN and/or PDN connection ID, upon the reception of the APN and/or PDN connection ID transmitted from the SGW 35.

Note that the PGW 30 may perform the IP-CAN session update procedure to notify the PCRF 60 of information on the UE 10 and/or the eNodeB 45 and/or the MME 40 and/or the SGW 35.

The PGW 30 may transmit, to the PCRF 60, a control message in the IP-CAN session procedure, including information indicating whether the PDN connection to be established is the multi-access PDN connection or the single-access PDN connection, and/or the first identification information and/or fifth identification information and/or eighth identification information.

More specifically, when the multi-access PDN connection is to be established, the PGW 30 transmits, to the PCRF 60, the information indicating the access network A, the PDN connection ID, the information indicating that the PDN connection is the multi-access PDN connection, and the first identification information and/or the fifth identification information and/or the eighth identification information. Alternatively, when the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, upon the reception of the first identification information and/or fifth identification information and/or eighth identification information, the PCRF 60 may transmit, to the PGW 30, a control message in the IP-CAN session update procedure with the PGW 30, the control message including at least the second identification information and/or seventh identification information and/or ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits a Create Session Response to the SGW 35 (S2410).

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits the Create Session Response including at least the second identification information and/or seventh identification information and/or ninth identification information.

Furthermore, the PGW 30 may include the PDN Address and/or the PDN connection ID and/or the TFT and/or the bearer identification information identifying the default bearer in the Create Session Response.

Note that a method by which the PGW 30 acquires the second identification information and/or seventh identification information and/or ninth identification information is not limited to the above-described method for acquiring the seventh identification information from the PCRF 60 in the IP-CAN session update procedure, and another example may be employed. For example, the PGW 30 may create the second identification information and/or seventh identification information and/or ninth identification information and transmit the Create Session Response including the second identification information and/or seventh identification information and/or ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be the Allowed Mode representing the NBIFOM operation mode that is allowed for the multi-access PDN connection to be established. In other words, the seventh identification information may be an operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

On the basis of the Allowed Mode, the PCRF 60 or the PGW 30 may include the allowed operation mode in the seventh identification information.

In other words, when only the Network-Initiated mode is allowed, the PCRF 60 or the PGW 30 may include the Network-Initiated mode in the seventh identification information. Alternatively, when only the UE-Initiated mode is allowed, the PCRF 60 or the PGW 30 may include the UE-Initiated mode in the seventh identification information.

Note that when both the UE-Initiated mode and the Network-Initiated mode are allowed, the seventh identification information may include both the operation modes. Alternatively, when both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, when none of the operation modes is allowed for establishment of the PDN connection, the PCRF 60 may transmit, to the PGW 30, the cause information indicating that the requested operation mode is not allowed.

In a case that none of the operation modes is allowed for establishment of the PDN connection, the PGW 30 need not notify the MME 40 of the seventh identification information via the SGW 35.

In a case that none of the operation modes is allowed for establishment of the PDN connection, the PGW 30 may transmit, to the MME 40 via the SGW 35, the Create Session Response including the cause information indicating that the Requested Operation Mode is not allowed.

In a case that none of the operation modes is allowed for establishment of the PDN connection, the PGW 30 may notify the MME 40 that there is no allowed operation via the SGW 35.

As described above, on the basis of the Allowed Mode, the PCRF 60 or the PGW 30 may regard an operation mode that is allowed for establishment of the PDN connection as the seventh identification information.

Note that when the Network-Initiated mode is not included in the seventh identification information, the PCRF 60 need not transmit the TFT to the PGW 30.

In other words, note that only when the Network-Initiated mode is included in the seventh identification information, the PCRF 60 may transmit the TFT to the PGW 30.

Note that in a case that the Network-Initiated mode is not included in the seventh identification information, the PGW 30 need not transmit the TFT to the MME 40 via the SGW 35. Thus, in this case, the PGW 30 need not include either the TFT or the PDN address in the Create Session Response.

Note that, in other words, only in a case that the Network-Initiated mode is included in the seventh identification information, the PGW 30 may transmit the TFT to the MME 40 via the SGW 35. Thus, in this case, the PGW 30 may include the TFT and the PDN address (PDN Address) in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and not to transmit the ninth identification information when adding a transfer path in a state in which the default bearer is established for the multi-access PDN connection through the LTE access network.

The SGW 35 receives the Create Session Response transmitted from the PGW 30. Upon the reception of the Create Session Response and/or based on the second identification information and/or seventh identification information and/or ninth identification information included in the Create Session Response, the SGW 35 transmits the Create Session Response to the MME 40 (S2412).

Upon the reception of the Create Session Response and/or based on the second identification information and/or seventh identification information and/or ninth identification information included in the Create Session Response, the SGW 35 may transmit the Create Session Response including at least the second identification information and/or seventh identification information and/or ninth identification information.

Furthermore, the SGW 35 may include the PDN Address and/or the PDN connection ID and/or the TFT in the Request Session Response.

The MME 40 receives the Create Session Response transmitted from the SGW 35. Upon the reception of the Create Session Response and/or based on the second identification information and/or seventh identification information and/or ninth identification information included in the Create Session Response, the MME 40 transmit the Activate default EPS bearer context request to the eNodeB 45 (S2414).

Upon the reception of the Create Session Response and/or based on the second identification information and/or seventh identification information and/or ninth identification information included in the Create Session Response, the MME 40 may transmit at least an Activate default EPS bearer context request message identity (Activate default EPS bearer context request message ID), a Procedure transaction ID, an APN, a PDN Address, a protocol discriminator, an EPS bearer ID, and EPS QoS included in the Activate default EPS bearer context request. Upon the reception of the Create Session Response and/or based on the second identification information and/or seventh identification information and/or ninth identification information included in the Create Session Response, the MME 40 may further include at least the second identification information and/or seventh identification information and/or ninth identification information in the Activate default EPS bearer context request. Moreover, the MME 40 may include the PCO and/or the ESM Cause and/or the TFT and/or the bearer identification information identifying the default bearer, and/or the PDN connection ID and/or the PDN connection attribute information, in the Activate default EPS bearer context request. Note that the MME 40 may transmit the PCO including the second identification information and/or seventh identification information and/or ninth identification information and/or the TFT and/or the bearer identification information identifying the default bearer and/or the PDN connection ID.

Here, the Activate default EPS bearer context request message ID may be a message type representing the Activate default EPS bearer context request message.

The APN may be an APN, to which the UE 10 is allowed to connect. More specifically, the APN may be the APN 1. The APN 1 may be an APN that is allowed to establish the multi-access PDN connection. The MME 40 may include the APN 1 in the Activate default EPS bearer context request.

The PDN address may be an IP address assigned to the UE 10. For example, the PDN address may be an IPv4 address, or an interface ID for constituting an IPv6 address.

The EPS QoS may indicate a state representing QoS of an EPS bearer.

The PDN connection attribute information may be information indicating that the PDN connection established in the present PDN connectivity procedure is the multi-access PDN connection, and/or information indicating that user data transmitted and/or received by using the PDN connection established in the PDN connection the present PDN connectivity procedure is allowed to be transmitted and/or received through the access network A and the access network B, and/or information indicating that the PDN connection established in the present PDN connectivity procedure is the multi-access PDN connection of the operation mode indicated by the seventh identification information.

Note that the UE 10 may transmit the Activate default EPS bearer context request message that further includes the connectivity type indicating the type of the PDN connection and/or the WLAN offload permission information (WLAN offload acceptablity) indicating whether the WLAN offload can be performed. Furthermore, the MME 40 may transmit the connectivity type or the WLAN offload permission information including the PDN connection attribute information.

ESM Cause may be information representing that the PDN type of the PDN address assigned to the UE 10 is different from the PDN type requested by the UE 10 in the PDN connectivity request.

Note that the MME 40 and/or the PGW 30 may include the second identification information and/or the seventh identification information and/or the ninth identification information in the PCO. However, in a case where the MME 40 and/or the PGW 30 includes the second identification information and/or the seventh identification information and/or the ninth identification information in the PCO, the MME 40 and/or the PGW 30 does not include the IFOM support. In contrast, in a case where the MME 40 and/or the PGW 30 includes the IFOM support in the PCO, the MME 40 and/or the PGW 30 does not include the second identification information and/or the seventh identification information and/or the ninth identification information. As described above, it may be possible to not configure both the second identification information and/or seventh identification information and/or ninth identification information and the IFOM support to be effective to ensure a clear distinction between the use of the switching of the communication path based on the NBIFOM and the use of the switching of the communication path based on the IFOM.

The eNodeB 45 receives the Activate default EPS bearer context request transmitted from the MME 40. Upon the reception of the Activate default EPS bearer context request, the eNodeB 45 transfers the Activate default EPS bearer context request to the UE 10.

The eNodeB 45 may transmit at least an RRC connection configuration request (RRC Connection Reconfiguration) to the UE 10 with an Activate default EPS bearer context request (S2416).

The UE 10 receives the RRC connection configuration request transmitted from the eNodeB 45. Furthermore, the UE 10 receives the Activate default EPS bearer context request transmitted from the MME 40 and transferred by the eNodeB 45.

Upon the reception of the RRC connection configuration request, the UE 10 transmits the RRC connection configuration complete (RRC Connection Reconfiguration Complete) to the eNodeB 45 (S2418).

The eNodeB 45 receives the RRC connection configuration complete transmitted from the UE 10. The eNodeB 45 transmits bearer configuration to the MME 40 in response to the RRC connection configuration complete.

The MME 40 receives the bearer configuration transmitted from the eNodeB 45 (S2420).

Upon the reception of the Activate default EPS bearer context request and/or based on the second identification information and/or seventh identification information and/or ninth identification information included in the Activate default EPS bearer context request, the UE 10 transmits an Activate default EPS bearer context accept or an Activate default EPS bearer context reject to the MME 40 (S2422) (S2424).

The UE 10 may transmit at least an Activate default EPS bearer context accept message identity (Activate default EPS bearer context accept message ID), a procedure transaction ID, a protocol discriminator, and an EPS bearer ID included in the Activate default EPS bearer context accept.

The UE 10 may transmit at least an Activate default EPS bearer context reject message identity (Activate default EPS bearer context reject message ID), a Procedure transaction ID, a protocol discriminator, an EPS bearer ID, and an ESM Cause included in the Activate default EPS bearer context reject.

Furthermore, the UE 10 may include the PCO in the Activate default EPS bearer context accept and/or the Activate default EPS bearer context reject.

Furthermore, in a case that multiple INFOM operation modes are included in the seventh identification information, the UE 10 may include at least the fifth identification information in the Activate default EPS bearer context accept and/or the Activate default EPS bearer context reject. In other words, when multiple INFOM operation modes are allowed, the UE 10 may select one of the allowed modes and transmit the fifth identification information including the selected mode.

Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, in a case that the UE-Initiated mode and the Network-Initiated mode are included in the seventh identification information included in the Activate default EPS bearer context request, the UE 10 may include the UE-Initiated mode or the Network-Initiated mode in the fifth identification information.

Which of the UE-Initiated mode and the Network-Initiated mode is to be included in the fifth identification information may be determined based on the UE policy. Note that the UE policy may be any information configured for the UE 10. For example, the UE policy may be information configured by a user.

Here, the Activate default EPS bearer context accept message ID may be a message type representing the Activate default EPS bearer context accept message.

The Activate default EPS bearer context reject message ID may be a message type representing the Activate default EPS bearer context reject message.

The ESM Cause may be information representing a reason of rejecting the Activate default EPS bearer context request.

Thus, the UE 10 completes the additional Attach procedure.

That is, the UE 10 can establish an additional transfer path through the LTE access network A, based on the transition to the first state and based on the Operation mode of the first PDN connection.

Specifically, the UE 10 can perform the Attach procedure and the PDN connectivity procedure on the LTE access network A to establish the additional transfer path via the eNB 45, based on the transition to the first state and based on the fact that the first PDN connection is in the Network-initiated mode. Note that the transfer path may be a bearer and/or a communication path.

More specifically, the UE 10 performs the Attach procedure, establishes the second PDN connection between the PGW_B selected using the APN 2 and the UE 10, and then performs the PDN connectivity procedure, so that a transfer path through the LTE access network can be added to the first PDN connection between the PGW_A selected using the APN 1 and the UE 10. Note that the transfer path may be a bearer and/or a communication path. That is, in the state in which a default bearer through the WLAN is established, a default bearer through the LTE access network for the first PDN connection can be further established.

Alternatively, the UE 10 can perform the Attach procedure and the PDN connectivity procedure on the LTE access network A to establish the additional transfer path via the eNB 45, based on transition to the first state and based on the Routing Rule of the first PDN connection established in the UE-initiated mode. Note that the transfer path may be a bearer and/or a communication path.

Specifically, the UE 10 performs the Attach procedure, establishes the second PDN connection between the PGW_B selected using the APN 2 and the UE 10, and then performs the PDN connectivity procedure, so that a transfer path through the LTE access network can be added to the first PDN connectivity between the PGW_A selected using the APN 1 and the UE 10. Note that the transfer path may be a bearer and/or a communication path.

Furthermore, the UE 10 can establish an additional transfer path through the LTE access network A, based on the transition to the second state and based on the Operation mode of the first PDN connection.

Specifically, the UE 10 can perform the PDN connectivity procedure on the LTE access network A to establish the additional transfer path via the eNB 45, based on the transition to the second state and based on the fact that the first PDN connection is in the Network-initiated mode. Note that the transfer path may be a bearer and/or a communication path.

More specifically, the UE 10 performs the PDN connectivity procedure, so that a transfer path through the LTE access network can be added to the first PDN connectivity between the PGW_A selected using the APN 1 and the UE 10. Note that the transfer path may be a bearer and/or a communication path.

Alternatively, the UE 10 can perform the PDN connectivity procedure on the LTE access network A to establish the additional transfer path via the eNB 45, based on transition to the second state and based on the Routing Rule of the first PDN connection established in the UE-initiated mode. Note that the transfer path may be a bearer and/or a communication path.

Specifically, the UE 10 performs the PDN connectivity procedure, so that a transfer path through the LTE access network can be added to the first PDN connectivity between the PGW_A selected using the APN 1 and the UE 10. Note that the transfer path may be a bearer and/or a communication path.

In this way, with respect to the first PDN connection, the UE 10 and the PGW 30 establish a new default bearer. The UE 10 and the PGW 30 store the identification information of the default bearer established in the PDN connectivity procedure and the information identifying the LTE access network in association with each other, in response to completion of the PDN connectivity procedure through the LTE access network. Furthermore, the information identifying the LTE access network may be information indicating a 3GPP access or information indicating an E-UTRAN access.

Note that the UE 10 performs data transmission and/or reception using the default bearer when the UE 10 does not receive the TFT or transmits and/or receives the user data not matching the held TFT. When multiple default bearers are established, the UE 10 is capable of selecting a default bearer for transmitting and/or receiving data based on the default access, and is capable of transmitting and/or receiving data by using the selected default bearer.

Here, the default access may be default access indicated by the ninth identification information. In a case where the UE 10 does not receive the ninth identification information at the time of establishing the second default bearer for the first PDN connection, the UE 10 may select the default access based on the ninth identification information received at the time of establishing the first default bearer for the first PDN connection, and transmit and/or receive data using the selected default bearer.

Furthermore, the PGW 30 performs data transmission and/or reception using the default bearer when the PGW 30 does not receive the TFT or transmits and/or receives the user data not matching the held TFT. When the PGW 30 establishes multiple default bearers with the UE 10, the PGW 30 is capable of selecting a default bearer for transmitting and/or receiving data based on the default access, and is capable of transmitting and/or receiving data by using the selected default bearer. Here, the default access may be default access indicated by the ninth identification information.

Here, the default access may be default access indicated by the ninth identification information. In a case where the PGW 30 does not transmit the ninth identification information at the time of establishing the second default bearer for the first PDN connection, the PGW 30 may select the default access based on the ninth identification information transmitted at the time of establishing the first default bearer for the first PDN connection, and transmit and/or receive data using the selected default bearer.

In this way, in a case where the UE 10 and the PGE 30 are capable of acquiring the default access in the state where the second default bearer is not established, the PDN connectivity establishment procedure for establishing the second unnecessary default bearer is eliminated. For example, in a case that the communication path through the LTE access network is established by the additional PDN connection procedure, there may be a case in which no user data that selects the communication path through the LTE access network exists, and the communication path is not used, depending on the Routing Rule based on the TFT or the like. Learning a default access beforehand eliminates the establishment of such an unnecessary communication path between the UE 10 and the PGW 30, and therefore reduces transmission and/or reception of control messages for unnecessary communication path establishment, consumption of the resources for the communication path, and the like.

In this way, if the UE 10 and the PGE 30 can acquire the default access in the state where the second default bearer is not established, the UE 10 can determine whether performing the PDN connection establishment procedure for establishing a new default bearer for the multi-access PDN connection based on the information on the default access, when the UE 10 is newly located in a serving area of an LTE access network.

For example, in a case that the default access indicates a WLAN network, the multi-access access PDN connection is in the UE-Initiated mode, and the Routing Rule does not include user data to which priority is given to communicate by the communication path through the LTE, it is not necessary to immediately perform the additional transfer path establishment procedure for establishing the default bearer through the LTE.

2. Second Embodiment

Hereinafter, a radio communication technology according to an embodiment of the present invention will be described in detail with reference to the drawings.

2.1. System Overview

The mobile communication system in the present embodiment may be similar to that in the first embodiment. Therefore, the overview of the mobile communication system is similar to the mobile communication system described in Chapter 2.1 of the first embodiment with reference to FIG. 1, and detailed description is omitted.

In the present embodiment, the UE 10 is capable of establishing a first PDN connection and/or a second PDN connection.

Furthermore, in the present embodiment, the NBIFOM is a technology that allows establishment of a multi-access PDN connection.

Furthermore, in the present embodiment, the multi-access PDN connection denotes a PDN connection capable of accommodating, in one PDN connection, a transfer path and/or a bearer over a 3GPP access and/or a WLAN access. In other words, the multi-access PDN connection can accommodate a transfer path through the 3GPP access and a transfer path through the WLAN access in combination. Note that the multi-access PDN connection may be a PDN connection accommodating only a bearer through the 3GPP access or may be a PDN connection accommodating only a transfer path through the WLAN access. In other words, the multi-access PDN connection denotes a PDN connection capable of constituting one or multiple transfer paths.

Note that in the present embodiment, unlike the first embodiment, the multi-access PDN connection may be a PDN connection established based on the NBIFOM or a PDN connection established based on the IP Flow Mobility (IFOM). Thus, in the present embodiment, the multi-access PDN connection may be either the multi-access PDN connection corresponding to the PDN connection in which a transfer path of a certain flow is selectable based on the NBIFOM or the multi-access PDN connection corresponding to the PDN connection in which a transfer path of a certain flow is selectable based on the IFOM.

Note that the IFOM is a technology for switching a communication path of a certain IP flow by using the Dual Stack Mobile IPv6 (DSMIPv6) protocol. On the other hand, the NBIFOM is a technology for switching a communication path of a certain IP flow by using a network-based mobility management protocol such as a general packet radio system tunneling protocol (GTP) and a proxy mobile IP (PMIP). Furthermore, the first PDN connection may be the above-described multi-access PDN connection.

In detail, the first PDN connection is a PDN connection in which, as one PDN connection, a communication path EPS bearer through the access network A and a communication path including a GTP/PMIPv6 tunnel through the access network B can be used. That is, such a PDN connection enables transmission and/or reception of data through the 3GPP access, the WLAN access, or both thereof. The first PDN connection may be the multi-access PDN connection.

Furthermore, the second PDN connection may be a known PDN connection, rather than the multi-access PDN connection. Note that the second PDN connection may be a single-access PDN connection.

Here, the single-access PDN connection refers to one PDN connection constituted of only a transfer path through either the 3GPP access or the WLAN access, unlike the multi-access PDN connection. In detail, the single-access PDN connection is a PDN connection established by the attach in the related art.

That is, the second PDN connection is a PDN connection including the EPS bearer through the access network A or a PDN connection including the GTP/PMIPv6 transfer path through the access network B. The second PDN connection accommodates a transfer path and/or a communication path through either one of the access networks.

As described above, the single-access PDN connection is a PDN connection different from the multi-access PDN connection. Moreover, the single-access PDN connection denotes a PDN connection that is also different from a PDN connection for a Local IP Access (LIPA). Here, the LIPA denotes communication control for offloading the connection to a home network. More specifically, the base station to which the terminal device connects performs the offload by transmitting, to the home network to which the base station connects, user data that is conventionally delivered via the core network 90. The PDN connection for the LIPA is a PDN connection for performing such communication based on the LIPA.

Next, an example of a configuration of the core network 90 will be described. FIG. 2A illustrates an example of a configuration of the IP mobile communication network. As illustrated in FIG. 2A, the core network 90 includes a Home Subscriber Server (HSS) 50, an Authentication, Authorization, Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 is capable of connecting to multiple radio access networks (an LTE AN 80, a WLAN ANb 75, a WLAN ANa 70, a UTRAN 20, and a GERAN 25).

Such a radio access network may be constituted of multiple different access networks, or may be constituted of either one of the access networks. Moreover, the UE 10 is capable of connecting wirelessly to the radio access network.

Moreover, a WLAN Access Network b (WLAN ANb 75) that connects to the core network 90 via the ePDG 65 and a WLAN Access Network a (WLAN ANa 75) that connects to the PGW 30, the PCRF 60, and the AAA 55 can be configured as access networks to be connectable in a WLAN access system.

Note that the devices have a similar configuration to those of the devices in the related art in a mobile communication system using EPS, and thus detailed descriptions will be omitted. The devices will be described briefly, hereinafter.

The PGW 30 is connected to the PDN 100, the SGW 35, the ePDG 65, the WLAN ANa 70, the PCRF 60, and the AAA 55, and serves as a relay device configured to transfer user data by functioning as a gateway device between the PDN 100 and the core network 90.

The SGW 35 is connected to the PGW 30, the MME 40, the LTE AN 80, the SGSN 45, and the UTRAN 20, and serves as a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 50, and serves as an access control device configured to perform location information management and access control for the UE 10 via the LTE AN 80. Furthermore, the core network 90 may include multiple location management devices. For example, a location management device different from the MME 40 may be constituted. Like the MME 40, the location management device different from the MME 40 may be connected to the SGW 35, the LTE AN 80, and the HSS 50.

Furthermore, when multiple MMEs 40 are included in the core network 90, the MMEs 40 may be connected to each other. With this configuration, the context of the UE 10 may be transmitted and/or received among the MMEs 40.

The HSS 50 is connected to the MME 40 and the AAA 55, and serves as a managing node configured to manage subscriber information. The subscriber information of the HSS 50 is referenced, for example, in the access control for the MME 40. Moreover, the HSS 50 may be connected to the location management device different from the MME 40.

The AAA 55 is connected to the PGW 30, the HSS 50, the PCRF 60, and the WLAN ANa 70 and is configured to perform access control for the UE 10 connected via the WLAN ANa 70.

The PCRF 60 is connected to the PGW 30, the WLAN ANa 75, the AAA 55, and the PDN 100, and is configured to perform QoS management on data delivery. For example, the PCRF 60 manages QoS of a communication path between the UE 10 and the PDN 100.

The ePDG 65 is connected to the PGW 30 and the WLAN ANb 75, and is configured to deliver user data by functioning as a gateway device between the core network 90 and the WLAN ANb 75.

The SGSN 45 is connected to the UTRAN 20, the GERAN 25, and the SGW 35, and serves as a control device for location management between a 3G/2G access network (UTRAN/GERAN) and the LTE access network (E-UTRAN). In addition, the SGSN 45 has a function of selecting the PGW 30 and the SGW 35, a function of managing a time zone of the UE 10; and a function of selecting the MME 40 at the time of handover to the E-UTRAN.

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, an LTE AN 80 includes an eNB 45. The eNB 45 is a radio base station to which the UE 10 connects in an LTE access system, and the LTE AN 80 may include one or multiple radio base stations.

The WLAN ANa 70 includes a WLAN APa 72 and the TWAG 74. The WLAN APa 72 is a radio base station to which the UE 10 connects in the WLAN access system trusted by the operator running the core network 90, and the WLAN ANa 70 may include one or multiple radio base stations. The GW 74 is a gateway device between the core network 90 and the WLAN ANa 70. Furthermore, the WLAN APa 72 and the GW 74 may be constituted as a single device.

Even in a case where the operator running the core network 90 and the operator running the WLAN ANa 70 are different from each other, such a configuration can be implemented through contracts and agreements between the operators.

Furthermore, the WLAN ANb 75 includes a WLAN APb 76. The WLAN APb 76 serves as a radio base station to which the UE 10 connects in the WLAN access system, in a case where no trusting relationship is established with the operator running the core network 90, and the WLAN ANb 75 may include one or multiple radio base stations.

In this manner, the WLAN ANb 75 is connected to the core network 90 via the ePDG 65, which is a device included in the core network 90, serving as a gateway. The ePDG 65 has a security function for ensuring communication security.

The UTRAN 20 includes a radio network controller (RNC) 24 and an eNB (UTRAN) 22. The eNB (UTRAN) 22 is a radio base station to which the UE 10 connects through a UMTS Terrestrial Radio Access (UTRA), and the UTRAN 20 may include one or multiple radio base stations. Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22. In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through GSM/EDGE radio access (GERA), and the GERAN 25 may be constituted of one or multiple radio base station BSSs. Furthermore, the multiple BSSs may be connected to each other. Moreover, the BSS 26 may be connected to the RNC 24.

Note that in the present specification, the UE 10 being connected to each radio access network refers to the UE 10 being connected to a base station device, an access point, or the like included in each radio access network, and data, signals, and the like being transmitted and/or received also traverse those base station devices, access points, or the like.

2.2. Device Configuration

The configuration of each device will be described below.

2.2.1. TWAG Configuration

FIG. 3 illustrates a device configuration of the TWAG 74. As illustrated in FIG. 3, the TWAG 74 is constituted of an IP mobile communication network interface unit 320, a control unit 300, and a storage 340. The IP mobile communication network interface unit 320 and the storage 340 are connected to the control unit 300 via a bus.

The control unit 300 serves as a function unit for controlling the TWAG 74. The control unit 300 implements various processes by reading out and executing various programs stored in the storage 340.

The IP mobile communication network interface unit 320 serves as a data transmission and/or reception unit configured to transmit and/or receive user data and/or a control message, and serves as a function unit through which the TWAG 74 is connected to the PGW 30.

The storage 340 serves as a function unit for storing programs, data, and the like necessary for each operation of the TWAG 74. The storage 340 includes, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4E illustrate the information elements stored in the storage 340. FIG. 4A illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, the NBIFOM capability may be stored in association with the TWAG ID that is the identification information on the TWAG 74. In a case of not being associated with the TWAG ID, the NBIFOM capability may mean a capability of the TWAG 74 to be stored.

If the TWAG ID and the NBIFOM capability are stored in association with each other, the TWAG 74 may store the TWAG capability of multiple TWAGs 74.

In this case, when the UE 10 performs a handover to another TWAG 74, the TWAG 74 may select a TWAG 74 to which the handover is made, based on the TWAG Capability.

Next, the Network capability 344 will be described. FIG. 4B illustrates an example of the Network capability stored in the TWAG 74. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the possession of the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

As illustrated in FIG. 4B, the TWAG 74 stores an NBIFOM capability in association with a PGW ID. Furthermore, as illustrated in FIG. 4B, the NBIFOM capability may be stored in association with each of multiple PGWs 30.

The PGW ID may be any information for identifying the PGW 30, and may be an access point name (APN), for example.

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

FIG. 4C illustrates information elements included in the EPS bearer context for each UE 10. As is obvious from FIG. 4C, the TWAG 74 stores, for each UE 10, a UE NBIFOM capability and an NBIFOM allowed.

The UE NBIFOM capability is the NBIFOM capability of the UE 10. The UE NBIFOM capability is identification information for each UE 10 indicating whether capability of establishing the first PDN connection is supported. In other words, the UE NBIFOM capability is identification information indicating whether the UE 10 supports the NBIFOM function. More specifically, for example, the UE NBIFOM capability may include "allowed" or "Not allowed".

Note that the NBIFOM function may be information indicating the provision of the function of establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the PDN connection of the related art, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2.

The NBIFOM allowed may be stored before the PDN connection is established.

The TWAG 74 may access the HSS 50 to acquire the NBIFOM allowed, before the PDN connection is established and/or while the establishment procedure is being performed.

Furthermore, the EPS bearer context for each UE 10 may include identification information on the UE 10. The identification information of the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be the UE initiated mode.

Furthermore, an Operation mode that allows the network and/or the PGW 30 and/or the PCRF 60 to initiate the communication control may be a Network initiated mode.

The Network allowed mode indicates an Operation mode allowed by the network. The Network allowed mode may include the UE initiated mode, the Network initiated mode, or both thereof.

The User plane connection ID is identification information for identifying a connection used for transmission of user data when the UE 10 establishes a transfer path via the TWAG 74.

The TWAG MAC address is a physical address of the TWAG 74.

The NBIFOM permission is information indicating that this PDN connection has established the multi-access PDN connection based on the NBIFOM. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

The TWAG 74 may access the HSS 50 to acquire the NBIFOM permission during the establishment of the PDN connection. Alternatively, the TWAG 74 may store the NBIFOM Permission on the basis of the establishment of the multi-access PDN connection based on the NBIFOM.

Next, the EPS bearer context for each bearer and/or transfer path will be described. As illustrated in FIG. 4E, the EPS bearer context for each bearer and/or transfer path may include the transfer path identification information and a Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type. Whether using a communication path through the 3GPP access network or using a communication path through the WLAN access network is determined, based on such an association.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the TWAG 74 prestores as a default value.

An IP flow may be switched by including an IP header in the Routing Filter. Alternatively, the flow may be switched for each application by including an application ID in the Routing Filter. Alternatively, the Routing Filter may include the TFT.

The Routingu Rule may store multiple rules. Furthermore, the Routing rule may include priority for each rule.

The TWAG Capability and the Network capability may be included in the EPS bearer context.

2.2.2. HSS Configuration

Next, the configuration of the HSS 50 will be described. FIG. 5 illustrates a device configuration of the HSS 50. As illustrated in FIG. 5, the HSS 50 is constituted of an IP mobile communication network interface unit 520, a control unit 500, and a storage 540. The IP mobile communication network interface unit 520 and the storage 540 are connected to the control unit 500 via a bus.

The control unit 500 serves as a function unit for controlling the HSS 50. The control unit 500 implements various processes by reading out and executing various programs stored in the storage 540.

The IP mobile communication network interface unit 520 serves as a data transmission and/or reception unit configured to transmit and/or receive user data and/or a control message, and also serves as a function unit for connecting the HSS 50 to the MME 40 and/or another MME 40, and the AAA 55.

The storage 540 serves as a function unit for storing programs, data, and the like necessary for each operation of the HSS 50. The storage 540 includes, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements stored in the storage 540. FIG. 6A illustrates an example of HSS data for each UE 10 to be stored in the HSS 50.

As is obvious from FIG. 6A, the HSS data for each UE 10 includes an IMSI, an MSISDN, an IMEI/IMEISV, an Access Restriction, a UE NBIFOM capability, and an NBIFOM allowed.

The IMSI is identification information to be assigned to a user (subscriber) using the UE 10.

The MSISDN represents the phone number of the UE 10.

The IMEI/IMISV is identification information assigned to the UE 10.

The Access Restriction indicates registration information for access restriction.

The UE NBIFOM capability is the NBIFOM capability of the UE 10. The UE NBIFOM capability is identification information for each UE 10 indicating whether capability of establishing the first PDN connection is supported. In other words, the UE NBIFOM capability indicates whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the PDN connection of the related art, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2.

The NBIFOM allowed may be stored before the PDN connection is established.

FIG. 6B illustrates an example of HSS data for each PDN connection stored in the HSS 50. As seen from FIG. 6B, the HSS data for each PDN connection includes at least a Context ID, a PDN address, a PDN Type, an Access Point Name (APN), a WLAN offlaod ability, a PDN GW ID, and an NBIFOM Permission.

The Context ID is identification information of the context storing the HSS data for each PDN connection.

The PDN Address represents a registered IP address. The PDN Address is an IP address of the UE 10.

The PDN Type indicates the type of PDN Address. That is, the PDN Type is identification information for identifying IPv4, IPv6, or IPv4v6, for example.

The APN is a label indicating an access destination in the network, in accordance with the DNS naming convention.

The WLAN offload ability is identification information indicating whether traffic connected through the APN can be offloaded to the WLAN by utilizing a cooperative function between the WLAN and the 3GPP, or the 3GPP connection is maintained. The WLAN offload ability may vary for each RAT type. Specifically, the LTE (E-UTRA) and the 3G (UTRA) may have different WLAN offload ability.

The PDN GW identity is identification information for identifying the PGW 30 utilized in this APN. This identification information may be a Fully Qualified Domain Name (FQDN) or an IP address.

The NBIFOM permission is information indicating that the PDN connection has established the multi-access PDN connection based on the NBIFOM. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

Specifically, for example, the HSS data for each PDN connection including the APN 1 may include the NBIFOM permission, and the HSS data for each PDN connection including the APN 2 need not include the NBIFOM Permission.

In other words, the PDN connection based on the APN 1 may be the first PDN connection, and the PDN connection based on the APN 2 cannot be the first PDN connection.

2.2.3. UE Configuration

Next, the configuration of the UE 10 will be described. FIG. 7 illustrates a device configuration of the UE 10. As illustrated in FIG. 7, the UE 10 is constituted of an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 serves as a function unit for controlling the UE 10. The control unit 700 implements various processes by reading out and executing various programs stored in the storage 750.

The LTE interface unit 720 serves as a data transmission and/or reception unit configured to transmit and/or receive user data and/or a control message, and also serves as a function unit through which the UE 10 connects to an IP access network via an LTE base station. Furthermore, an external antenna 710 is connected to the LTE interface unit 720.

The WLAN interface unit 740 serves as a data transmission and/or reception unit configured to transmit and/or receive user data and/or a control message, and also serves as a function unit through which the UE 10 connects to a WLAN AP and connects to the IP access network. Furthermore, an external antenna 730 is connected to the WLAN interface unit 740.

The control unit 700 serves as a function unit for controlling the UE 10. The control unit 700 implements various processes by reading out and executing various programs stored in the storage 750.

The storage 750 is a function unit for storing programs, data, and the like necessary for each operation of the UE 10. The storage 750 is configured with, for example, a semiconductor memory, a Hard Disk Drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability.

The IMSI is identification information to be assigned to a user (subscriber) using the UE 10.

The EMM State indicates a mobility management state of the UE 10. For example, the EMM State may be EMM-REGISTERED in which the UE 10 is registered with the network (registered state) or EMM-REREGISTERED in which the UE 10 is not registered with the network (reregistered state).

The GUTI is an abbreviation of "Globally Unique Temporary Identity," and is temporary identification information of the UE 10. The GUTI is configured with identification information of the MME 40 (Globally Unique MME Identifier (GUMMEI)) and identification information of the UE 10 in a specific MME 40 (M-TMSI).

The ME identity is an ID of an ME, and may be the IMEI/IMISV, for example.

The UE NBIFOM capability is the NBIFOM capability of the UE 10. The UE NBIFOM capability is identification information for each UE 10 indicating whether capability of establishing the first PDN connection is supported. In other words, the UE NBIFOM capability is identification information for each UE 10 indicating whether the NBIFOM function is supported. More specifically, for example, the NBIFOM capability may include "allowed" or "Not allowed".

Note that the NBIFOM function may be information indicating the provision of the function of establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability in the storage of the UE 10 may mean that the UE 10 has the function of establishing the first PDN connection.

In other words, the UE NBIFOM capability may be identification information indicating that the UE 10 supports the NBIFOM function. That is, the existence of the UE NBIFOM capability in the storage of the UE 10 may mean that the UE 10 supports the NBIFOM function.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UE allowed mode, and an Operation mode.

The PDN connection ID is identification information for identifying a PDN connection. The UE 10, the TWAG 74, and the PGW 30 may store the same identification information.

The APN in Use is an APN utilized by the UE 10 most recently. This APN may include identification information of the network and identification information of a default operator.

The IP Address is an IP address assigned to the UE 10 through the PDN connection, and may be an IPv4 address or an IPv6 prefix.

The Default Bearer is EPS bearer identification information for identifying a default bearer in this PDN connection.

Note that the UE 10 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the UE 10 may manage a default bearer and an access network in association with each other.

Specifically, the UE 10 may store the EPS bearer identification information identifying each of the default bearer for the access network A and the default bearer for access network B. Here, the default bearer for an access network may be a default bearer for an access system of the access network. Therefore, the UE 10 may store a default bearer for a 3GPP access and a default bearer for a WLAN access in association with a multi-access PDN connection.

The default bearer for the multi-access PDN may be a default bearer established by the UE 10. In other words, the UE 10 stores one default bearer for the multi-access PDN connection in a state where only one default bearer is established for the multi-access PDN connection, and the UE 10 may store two default bearers for the multi-access PDN connection in a state where two default bearers are established for the multi-access PDN connection.

Furthermore, the UE 10 may store, with respect to the multi-access PDN connection, information indicating default access (Default Assess) in the multi-access PDN connection. Note that the default access may be information indicating the 3GPP access or the WLAN access. The 3GPP access may be an access system that is not the WLAN access. More specifically, the 3GPP access may be information indicating an access network including an E-UTRAN access, a UTRAN access, and a GERAN access.

Alternatively, the default access may include more detailed information. For example, the default access may be one of E-UTRAN access, UTRAN access, and GERAN access.

In a case where multiple default bearers are established, the UE 10 may select a default bearer based on the default access, and may transmit and/or receive user data by using the selected default bearer.

The WLAN offload ability is WLAN offload permission information indicating whether a communication associated with the PDN connection allows offloading the connection to the WLAN by using an interworking function between the WLAN and the 3GPP, or the 3GPP access is maintained.

The UE allowed mode is an operation mode allowed by the UE 10. This identification information may indicate the UE intiated mode, the Network initiated mode, or both thereof.

The Operation mode is identification information of a mode that indicates which one of the UE 10 and a network takes an initiative in transmitting and/or receiving data or is allowed to initiate communication control in a case where the current PDN connection is the first PDN connection.

FIG. 8C illustrates the UE context for each bearer. The UE context for each bearer includes transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74.

Alternatively, the Routing address may be an IP address of a Mobile Access Gateway (MAG).

The Routing Rule may be notified from the PGW 30 or the PCRF 60. Alternatively, the Routing Rule may be a value that the UE 10 prestores as a default value.

An IP flow may be switched by including an IP header in the Routing Filter. Alternatively, the UE 10 may switch the flow for each application by including an application ID in the Routing Filter. Alternatively, the Routing Filter may include a TFT.

The Routingu Rule may store multiple rules (regulations). Furthermore, the Routing rule may include priority for each rule.

FIG. 8D illustrates the TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The UE 10 may store the NBIFOM capability associated with the TWAG ID. Furthermore, the NBIFOM capability of multiple TWAGs 74 may be stored.

FIG. 8E illustrates an example of the Network capability. In the Network capability, the NBIFOM capability is stored for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 8E, the TWAG 74 stores the NBIFOM capability in association with the PGW ID. Furthermore, as illustrated in FIG. 8E, the NBIFOM capability may be stored in association with each of multiple PGWs 30.

The PGW ID is information for identifying the PGW 30. The PGW ID may be an APN, for example.

The TWAG Capability and the Network capability may be included in the UE context, or may be information separated from the UE context.

That is, the UE 10 may store the TWAG Capability and the Network capability included in the UE context, or may store the TWAG Capability and the Network capability separately from the UE context.

2.2.4. PGW Components

Next, the components of the PGW 30 will be described. FIG. 9 illustrates a device configuration of the PGW 30. As illustrated in FIG. 9, the PGW 30 is constituted of an IP mobile communication network interface unit 920, a control unit 900, and a storage 940. The IP mobile communication network interface unit 920 and the storage 940 are connected to the control unit 900 via a bus.

The control unit 900 serves as a function unit for controlling the PGW 30. The control unit 900 implements various processes by reading out and executing various programs stored in the storage 940.

The IP mobile communication network interface unit 920 serves as a data transmission and/or reception unit configured to transmit and/or receive user data and/or a control message, and also serves as a function unit through which the PGW 30 is connected to the SGW 35 and/or the PCRF 60 and/or the ePDG 65 and/or the AAA 55 and/or the GW 74.

The storage 940 serves as a function unit for storing programs, data, and the like necessary for each operation of the PGW 30. The storage 940 is configured with, for example, a semiconductor memory, a Hard Disk Drive (HDD), or the like.

As illustrated in FIG. 9, the storage 940 stores an EPS bearer context 942. Note that an EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability.

The IMSI is information for identifying a user of the UE 10.

The ME identity is an ID of an ME, and may be the IMEI/IMISV, for example.

The MSISDN represents the phone number of the UE 10.

The UE NBIFOM capability is the NBIFOM capability of the UE 10.

The UE NBIFOM capability is identification information for each UE 10 indicating whether capability of establishing the first PDN connection is supported. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, and the PGW 30 may store the same identification information.

The IP Address indicates an IP address assigned to the UE 10 for the PDN connection. The IP address may be an IPv4 and/or IPv6 prefix.

The PDN type indicates the type of the IP address. The PDN type indicates IPv4, IPv6, or IPv4v6, for example.

The APN is a label indicating an access destination in the network, in accordance with the DNS naming convention.

The Network allowed mode indicates an Operation mode allowed by the network. The Network allowed mode may include the UE initiated mode, the Network initiated mode, or both thereof.

The Operation mode is identification information of a mode that indicates which one of the UE 10 and a network takes an initiative in transmitting and/or receiving data or is allowed to initiate communication control in a case where the current PDN connection is the first PDN connection.

More specifically, for example, the UE initiated mode in which the UE 10 is allowed to initiate the communication control or the Network initiated mode in which the network is allowed to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing Rule may be a value that the UE 10 prestores as a default value.

The PGW 30 may switch the IP flow by including an IP header in the Routing Filter. Alternatively, the PGW 30 may switch the flow for each application by including an application ID in the Routing Filter. Alternatively, the Routing Filter may include a TFT.

The Routingu Rule may store multiple rules. Furthermore, the Routing rule may include priority for each rule.

Furthermore, the PGW 30 may establish the default bearer for each PDN connection established with the UE 10, and store the EPS bearer identification information identifying the default bearer.

Note that the PGW 30 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the PGW 30 may manage the default bearers and the access network in association with each other.

Specifically, the PGW 30 may store the EPS bearer identification information identifying each of the default bearer for the access network A and the default bearer for access network B. Here, the default bearer for an access network may be a default bearer for an access system of the access network. Therefore, the PGW 30 may store the default bearer for 3GPP access and the default bearer for a WLAN access in association with the multi-access PDN connection.

The default bearer for the multi-access PDN may be a default bearer that is being established between the PGW 30 and the UE 10. In other words, the PGW 30 stores one default bearer for the multi-access PDN connection in a state where only one default bearer is established for the multi-access PDN connection, and the PGW 30 may store two default bearers for the multi-access PDN connection in a state where two default bearers are established for the multi-access PDN connection.

Furthermore, the PGE 30 may store information indicating a default access (Default Assess) in the multi-access PDN connection, for the multi-access PDN connection. Note that the default access may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the default access may include more detailed information. For example, the default access may be one of E-UTRAN access, UTRAN access, and GERAN access.

When multiple default bearers are established, the PGW 30 may select a default bearer based on the default access, and transmit and/or receive user data by using the selected default bearer.

FIG. 10D illustrates the TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The PGW 30 may store the NBIFOM capability associated with the TWAG ID.

FIG. 10E illustrates an example of the Network capability. In the Network capability, the NBIFOM capability is stored for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the possession of the capability of establishing the first PDN connection. That is, the existence of the NBIFOM capability may mean that the PGW 30 and/or the network is a gateway having the function of establishing the first PDN connection.

As illustrated in FIG. 10E, the PGW 30 stores the NBIFOM capability in association with the PGW ID. Furthermore, as illustrated in FIG. 10E, the NBIFOM capability may be stored in association with each of the multiple PGWs 30.

The PGW ID may be any information for identifying the PGW 30, and may be an APN, for example.

The TWAG Capability and the Network capability may be included in the EPS bearer context, or may be information separated from the UE context.

2.2.5. PCRF Components

Next, components of the PCRF 60 will be described. FIG. 11 illustrates a device configuration of the PCRF 60. As illustrated in FIG. 11, the PCRF 60 is constituted of an IP mobile communication network interface unit 1120, a control unit 1100, and a storage 1140. The IP mobile communication network interface unit 1120 and the storage 1140 are connected to the control unit 1100 via a bus.

The control unit 1100 serves as a function unit for controlling the PCRF 60. The control unit 1100 implements various processes by reading out and executing various programs stored in the storage 1140.

The IP mobile communication network interface unit 1120 serves as a data transmission and/or reception unit configured to transmit and/or receive user data and/or a control message, and also serves as a function unit through which the PCRF 60 is connected to the PGW 30 and/or the TWAG 74 and/or the AAA 55.

The storage 1140 serves as a function unit for storing programs, data, and the like necessary for each operation of the PCRF 60. The storage 940 is configured with, for example, a semiconductor memory, a Hard Disk Drive (HDD), or the like.

As illustrated in FIG. 11, the storage 1140 stores UE context 1142. Note that the UE context may be classified into a UE context stored for each UE 10 and a UE context stored for each PDN connection.

FIG. 12A illustrates the UE context for each UE 10. As illustrated in FIG. 12A, the context includes at least a Subscriber ID and UE NBIFOM capability.

The Subscriber ID is identification information of a user. For example, the subscriber ID may be an IMSI.

The UE NBIFOM capability is the NBIFOM capability of the UE 10. The UE NBIFOM capability is identification information for each UE 10 indicating whether capability of establishing the first PDN connection is supported. In other words, the UE NBIFOM capability is identification information indicating whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule.

The APN is a label indicating an access destination in the network, in accordance with the DNS naming convention.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be the UE initiated mode.

Furthermore, an Operation mode that allows the network and/or the PGW 30 and/or the PCRF 60 to initiate the communication control may be a Network initiated mode.

The Network Policy is a communication control policy on the network side, and may include the Network allowed mode. Alternatively, the PCRF 60 may store the Network allowed mode separately from the Network Policy.

The Charging Rule is a regulation on charging. In accordance with the Charging Rule determined by the PCRF 60, a PCEF performs charging.

The PCC Rule is a regulation relating to control of the Network Policy and Charging Rule. In accordance with the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and/or bearer includes at least a Routing Rule.

The Routing Rule indicates an association of a Routing Filter, and a Routing address or Routing access type. According to such an association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the UE 10 and/or the TWAG 74 and/or the PGW 30. Alternatively, the Routing Rule may be a value that the PCRF 60 prestores as a default value. In this case, the PCRF 60 may determine the default value of the Routing Rule in accordance with the PCC Rule.

An IP flow may be switched by including an IP header in the Routing Filter. Alternatively, the flow may be switched for each application by including an application ID in the Routing Filter. Alternatively, the Routing Filter may include the TFT.

The Routingu Rule may store multiple rules. Furthermore, the Routing rule may include priority for each rule.

FIG. 12D illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the possession of the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 12D, the NBIFOM capability may be stored in association with the TWAG ID that is the identification information on the TWAG 74. In a case of not being associated with the TWAG ID, the NBIFOM capability may mean a capability of the TWAG 74 to be stored.

If the TWAG ID and the NBIFOM capability are stored in association with each other, the PCRF 60 may store the TWAG capability of multiple TWAGs 74.

FIG. 12E illustrates an example of the Network capability stored in the PCRF 60. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the possession of the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

2.3. Description of Initial State

An initial state in the present embodiment will be described. The initial state in the present embodiment may be a first initial state or a second initial state, both of which will be described later.

Note that the initial state in the present embodiment need not be limited to the first or second initial state.

2.3.1. Description of First Initial State

The first initial state will be described. In the first state, the UE 10 has not established the first PDN connection with the core network 90. However, the UE 10 has already established the second PDN connection. In greater detail, the UE 10 has not established the first PDN connection with the PGW_A 1310. However, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_B 1320. Here, the transfer path may be a bearer.

As described above, in the first state early stage, the UE 10 may be in a state of being connected to the core network 90 via the access network B.

Note that the UE 10 need not be connected to the core network 90 via the access network A. In other words, the UE 10 need not perform an attach through the LTE access network.

Alternatively, the UE 10 may be in a state of being connected to the core network 90 via the access network A. In this case, the UE 10 may perform an Attach procedure initiated by the UE 10 to establish a third PDN connection.

Note that the third PDN connection may be established with the gateway selected by using the APN 2. Alternatively, the third PDN connection may be established with a gateway selected by using an APN different from the APN 1 and the APN 2.

The first initial state has been described above; however, the first initial state is not limited the above-described state, and only needs to be a state in which the multi-access PDN connection based on the NBIFOM has not been established through the access network B, for example.

2.3.2. Description of Procedure for Leading to First Initial State

A procedure for leading to the first initial state will be described with reference to FIG. 15. In the procedure for leading to the first initial state, at least an Attach procedure to the core network 90 through the access network B, illustrated in (A) of FIG. 15, is performed. The first initial state is a state after at least the Attach procedure to the core network 90 through the access network B, illustrated in (A) of FIG. 15, is performed.

Next, details of the Attach procedure to the core network 90 through the access network B will be described. The UE 10 first performs authentication for accessing the access network B and the core network 90 and a security association procedure for establishing a security association for transmitting and/or receiving a message with the core network 90 (S1502).

More specifically, the UE 10 performs an authentication procedure for accessing the TWAG 74 arranged in the access network B and the PGW 30 arranged in the core network 90. Upon the completion of the authentication procedure, the UE 10 performs a procedure for establishing security associations between the UE 10 and the TWAG 74 and between the TWAG 74 and the PGW 30. In the authentication procedure and the procedure for establishing security associations, the UE 10 may transmit control information including an Access Point Name (APN) to the core network 90. The procedures for authentication and for establishing security associations may be performed in accordance with an EAP or other techniques. The UE 10 can obtain the authentication for accessing the PGW 30 selected by the TWAG 74 using the APN.

Furthermore, the UE 10 may transmit multiple APNs. For example, by transmitting APN 1 and APN 2, the UE 10 can obtain the authentication for accessing a PGW 30 selected by the TWAG 74 using the APN 1 and a PGW 30 selected using the APN 2 upon completion of the procedures for authentication and for establishing a security association.

Upon the establishment of the security association, the UE 10 performs a PDN connectivity procedure for establishing the second PDN connection with the core network 90 through the access network B (S1504). In greater detail, the UE 10 establishes, via the TWAG 74, the PDN connection with the PGW_B 1320 arranged in the core network 90.

Specifically, the UE 10 transmits a PDN connectivity request to the TWAG 74 and/or the network. The UE 10 may transmit the PDN connectivity request including the APN 2.

The TWAG 74 and/or the network receives the PDN connectivity request transmitted from the UE 10. The TWAG 74 and/or the network transmits a PDN connectivity accept to the UE 10 upon the reception of the PDN connectivity request. The TWAG 74 and/or the network may transmit the PDN connectivity accept including APN 2.

The UE 10 receives the PDN connectivity accept transmitted from the TWAG 74 and/or the network. The UE 10 transmits a PDN connectivity complete to the TWAG 74 and/or the network based on the PDN connectivity accept.

The TWAG 74 and/or the network receives the PDN connectivity complete transmitted from the UE 10.

2.3.2. Description of Second Initial State

The second initial state will be described. In the second initial state, the UE 10 has not established a connection with the core network 90. In other words, the UE 10 has not established the first PDN connection and the second PDN connection with the core network 90. In greater detail, the UE 10 has not established the first PDN connection with the PGW_A 1310 included and arranged in the core network 90. Furthermore, the UE 10 has not established the second PDN connection with the PGW_B 1320 included and arranged in the core network 90.

Note that the PGW_A 1310 may be a gateway device selected by using the APN 1. The PGW_B 1320 may be a gateway device selected by using the APN 2. Furthermore, the selection of gateway using the APN 1 and/or the APN 2 may be performed by the TWAG 74 included and arranged in the access network B and/or the MME 40 included and arranged in the core network 90.

As described above, in the second initial state, the UE 10 may have no connection with the core network 90. In other words, the UE 10 may be in a state of not being connected to the core network 90 through either the access network A or access network B. Therefore, the UE 10 may be in a state of not being established any PDN connection.

The second initial state has been described above; however, the second initial state is not limited to the above-described state, and only needs to be a state in which the connection to the core network 90 through the access network B has not been established, for example.

2.3.3. Description of Procedure for Leading to Second Initial State

A procedure for leading to the second initial state will be described with reference to FIG. 15. In the procedure for leading to the second initial state, the procedure illustrated in a section (A) of FIG. 15 may not be performed. In other words, the second initial state may be a state in which no particular procedures for making a connection with the core network 90 through the access network B is not performed. In other words, the second initial state may be a state in which the UE 10 makes an initial connection to the core network 90 through the access network B.

2.3.4. Description of Multi-Access PDN Connectivity Establishment Procedure

Next, an establishment procedure of the first PDN connection will be described. Here, the initial state may be the first initial state or the second initial state. In the present embodiment, after the establishment of the initial state, the UE 10 performs a PDN connectivity procedure for establishing the first PDN connection with the core network 90 through the access network B (S1506). In greater detail, the UE 10 establishes, via the TWAG 74, the first PDN connection with the PGW_A 1310 arranged in the core network 90.

Note that the first PDN connection may be constituted of a transfer path that is a combination of a transfer path between the UE 10 and the TWAG 74 and a transfer path between the TWAG 74 and the PGW_A 1310. Here, the transfer path may be a bearer.

As illustrated in FIG. 15, the procedure for establishing the first PDN connection may be a PDN connectivity procedure using the APN 1.

A specific example of the PDN connectivity procedure will be described below.

2.4. Examples of PDN Connectivity Procedure

Examples of the PDN connectivity procedure for establishing the first PDN connection will be described with reference to FIG. 16.

2.4.1. Example of First PDN Connectivity Procedure

An example of the first PDN connectivity procedure will be described with reference to FIG. 16.

As illustrated in (B) of FIG. 16, the UE 10 first performs the authentication and the security association procedure for establishing the security association. Note that the UE 10 may perform the security association procedure in a case that its initial state is the second initial state. In other words, in a case that the initial state is the first initial state, the UE 10 need not perform the security association procedure. In this way, in the case that the initial state is the first initial state, the UE 10 may omit the security association procedure because the security association has already been established.

Note that the security association procedure performed by the UE 10 may be similar to the security association procedure described with reference to (A) of FIG. 15. Therefore, detailed description of the procedure is omitted.

Next, the UE 10 transmits a PDN connectivity request to the TWAG 74 (S2102). The UE 10 may transmit the PDN connectivity request including at least the PDN connectivity request message identity (PDN connectivity request message ID), the Procedure transaction identity (procedure transaction ID), the Request type, and the PDN type. Furthermore, the UE 10 may include at least first identification information and/or fifth identification information and/or eighth identification information in the PDN connectivity request. Moreover, the UE 10 may include the access point name (APN) and/or protocol configuration options (PCOs) and/or the traffic flow templates (TFTs) in the PDN connectivity request. Note that the UE 10 may transmit the PCO including the first identification information and/or fifth identification information and/or eighth identification information and/or the TFT.

Here, the first identification information may be the UE NBIFOM capability representing that the UE 10 supports the NBIFOM. Note that the NBIFOM capability may be information indicating the provision of the function of establishing the multi-access PDN connection based on the NBIFOM.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used in the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information. Note that the UE 10 may select the access network indicated by the eighth identification information based on the ISRP, only in a case where the ISRP is valid or active.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information when establishing a new multi-access PDN connection, and may be configured not to transmit the eighth identification information when adding a transfer path in a state in which the default bearer is established for the multi-access PDN connection through the LTE access network.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1, in order to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6. The PCO may be protocol information associated with the PDN connection. Furthermore, the PCO may include identification information on the request. Note that the UE 10 may transmit the PCO including the first identification information and/or fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection based on the NBIFOM without requesting a certain NBIFOM operation mode, the UE 10 may transmit the PDN connectivity request without including the TFT. More specifically, when the UE 10 includes the first identification information and/or fifth identification information and/or eighth identification information, the UE 10 may transmit the PDN connectivity request without including the TFT. Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or fifth identification information and/or eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Upon the reception of the PDN connectivity request and/or based on the first identification information and/or fifth identification information and/or eighth identification information included in the PDN connectivity request, the TWAG 74 transmits a Create Session Request to the PGW 30 (S2104).

Upon the reception of the PDN connectivity request and/or based on the first identification information and/or fifth identification information and/or eighth identification information included in the PDN connectivity request, the TWAG 74 may transmit the Create Session Request including at least the first identification information and/or fifth identification information and/or eighth identification information. Furthermore, the TWAG 74 may include the TFT in the Create Session Request, upon the reception of the TFT transmitted from the UE 10.

Note that, the TWAG 74 may be configured to transmit the eighth identification information in a case of requesting the establishment of the multi-access PDN connection in the UE-Initiated mode, and not to transmit the eighth identification information in a case of requesting the establishment of the multi-access PDN connection in the Network-Initiated mode.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in a case that none of the first identification information and/or fifth identification information and/or eighth identification information is included in the PDN connectivity request, the TWAG 74 may transmit the Create Session Request without including the first identification information and fifth identification information and/or eighth identification information. Moreover, in the case that the first identification information and/or fifth identification information and/or eighth identification information is not included in the PDN connectivity request, the TWAG 74 may perform a procedure for establishing the single-access PDN connection.

The PGW 30 receives the Create Session Request transmitted from the TWAG 74. Upon the reception of the Create Session Request, and/or based on the first identification information and/or fifth identification information and/or eighth identification information included in the Create Session Request, the PGW 30 may perform an IP-CAN session update procedure with the PCRF 60.

Upon the reception of the Create Session Request and/or based on the first identification information and/or fifth identification information and/or eighth identification information included in the Create Session Request, the PGW 30 may perform the IP-CAN session update procedure including at least the first identification information and/or fifth identification information and/or eighth identification information.

Note that the PGW 30 may perform the IP-CAN session update procedure to notify the PCRF 60 of information on the UE 10 and/or TWAG 74.

The PGW 30 may transmit, to the PCRF 60, a control message in the IP-CAN session procedure, including information indicating whether the PDN connection to be established is the multi-access PDN connection based on the NBIFOM or the single-access PDN connection, and/or the fifth identification information, and/or the eighth identification information.

More specifically, when the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the first identification information and/or the fifth identification information and/or the eighth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, upon the reception of the first identification information and/or fifth identification information and/or eighth identification information, the PCRF 60 may transmit, to the PGW 30, a control message in the IP-CAN session update procedure with the PGW 30, the control message including at least the second identification information and/or seventh identification information and/or ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits a Create Session Response to the TWAG 74 (S2106).

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits the Create Session Response including at least the second identification information and/or seventh identification information and/or ninth identification information.

Furthermore, the PGW 30 may include the PDN Address and/or the PDN connection ID and/or the TFT and/or the bearer identification information identifying the default bearer in the Create Session Response.

Note that a method by which the PGW 30 acquires the second identification information and/or seventh identification information and/or ninth identification information is not limited to the above-described method for acquiring the seventh identification information from the PCRF 60 in the IP-CAN session update procedure, and another example may be employed. For example, the PGW 30 may create the second identification information and/or seventh identification information and/or ninth identification information and transmit the Create Session Response including the second identification information and/or seventh identification information and/or ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be the Allowed Mode representing the NBIFOM operation mode that is allowed for the multi-access PDN connection based on the NBIFOM to be established. In other words, the seventh identification information may be the operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

On the basis of the Allowed Mode, the PCRF 60 or the PGW 30 may include the allowed operation mode in the seventh identification information.

In other words, when only the Network-Initiated mode is allowed, the PCRF 60 or the PGW 30 may include the Network-Initiated mode in the seventh identification information. Alternatively, when only the UE-Initiated mode is allowed, the PCRF 60 or the PGW 30 may include the UE-Initiated mode in the seventh identification information.

Note that when both the UE-Initiated mode and the Network-Initiated mode are allowed, the seventh identification information may include both the operation modes. Alternatively, when both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, when none of the operation modes is allowed for establishment of the PDN connection, the PCRF 60 may transmit, to the PGW 30, the cause information indicating that the requested operation mode is not allowed.

When none of the operation modes is allowed for establishment of the PDN connection, the PGW 30 need not notify the TWAG 74 of the seventh identification information.

When none of the operation modes is allowed for establishment of the PDN connection, the PGW 30 may transmit, to the TWAG 74, the Create Session Response including the cause information indicating that the requested operation mode is not allowed.

When none of the operation modes is allowed for establishment of the PDN connection, the PGW 30 may notify the TWAG 74 that there is no allowed operation.

As described above, on the basis of the Allowed Mode, the PCRF 60 or the PGW 30 may regard an operation mode that is allowed for establishment of the PDN connection as the seventh identification information.

Note that when the Network-Initiated mode is not included in the seventh identification information, the PCRF 60 need not transmit the TFT to the PGW 30.

In other words, note that only when the Network-Initiated mode is included in the seventh identification information, the PCRF 60 may transmit the TFT to the PGW 30.

Note that when the Network-Initiated mode is not included in the seventh identification information, the PGW 30 need not transmit the TFT to the TWAG 74. Thus, in this case, the PGW 30 need not include either the TFT or the PDN address in the Create Session Response.

In other words, note that only when the Network-Initiated mode is included in the seventh identification information, the PGW 30 may transmit the TFT to the TWAG 74. Thus, in this case, the PGW 30 may include the TFT and the PDN address (PDN Address) in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN address.

Furthermore, the PDN connection ID may be information for uniquely identifying the PDN connection established between the UE 10 and the PGW 30.

The PDN connection ID may be assigned by the PGW 30, or may be assigned by the TWAG 74. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and not to transmit the ninth identification information when adding a transfer path in a state in which the default bearer is established for the multi-access PDN connection through the LTE access network.

The TWAG 74 receives the Create Session Response transmitted from the PGW 30. Upon the reception of the Create Session Response and/or based on the second identification information and/or seventh identification information and/or ninth identification information included in the Create Session Response, the TWAG 74 transmits a PDN connectivity accept to the UE 10 (S2108). Note that the PDN connectivity accept message may be any control message indicating that establishment of a PDN connection is allowed, and may be any Activate default EPS bearer context request. The PDN connectivity accept message may be a response message to the PDN connectivity request.

Upon the reception of the Create Session Response and/or based on the second identification information and/or seventh identification information and/or ninth identification information included in the Create Session Response, the TWAG 74 may transmit the PDN connectivity accept including at least a PDN connectivity accept message identity (PDN connectivity accept message ID), the Procedure transaction ID, the APN, the PDN address (PDN Address), the PDN connection ID, and the user plane connection ID (User Plane Connection ID). Furthermore, the TWAG 74 may include at least the second identification information and/or seventh identification information and/or ninth identification information in the PDN connectivity accept. Moreover, the TWAG 74 may include the PCO and/or the Cause and/or the TFT and/or the bearer identification information identifying the default bearer, and/or the PDN connection attribute information, in the PDN connectivity accept. Note that the TWAG 74 may transmit the PCO including the second identification information and/or seventh identification information and/or ninth identification information and/or the TFT.

Here, the PDN connectivity accept message ID may be a message type representing the PDN connectivity accept message.

The APN may be an APN, to which the UE 10 is allowed to connect. More specifically, the APN may be the APN 1. The APN 1 may be an APN that is allowed to establish the multi-access PDN connection based on the NBIFOM. The TWAG 74 may include the APN 1 in the PDN connectivity accept.

The PDN address may be an IP address assigned to the UE 10. For example, the PDN address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The user plane connection ID is information for identifying a user plane. The user plane is a transfer path used for transferring user data in the PDN connection. The TWAG 74 may assign the user plane connection ID.

The Cause may be information representing that the PDN type of the PDN address assigned to the UE 10 is different from the PDN type requested by the UE 10 in the PDN connectivity request.

Note that the TWAG 74 and/or the PGW 30 may include the second identification information and/or the seventh identification information and/or the ninth identification information in the PCO. However, in a case where the TWAG 74 and/or the PGW 30 includes the second identification information and/or the seventh identification information and/or the ninth identification information in the PCO, the TWAG 74 and/or the PGW 30 does not include the IFOM support. In contrast, in a case where the TWAG 74 and/or the PGW 30 includes the IFOM support in the PCO, the TWAG 74 and/or the PGW 30 does not include the second identification information and/or the seventh identification information and/or the ninth identification information. As described above, it may be possible to not configure both the second identification information and/or seventh identification information and/or ninth identification information and the IFOM support to be effective to ensure a clear distinction between the use of the switching of the communication path based on the NBIFOM and the use of the switching of the communication path based on the IFOM.

The PDN connection attribute information may be information indicating that the PDN connection established in the present PDN connectivity procedure is the multi-access PDN connection, and/or information indicating that user data transmitted and/or received by using the PDN connection established in the PDN connection the present PDN connectivity procedure is allowed to be transmitted and/or received through the access network A and the access network B, and/or if there is only one operation mode indicated by the seventh identification information, information indicating that the PDN connection established in the present PDN connectivity procedure is the multi-access PDN connection based on the NBIFOM of the operation mode indicated by the seventh identification information.

Note that the UE 10 may transmit the PDN connectivity accept message that further includes the connectivity type indicating the type of the PDN connection and/or the WLAN offload permission information (WLAN offload acceptablity) indicating whether the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74. Upon the reception of the PDN connectivity accept and/or based on the second identification information and/or seventh identification information and/or ninth identification information included in the PDN connectivity accept, the UE 10 transmits a PDN connectivity complete to the TWAG 74 (S2110).

The UE 10 may transmit the PDN connectivity complete including at least a PDN connectivity complete message ID (PDN connectivity complete), the procedure transaction ID, and the PDN connection ID.

Furthermore, when multiple INFOM operation modes are included in the seventh identification information, the UE 10 may include at least the fifth identification information in the PDN connectivity complete. In other words, when multiple INFOM operation modes are allowed, the UE 10 may select one of the allowed modes and transmit the fifth identification information including the selected mode.

Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, when the UE-Initiated mode and the Network-Initiated mode are included in the seventh identification information included in the PDN connectivity accept, the UE 10 may include the UE-Initiated mode or the Network-Initiated mode in the fifth identification information.

Which of the UE-Initiated mode and the Network-Initiated mode is to be included in the fifth identification information may be determined based on a UE policy. Note that the UE policy may be any information configured for the UE 10. For example, the UE policy may be information configured by a user.

The PDN connectivity complete message ID may be a message type representing the PDN connectivity complete message.

After the fourth PDN connectivity procedure is completed, the UE 10 and the PGW 30 establish the first PDN connection of the operation mode determined on the basis of the operator policy. Alternatively, the UE 10 establishes the first PDN connection of an operation mode selected from the operation modes allowed based on the operator policy. Note that upon the reception of the PDN connectivity accept and/or on the basis of the PDN connection attribute information and/or the seventh identification information and/or the operation mode selected on the basis of the seventh identification information, the UE 10 may identify the NBIFOM operation mode for the established PDN connection. Upon the establishment of the first PDN connection, the UE 10 and the PGW 30 determine a PDN connection and/or a transfer path, such as an EPS bearer, for transmitting and/or receiving the IP flow by using the TFT, and transmit and/or receive user data corresponding to the IP flow identified by the TFT. More specifically, the UE 10 and the PGW 30 transmit and/or receive a flow identified by the TFT by using the first PDN connection.

Furthermore, in the establishment of the first PDN connection, the UE 10 and the PGW 30 establish a default bearer. The UE 10 and the PGW 30 store the identification information of the default bearer established in the PDN connectivity procedure and the information identifying the WLA access network in association with each other, in response to the completion of the PDN connectivity procedure through the WLAN access network.

Note that the UE 10 performs data transmission and/or reception using the default bearer when the UE 10 does not receive the TFT or transmits and/or receives the user data not matching the held TFT. In addition, the PGW 30 performs data transmission and/or reception using the default bearer when the PGW 30 does not receive the TFT or transmits and/or receives the user data not matching the held TFT.

In this way, the UE 10 and the PGW 30 establish a multi-access PDN connection in the PDN connectivity procedure, and establish a default bearer for the multi-access PDN connection. Furthermore, the UE 10 and the PGW 30 are capable of storing a default access for selecting a default bearer in association with the multi-access PDN connection, in a case where multiple default bearers are established.

Note that in the example of the first PDN connectivity procedure, a case has been described in which the transmission and/or reception of the TFT is included in the PDN connectivity procedure; however, the first PDN connectivity procedure is not limited to this case. The transmission and/or reception of the TFT may be performed after the multi-access PDN connection based on the NBIFOM is established.

Therefore, the UE 10 and the TWAG 74 may perform transmission and/or reception without including the TFT in the PDN connectivity request and/or the PDN connectivity response (PDN connectivity accept), and establish the multi-access PDN connection based on the NBIFOM. In other words, at a point in time when the PDN connection is established, there may be no IP flow transmitting and/or receiving user data by using the PDN connection. In this case, the UE 10 and the TWAG 74 transmit the TFT after the multi-access PDN connection based on the NBIFOM is established.

More specifically, when the PDN connection of the UE-Initiated mode is established, the UE 10 may transmit the TFT to the TWAG 74. In addition, the TWAG 74 receives the TFT from the UE 10 and transmits the TFT to the PGW 30. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and/or reception using the default bearer when the UE 10 and the PGW 30 transmit and/or receive the user data not matching the held TFT.

On the other hand, when the PDN connection of the Network-Initiated mode is established, the PGW 30 may transmit the TFT to the TWAG 74. Here, the PGW 30 may receive, from the PCRF 60, the TFT determined on the basis of the operator policy. In addition, the TWAG 74 receives the TFT from the PGW 30 and transmits the TFT to the UE 10. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and/or reception using the default bearer when the UE 10 and the PGW 30 transmit and/or receive the user data not matching the held TFT.

Furthermore, in the example of the first PDN connectivity procedure, a case has been described in which the UE 10 and the PGW 30 establish the first PDN connection of an operation mode selected by the UE 10 from the operation modes determined based on the operator policy or the operation modes allowed based on the operator policy; however, the first PDN connectivity procedure is not limited to this case. The UE 10 may reject the establishment of the first PDN connection.

For example, in a case that the UE 10 does not support the operation mode allowed based on the operator policy and/or in a case that the operation mode allowed based on the operator policy does not comply with the policy of the UE 10, the UE 10 may reject the establishment of the first PDN connection.

In greater detail, the UE 10 may transmit a PDN connectivity reject to the TWAG 74, upon the reception of the PDN connectivity accept, and/or on the basis of the seventh identification information included in the PDN connectivity accept and/or the PDN connection attribute information and/or the policy of the UE 10.

The UE 10 may transmit the PDN connectivity reject including at least one or more of the PDN connectivity reject message identity (PDN connectivity reject message ID), the procedure transaction ID, and the Cause. Furthermore, the UE 10 may further include fourth identification information in the PDN connectivity reject. Furthermore, the UE 10 may further include the PCO and/or a Tw1 value in the PDN connectivity reject. Note that the UE 10 may transmit the PCO including the fourth identification information.

The fourth identification information may be information representing that the UE 10 does not support the operation mode allowed based on the operator policy and/or information representing that the operation mode allowed based on the operator policy does not comply with the policy of the UE 10.

The PDN connectivity reject message ID may be a message type representing the PDN connectivity reject message.

The Cause may be information representing a reason why the PDN connectivity request is rejected. Here, the UE 10 may notify the UE 10 of the fourth identification information included in the Cause.

The Tw1 value may be a value of Tw1 timer included in a case that Cause represents insufficient resources.

The TWAG 74 may receive the PDN connectivity reject transmitted from the UE 10. Upon the reception of the PDN connectivity reject and/or based on the fourth identification information included in the PDN connectivity reject, the TWAG 74 may delete the EPS bearer context, held by the TWAG 74, relating to the established PDN connection. The TWAG 74 may transmit the fourth identification information included in the PDN connectivity reject to the PGW 30.

The PGW 30 may receive the fourth identification information transmitted from the TWAG 74. Upon the reception of the fourth identification information and/or on the basis of the operator policy, the PGW 30 may delete the EPS bearer context, held by the PGW 30, relating to the established PDN connection.

Furthermore, the PGW 30 may perform the IP-CAN session update procedure with the PCRF 60, upon the reception of the fourth identification information. The PGW 30 may include the fourth identification information in the IP-CAN session update procedure.

The PCRF 60 may change the operator policy on the basis of the IP-CAN session update procedure. Note that on the basis of the change of the operator policy, the PGW 30 may delete the EPS bearer context, held by the PGW 30, relating to the established PDN connection.

2.4.2. Description of State After PDN Connectivity Establishment Procedure

Performing the above-described first PDN connectivity procedure leads to a first state and a second state, both of which will be described later.

Note that an initial state in the additional Attach procedure may be the first state or the second state. The initial state in the additional Attach procedure may not be limited to the first or second state.

2.4.3. Description of First State

The first state will be described with reference to FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_A 1310. Here, the transfer path may be a bearer.

As described above, in the first state, the UE 10 may be in a state in which the multi-access PDN connection based on the NBIFOM is established via the access network B. In addition, in the first state early stage, the UE 10 may be in a state of not being connected to the core network 90 via the access network A.

Note that the UE 10 need not establish the single-access PDN connection via the access network B.

Alternatively, the UE 10 may be in a state in which the single-access PDN connection is established via the access network B. In this case, the UE 10 performs, in the WLAN access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using an APN different from the APN 1 and the APN 2.

The first state has been described above; however, the first state is not limited to the above-described state, and only needs to be a state in which the multi-access PDN connection based on the NBIFOM has been established through the access network B and the PDN connection has not been established through the access network A, for example.

2.4.4. Description of Second State

The second state will be described with reference to FIG. 14. In the second state, the UE 10 has established the first PDN connection with the core network 90. Furthermore, the UE 10 has established the second PDN connection with the core network 90. In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network B. Thus, the first PDN connection may be constituted of a transfer path that is a combination of a transfer path between the UE 10 and the TWAG 74 and a transfer path between the TWAG 74 and the PGW_B 1320. Here, the transfer path may be a bearer.

In addition, the second PDN connection may be constituted of a transfer path between the UE 10 and the PGW 30 through the access network A. Thus, the second PDN connection may be constituted of a transfer path that is a combination of a transfer path between the UE 10 and the eNodeB 45, a transfer path between the eNodeB 45 and the SGW 35, and a transfer path between the SGW 35 and the PGW_B 1320. Here, the transfer path may be a bearer.

As described above, in the first state, the UE 10 may be in a state in which the multi-access PDN connection based on the NBIFOM is established via the access network B. Furthermore, the UE 10 may be in a state in which the single-access PDN connection is established via the access network A.

Note that the UE 10 need not establish the single-access PDN connection via the access network B.

Alternatively, the UE 10 may be in a state in which the single-access PDN connection is established via the access network B. In this case, the UE 10 performs, in the WLAN access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using an APN different from the APN 1 and the APN 2.

The second state has been described above; however, the second state is not limited to the above-described state, and only needs to be a state in which the multi-access PDN connection based on the NBIFOM has been established through the access network B and the single-access PDN connection has been established through the access network A, for example.

2.5. Additional Attach Procedure

An additional Attach procedure will be described below. The Operation mode of the first PDN connection being the Network-initiated mode refers to, in other words, flow switching and/or update of the Routing Rule of the PDN connection initiated by the UE 10 being not possible. In contrast, the PDN connectivity procedure and/or the Attach procedure is initiated by the UE 10.

Note that the Routing Rule may be information for selecting a transfer path or bearer through which user data is transmitted and/or received based on the TFT held by the UE 10. More specifically, the Routing Rule may be information in which the TFT and the transfer path or bearer are associated with each other.

As described above, the second state is a state in which the UE 10 establishes the first PDN connection only through the access network B. That is, the transfer path through the LTE access network is not included in the first PDN connection. Note that the transfer path may be a bearer and/or a communication path.

Therefore, when the first PDN connection in the second state is in the Network-initiated mode, the network and/or the PCRF 60 cannot include the transfer path through the access network A in the first PDN connection.

Therefore, based on the state transition to the second state and the fact that the Operation mode is the Network-initiated mode, the UE 10 may perform a procedure for establishing the transfer path through the access network A.

Moreover, also in a case that the Operation mode of the first PDN connection in the first initial state and/or the second initial state is the UE-initiated mode, the UE 10 may perform a procedure for establishing the transfer path through the access network A. based on the Routing Rule stored in the UE 10.

Specifically, the UE 10 may perform the procedure for adding a transfer path through the access network A to the first PDN connection in a case that the Routing Rule of the first PDN connection indicates priority to an LTE access.

More specifically, the UE 10 may perform the procedure for adding a transfer path through the access network A in a case that the UE 10 stores the Routing Rule in which a specific flow and an LTE access are associated with each other for the first PDN connection.

In other words, the UE 10 does not perform the procedure for adding a transfer path through the access network A to the first PDN connection in a case that the Routing Rule of the first PDN connection does not indicate priority to an LTE access.

More specifically, the UE 10 does not perform the procedure for adding a transfer path through the access network A in a case that the UE 10 does not store the Routing Rule in which a specific flow and an LTE access are associated with each other for the first PDN connection.

Hereinafter, details of the procedure will be described.

2.5.1. Example of Second Additional Attach Procedure

Next, an example of a second additional Attach procedure will be described. As illustrated in FIG. 17, the initial state of the present example of procedure is first initial state (S2302). Note that the procedure for changing the state to the first initial state may be similar to the procedure described above, and detailed description will be omitted.

In the first initial state, the UE 10 only needs to have established the first PDN connection with the PGW 30 and/or the network through the access network A. Specifically, the first initial state is a state in which the UE 10 establishes the first PDN connection through the TWAG 74 with the PGW_A selected using the APN 1. Note that the first PDN connection may be the multi-access PDN connection based on the NBIFOM.

The UE 10 performs the Attach procedure through the access network A upon transition to the first initial state and establishment of the first PDN connection in the Network-initiated mode (S2304).

The UE 10 may perform the Attach procedure through the access network A based on transition to the first initial state in which the first PDN connection in the UE-initiated mode is established and based on the Routing Rule.

Specifically, based on the Routing Rule giving priority to an LTE access, the UE 10 may perform the Attach procedure through the access network A.

Specifically, the UE 10 may perform the Attach procedure through the access network A in a case that the state is changed to the first initial state in which the first PDN connection in the UE-initiated mode is established and the Routing Rule of the first PDN connection indicates priority to an LTE access.

More specifically, the UE 10 may perform the Attach procedure through the access network A in a case that the state is changed to the first initial state in which the first PDN connection in the UE-initiated mode is established and the UE 10 stores the Routing Rule in which a specific flow and an LTE access are associated with each other for the first PDN connection.

In other words, the UE 10 does not perform the Attach procedure through the access network A in a case that the Routing Rule of the first PDN connection does not indicate priority to an LTE access, even if the state is changed to the first initial state in which the first PDN connection in the UE-initiated mode is established.

More specifically, the UE 10 does not perform the Attach procedure through the access network A in a case that the UE 10 does not store the Routing Rule in which a specific flow and an LTE access are associated with each other for the first PDN connection, even if the state is changed to the first initial state in which the first PDN connection in the UE-initiated mode is established.

Note that the UE 10 may transmit the Attach Request including at least the APN and/or the PDN connection ID.

The APN may be an APN, to which the UE 10 requests a connection. More specifically, the APN may be the APN 2. The UE 10 may include the APN 2 in order to establish the single-access PDN connection. Here, the APN 2 may be an APN that is not allowed to establish the multi-access PDN connection based on the NBIFOM and/or an APN that is not allowed to perform communication based on the NBIFOM.

That is, the UE 10 may request establishment of a single access PDN connection, using different APN 2 from the APN 1 acquired from the network when establishing the first PDN connection.

Furthermore, the PDN connection ID may be an ID assigned when the PGW 30 establishes the PDN connection in the PDN connectivity procedure, or may be information for uniquely identifying the PDN connection that the UE 10 establishes with the PGW 30.

Note that in the Attach procedure, the UE 10 performs authentication and security association procedure with the MME 40 and the PGW_A and the PGW_B.

In addition, the UE 10 may acquire an APN from the network in response to the Attach procedure complete.

The APN may be an APN, to which the UE 10 requests a connection. More specifically, the APN may be the APN 2. The UE 10 may include the APN 2 in order to establish the single-access PDN connection. Here, the APN 2 may be an APN that is not allowed to establish the multi-access PDN connection based on the NBIFOM and/or an APN that is not allowed to perform communication based on the NBIFOM.

That is, the UE 10 may establish a single access PDN connection, using different APN 2 from the APN 1 acquired from the network in response to establishment of the first PDN connection.

Through above procedures, the UE 10 and the core network 90 changes their states from the first initial state to the second initial state (S2306).

Next, the UE 10 performs the PDN connectivity procedure through the access network B upon transition to the second initial state and establishment of the first PDN connection in the Network-initiated mode (S2308).

Alternatively, the UE 10 performs the PDN connectivity procedure through the access network A, upon transition to the second initial state and based on the Routing Rule of the first PDN connection established in the UE-Initiated mode.

Specifically, based on the Routing Rule giving priority to an LTE access, the UE 10 may perform the Attach procedure through the access network A.

Specifically, the UE 10 may perform the procedure for adding a transfer path through the access network A to the first PDN connection in a case that the state is changed to the second initial state in which the first PDN connection in the UE-initiated mode is established and the Routing Rule of the first PDN connection indicates priority to an LTE access.

More specifically, the UE 10 may perform the procedure for adding a transfer path through the access network A in a case that the state is changed to the second initial state in which the first PDN connection in the UE-initiated mode is established and the UE 10 stores the Routing Rule in which a specific flow and an LTE access are associated with each other for the first PDN connection.

In other words, the UE 10 may not perform the procedure for adding a transfer path through the access network A to the first PDN connection in a case that the Routing Rule of the first PDN connection does not indicate priority to an LTE access, even when the state is changed to the second initial state in which the first PDN connection in the UE-initiated mode is established.

More specifically, the UE 10 does not perform the procedure for adding a transfer path through the access network A in a case that the UE 10 does not store the Routing Rule in which a specific flow and an LTE access are associated with each other for the first PDN connection, even when the state is changed to the second initial state in which the first PDN connection in the UE-initiated mode is established.

A PDN connectivity procedure through an access network A will be described with reference to FIG. 18.

The UE 10 first transmits a PDN connectivity request to the MME 40 via the eNodeB 45 (S2402). The UE 10 may transmit the PDN connectivity request including at least the PDN connectivity request message identity (PDN connectivity request message ID), the Procedure transaction identity (procedure transaction ID), the Request type, the PDN type, the Protocol discriminator, and EPS bearer identity (EPS bearer ID). Furthermore, the UE 10 may include at least first identification information and/or fifth identification information and/or eighth identification information and/or PDN connection ID in the PDN connectivity request. Moreover, the UE 10 may include the access point name (APN) and/or protocol configuration options (PCOs) and/or the traffic flow templates (TFTs) in the PDN connectivity request. Note that the UE 10 may transmit the PCO including the first identification information and/or fifth identification information and/or the eighth identification information and/or the TFT and/or the PDN connection ID.

Here, the first identification information may be the UE NBIFOM capability representing that the UE 10 supports the NBIFOM. Note that the NBIFOM capability may be information indicating the provision of the function of establishing the multi-access PDN connection based on the NBIFOM.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information in a case of establishing a new multi-access PDN connection, and may be configured not to transmit the eighth identification information in a case of adding a transfer path in a state in which the default bearer is established for the multi-access PDN connection through the WLAN access network.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used in the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information. Note that the UE 10 may select the access network indicated by the eighth identification information based on the ISRP, only in a case where the ISRP is valid or active.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1, in order to establish the multi-access PDN connection based on the NBIFOM. Here, the APN 1 may be an APN that is allowed to establish the multi-access PDN connection based on the NBIFOM and/or an APN that is allowed to perform communication based on the NBIFOM. Furthermore, the APN may be identification information identifying the first PDN connection.

The PDN connection ID may be an ID assigned when the PGW 30 establishes the PDN connection in the PDN connectivity procedure, or may be information for uniquely identifying the PDN connection that the UE 10 establishes with the PGW 30. Furthermore, the PDN connection ID may be identification information identifying the first PDN connection The PDN connection ID may be associated with the APN.

Note that the UE 10 may identify the first PDN connection by using the APN and/or the PDN connection ID.

The request type may be information for identifying the type of the PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6.

The protocol discriminator may be an identifier representing a protocol type currently used for transmission and/or reception of the PDN connectivity request.

The EPS bearer ID may be information identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information and/or fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection based on the NBIFOM without requesting a certain NBIFOM operation mode, the UE 10 may transmit the PDN connectivity request without including the TFT. More specifically, when the UE 10 includes the first identification information and/or fifth identification information and/or eighth identification information, the UE 10 may transmit the PDN connectivity request without including the TFT.

Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using between the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or fifth identification information and/or eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The MME 40 receives the PDN connectivity request transmitted from the UE 10. Upon the reception of the PDN connectivity request and/or based on the first identification information and/or fifth identification information and/or eighth identification information included in the PDN connectivity request, the MME 40 transmits a Create Session Request to the SGW 35 (S2404).

Upon the reception of the PDN connectivity request and/or based on the first identification information included in the PDN connectivity request, the MME 40 may transmit the Create Session Request including at least the first identification information.

Upon the reception of the PDN connectivity request and/or based on the fifth identification information and/or eighth identification information included in the PDN connectivity request, the MME 40 may transmit the Create Session Request including at least the fifth identification information and/or eighth identification information. Furthermore, the MME 40 may include the TFT in the Create Session Request, upon the reception of the TFT transmitted from the UE 10.

Furthermore, the MME 40 may include the APN and/or PDN connection ID in the Create Session Request, upon the reception of the APN and/or PDN connection ID transmitted from the UE 10. Note that the MME 40 may identify the first PDN connection by using the received APN and/or PDN connection ID.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in a case that none of the first identification information and fifth identification information and/or eighth identification information is included in the PDN connectivity request, the MME 40 may transmit the Create Session Request without including the first identification information and/or fifth identification information and/or eighth identification information. Moreover, in a case that the first identification information and/or fifth identification information and/or eighth identification information is not included in the PDN connectivity request, the MME 40 may perform a procedure for establishing the single-access PDN connection.

The SGW 35 receives the Create Session Request transmitted from the MME 40. Upon the reception of the PDN connectivity request and/or based on the first identification information and/or fifth identification information and/or eighth identification information included in the PDN connectivity request, the SGW 35 transmits the Create Session Request to the PGW 30 (S2406).

Upon the reception of the session connectivity request and/or based on the first identification information and/or fifth identification information and/or eighth identification information included in the session connectivity request, the SGW 35 may transmit the Create Session Request including at least the first identification information and/or fifth identification information and/or eighth identification information. Furthermore, the SGW 35 may include the TFT in the Create Session Request.

Furthermore, the SGW 35 may include the APN and/or PDN connection ID in the Create Session Request, upon the reception of the APN and/or PDN connection ID transmitted from the MME 40. Note that the SGW 35 may identify the first PDN connection by using the received APN and/or PDN connection ID.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may be constituted of a five-tuple, or may be constituted of identification information such as the application ID. Note that the five-tuple may be constituted of a combination of one or more of a transmission-source IP address, a transmission-destination IP address, a transmission-source port number, a transmission-destination port number, and a protocol number.

Note that in a case that none of the first identification information and the fifth identification information and/or eighth identification information is included in the create session request, the SGW 35 may transmit the Create Session Request without including the first identification information and/or fifth identification information and/or eighth identification information. Moreover, in a case that the first identification information and/or fifth identification information and/or eighth identification information is not included in the PDN connectivity request, the MME 40 may perform a procedure for establishing the single-access PDN connection.

The PGW 30 receives the Create Session Request transmitted from the SGW 35. Upon the reception of the Create Session Request, and/or based on the first identification information and/or fifth identification information and/or eighth identification information included in the Create Session Request, the PGW 30 may perform an IP-CAN session update procedure with the PCRF 60 (S2408).

Upon the reception of the Create Session Request and/or based on the first identification information and/or fifth identification information and/or eighth identification information included in the Create Session Request, the PGW 30 may perform the IP-CAN session update procedure including at least the first identification information and/or fifth identification information and/or eighth identification information.

Furthermore, the PGW 30 may identify the first PDN connection by using the received APN and/or PDN connection ID, upon the reception of the APN and/or PDN connection ID transmitted from the SGW 35.

Note that the PGW 30 may perform the IP-CAN session update procedure to notify the PCRF 60 of information on the UE 10 and/or the eNodeB 45 and/or the MME 40 and/or the SGW 35.

More specifically, when the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the first identification information and/or fifth identification information and/or eighth identification information.

More specifically, when the multi-access PDN connection based on the NBIFOM is to be established, the PGW 30 transmits, to the PCRF 60, the information indicating the access network A, the PDN connection ID, the information indicating that the PDN connection is the multi-access PDN connection based on the NBIFOM, and the first identification information and/or fifth identification information and/or eighth identification information. Alternatively, when the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, upon the reception of the first identification information and/or fifth identification information and/or eighth identification information, the PCRF 60 may transmit, to the PGW 30, a control message in the IP-CAN session update procedure with the PGW 30, the control message including at least the second identification information and/or seventh identification information and/or ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits a Create Session Response to the SGW 35 (S2410).

Upon the reception of the Create Session Request or the completion of the IP-CAN session update procedure, and/or based on the first identification information and/or fifth identification information and/or eighth identification information included in the Create Session Request, and/or based on the second identification information and/or seventh identification information and/or ninth identification information included in the IP-CAN session update procedure, the PGW 30 transmits the Create Session Response including at least the second identification information and/or seventh identification information and/or ninth identification information.

Furthermore, the PGW 30 may include the PDN Address and/or the PDN connection ID and/or the TFT and/or the bearer identification information identifying the default bearer in the Create Session Response.

Note that a method by which the PGW 30 acquires the second identification information and/or seventh identification information and/or ninth identification information is not limited to the above-described method for acquiring the seventh identification information from the PCRF 60 in the IP-CAN session update procedure, and another example may be employed. For example, the PGW 30 may create the second identification information and/or seventh identification information and/or ninth identification information and transmit the Create Session Response including the second identification information and/or seventh identification information and/or ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be the Allowed Mode representing the NBIFOM operation mode that is allowed for the multi-access PDN connection based on the NBIFOM to be established. In other words, the seventh identification information may be the operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

On the basis of the Allowed Mode, the PCRF 60 or the PGW 30 may include the allowed operation mode in the seventh identification information.

In other words, when only the Network-Initiated mode is allowed, the PCRF 60 or the PGW 30 may include the Network-Initiated mode in the seventh identification information. Alternatively, when only the UE-Initiated mode is allowed, the PCRF 60 or the PGW 30 may include the UE-Initiated mode in the seventh identification information.

Note that when both the UE-Initiated mode and the Network-Initiated mode are allowed, the seventh identification information may include both the operation modes. Alternatively, when both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, when none of the operation modes is allowed for establishment of the PDN connection, the PCRF 60 may transmit, to the PGW 30, the cause information indicating that the requested operation mode is not allowed.

In a case that none of the operation modes is allowed for establishment of the PDN connection, the PGW 30 need not notify the MME 40 of the seventh identification information via the SGW 35.

In a case that none of the operation modes is allowed for establishment of the PDN connection, the PGW 30 may transmit, to the MME 40 via the SGW 35, the Create Session Response including the cause information indicating that the Requested Operation Mode is not allowed.

In a case that none of the operation modes is allowed for establishment of the PDN connection, the PGW 30 may notify the MME 40 that there is no allowed operation via the SGW 35.

As described above, on the basis of the Allowed Mode, the PCRF 60 or the PGW 30 may regard an operation mode that is allowed for establishment of the PDN connection as the seventh identification information.

Note that when the Network-Initiated mode is not included in the seventh identification information, the PCRF 60 need not transmit the TFT to the PGW 30.

In other words, note that only when the Network-Initiated mode is included in the seventh identification information, the PCRF 60 may transmit the TFT to the PGW 30.

Note that in a case that the Network-Initiated mode is not included in the seventh identification information, the PGW 30 need not transmit the TFT to the MME 40 via the SGW 35. Thus, in this case, the PGW 30 need not include either the TFT or the PDN address in the Create Session Response.

Note that, in other words, only in a case that the Network-Initiated mode is included in the seventh identification information, the PGW 30 may transmit the TFT to the MME 40 via the SGW 35. Thus, in this case, the PGW 30 may include the TFT and the PDN address (PDN Address) in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and not to transmit the ninth identification information when adding a transfer path in a state in which the default bearer is established for the multi-access PDN connection through the LTE access network.

The SGW 35 receives the Create Session Response transmitted from the PGW 30. Upon the reception of the Create Session Response and/or based on the second identification information and/or seventh identification information and/or ninth identification information included in the Create Session Response, the SGW 35 transmits the Create Session Response to the MME 40 (S2412).

Upon the reception of the Create Session Response and/or based on the second identification information and/or seventh identification information and/or ninth identification information included in the Create Session Response, the SGW 35 may transmit the Create Session Response including at least the second identification information and/or seventh identification information and/or ninth identification information.

Furthermore, the SGW 35 may include the PDN Address and/or the PDN connection ID and/or the TFT in the Request Session Response.

The MME 40 receives the Create Session Response transmitted from the SGW 35. Upon the reception of the Create Session Response and/or based on the second identification information and/or seventh identification information and/or ninth identification information included in the Create Session Response, the MME 40 transmit the Activate default EPS bearer context request to the eNodeB 45 (S2414).

Upon the reception of the Create Session Response and/or based on the second identification information and/or seventh identification information and/or ninth identification information included in the Create Session Response, the MME 40 may transmit at least an Activate default EPS bearer context request message identity (Activate default EPS bearer context request message ID), a Procedure transaction ID, an APN, a PDN Address, a protocol discriminator, an EPS bearer ID, and EPS QoS included in the Activate default EPS bearer context request. The MME 40 may further include at least the second identification information and/or seventh identification information and/or ninth identification information in the Activate default EPS bearer context request. Moreover, upon the reception of the Create Session Response and/or based on the second identification information and/or seventh identification information and/or ninth identification information included in the Create Session Response, the MME 40 may include the PCO and/or the ESM Cause and/or the TFT and/or the bearer identification information identifying the default bearer, and/or the PDN connection ID and/or the PDN connection attribute information, in the Activate default EPS bearer context request. Note that the MME 40 may transmit the PCO including the second identification information and/or seventh identification information and/or ninth identification information and/or the TFT and/or the bearer identification information identifying the default bearer and/or the PDN connection ID.

Here, the Activate default EPS bearer context request message ID may be a message type representing the Activate default EPS bearer context request message.

The APN may be an APN, to which the UE 10 is allowed to connect. More specifically, the APN may be the APN 1. The APN 1 may be an APN that is allowed to establish the multi-access PDN connection based on the NBIFOM. The MME 40 may include the APN 1 in the Activate default EPS bearer context request.

The PDN address may be an IP address assigned to the UE 10. For example, the PDN address may be an IPv4 address, or an interface ID for constituting an IPv6 address.

The EPS QoS may indicate a state representing QoS of an EPS bearer.

The PDN connection attribute information may be information indicating that the PDN connection established in the present PDN connectivity procedure is the multi-access PDN connection, and/or information indicating that user data transmitted and/or received by using the PDN connection established in the PDN connection the present PDN connectivity procedure is allowed to be transmitted and/or received through the access network A and the access network B, and/or information indicating that the PDN connection established in the present PDN connectivity procedure is the multi-access PDN connection based on the NBIFOM of the operation mode indicated by the seventh identification information.

Note that the UE 10 may transmit the Activate default EPS bearer context request message that further includes the connectivity type indicating the type of the PDN connection and/or the WLAN offload permission information (WLAN offload acceptablity) indicating whether the WLAN offload can be performed. Furthermore, the MME 40 may transmit the connectivity type or the WLAN offload permission information including the PDN connection attribute information.

ESM Cause may be information representing that the PDN type of the PDN address assigned to the UE 10 is different from the PDN type requested by the UE 10 in the PDN connectivity request.

Note that the MME 40 and/or the PGW 30 may include the second identification information and/or the seventh identification information and/or the ninth identification information in the PCO. However, in a case where the MME 40 and/or the PGW 30 includes the second identification information and/or the seventh identification information and/or the ninth identification information in the PCO, the MME 40 and/or the PGW 30 does not include the IFOM support. In contrast, in a case where the MME 40 and/or the PGW 30 includes the IFOM support in the PCO, the MME 40 and/or the PGW 30 does not include the second identification information and/or the seventh identification information and/or the ninth identification information. As described above, it may be possible to not configure both the second identification information and/or seventh identification information and/or ninth identification information and the IFOM support to be effective to ensure a clear distinction between the use of the switching of the communication path based on the NBIFOM and the use of the switching of the communication path based on the IFOM.

The eNodeB 45 receives the Activate default EPS bearer context request transmitted from the MME 40. Upon the reception of the Activate default EPS bearer context request, the eNodeB 45 transfers the Activate default EPS bearer context request to the UE 10.

The eNodeB 45 may transmit at least an RRC connection configuration request (RRC Connection Reconfiguration) to the UE 10 with an Activate default EPS bearer context request (S2416).

The UE 10 receives the RRC connection configuration request transmitted from the eNodeB 45. Furthermore, the UE 10 receives the Activate default EPS bearer context request transmitted from the MME 40 and transferred by the eNodeB 45.

Upon the reception of the RRC connection configuration request, the UE 10 transmits the RRC connection configuration complete (RRC Connection Reconfiguration Complete) to the eNodeB 45 (S2418).

The eNodeB 45 receives the RRC connection configuration complete transmitted from the UE 10. The eNodeB 45 transmits bearer configuration to the MME 40 in response to the RRC connection configuration complete.

The MME 40 receives the bearer configuration transmitted from the eNodeB 45 (S2420).

Upon the reception of the Activate default EPS bearer context request and/or based on the second identification information and/or seventh identification information and/or ninth identification information included in the Activate default EPS bearer context request, the UE 10 transmits an Activate default EPS bearer context accept or an Activate default EPS bearer context reject to the MME 40 (S2422) (S2424).

The UE 10 may transmit at least an Activate default EPS bearer context accept message identity (Activate default EPS bearer context accept message ID), a procedure transaction ID, a protocol discriminator, and an EPS bearer ID included in the Activate default EPS bearer context accept.

The UE 10 may transmit at least an Activate default EPS bearer context reject message identity (Activate default EPS bearer context reject message ID), a Procedure transaction ID, a protocol discriminator, an EPS bearer ID, and an ESM Cause included in the Activate default EPS bearer context reject.

Furthermore, the UE 10 may include the PCO in the Activate default EPS bearer context accept and/or the Activate default EPS bearer context reject.

Furthermore, in a case that multiple INFOM operation modes are included in the seventh identification information, the UE 10 may include at least the fifth identification information in the Activate default EPS bearer context accept and/or the Activate default EPS bearer context reject. In other words, when multiple INFOM operation modes are allowed, the UE 10 may select one of the allowed modes and transmit the fifth identification information including the selected mode.

Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, in a case that the UE-Initiated mode and the Network-Initiated mode are included in the seventh identification information included in the Activate default EPS bearer context request, the UE 10 may include the UE-Initiated mode or the Network-Initiated mode in the fifth identification information.

Which of the UE-Initiated mode and the Network-Initiated mode is to be included in the fifth identification information may be determined based on the UE policy. Note that the UE policy may be any information configured for the UE 10. For example, the UE policy may be information configured by a user.

Here, the Activate default EPS bearer context accept message ID may be a message type representing the Activate default EPS bearer context accept message.

The Activate default EPS bearer context reject message ID may be a message type representing the Activate default EPS bearer context reject message.

The ESM Cause may be information representing a reason of rejecting the Activate default EPS bearer context request.

Thus, the UE 10 changes its state to the third initial state (S2310).

That is, the UE 10 can establish an additional transfer path through the LTE access network A, based on the transition to the first initial state and based on the Operation mode of the first PDN connection.

Specifically, the UE 10 can perform the Attach procedure and the PDN connectivity procedure on the LTE access network A to establish the additional transfer path via the eNB 45, based on the transition to the first initial state and based on the fact that the first PDN connection is in the Network-initiated mode. Note that the transfer path may be a bearer and/or a communication path.

More specifically, the UE 10 performs the Attach procedure, establishes the second PDN connection between the PGW_B selected using the APN 2 and the UE 10, and then performs the PDN connectivity procedure, so that a transfer path through the LTE access network can be added to the first PDN connection between the PGW_A selected using the APN 1 and the UE 10. Note that the transfer path may be a bearer and/or a communication path. That is, in the state in which a default bearer through the WLAN is established, a default bearer through the LTE access network for the first PDN connection can be further established.

Alternatively, the UE 10 can perform the Attach procedure and the PDN connectivity procedure on the LTE access network A to establish the additional transfer path via the eNB 45, based on transition to the first initial state and based on the Routing Rule of the first PDN connection established in the UE-initiated mode. Note that the transfer path may be a bearer and/or a communication path.

Specifically, the UE 10 performs the Attach procedure, establishes the second PDN connection between the PGW_B selected using the APN 2 and the UE 10, and then performs the PDN connectivity procedure, so that a transfer path through the LTE access network can be added to the first PDN connectivity between the PGW_A selected using the APN 1 and the UE 10. Note that the transfer path may be a bearer and/or a communication path.

Furthermore, the UE 10 can establish an additional transfer path through the LTE access network A, based on the transition to the second initial state and based on the Operation mode of the first PDN connection.

Specifically, the UE 10 can perform the PDN connectivity procedure on the LTE access network A to establish the additional transfer path via the eNB 45, based on the transition to the second initial state and based on the fact that the first PDN connection is in the Network-initiated mode. Note that the transfer path may be a bearer and/or a communication path.

More specifically, the UE 10 performs the PDN connectivity procedure, so that a transfer path through the LTE access network can be added to the first PDN connectivity between the PGW_A selected using the APN 1 and the UE 10. Note that the transfer path may be a bearer and/or a communication path.

Alternatively, the UE 10 can perform the PDN connectivity procedure on the LTE access network A to establish the additional transfer path via the eNB 45, based on transition to the second initial state and based on the Routing Rule of the first PDN connection established in the UE-initiated mode. Note that the transfer path may be a bearer and/or a communication path.

Specifically, the UE 10 performs the PDN connectivity procedure, so that a transfer path through the LTE access network can be added to the first PDN connectivity between the PGW_A selected using the APN 1 and the UE 10. Note that the transfer path may be a bearer and/or a communication path.

In this way, with respect to the first PDN connection, the UE 10 and the PGW 30 establish a new default bearer. The UE 10 and the PGW 30 store the identification information of the default bearer established in the PDN connectivity procedure and the information identifying the LTE access network in association with each other, in response to completion of the PDN connectivity procedure through the LTE access network. Furthermore, the information identifying the LTE access network may be information indicating a 3GPP access or information indicating an E-UTRAN access.

Note that the UE 10 performs data transmission and reception using the default bearer when the UE 10 does not receive the TFT or transmits and receives the user data not matching the held TFT. When multiple default bearers are established, the UE 10 is capable of selecting a default bearer for transmitting and/or receiving data based on the default access, and is capable of transmitting and/or receiving data by using the selected default bearer.

Here, the default access may be default access indicated by the ninth identification information. In a case where the UE 10 does not receive the ninth identification information at the time of establishing the second default bearer for the first PDN connection, the UE 10 may select the default access based on the ninth identification information received at the time of establishing the first default bearer for the first PDN connection, and transmit and/or receive data using the selected default bearer.

Furthermore, the PGW 30 performs data transmission and/or reception using the default bearer when the PGW 30 does not receive the TFT or transmits and/or receives the user data not matching the held TFT. When the PGW 30 establishes multiple default bearers with the UE 10, the PGW 30 is capable of selecting a default bearer for transmitting and/or receiving data based on the default access, and is capable of transmitting and/or receiving data by using the selected default bearer. Here, the default access may be default access indicated by the ninth identification information.

Here, the default access may be default access indicated by the ninth identification information. In a case where the PGW 30 does not transmit the ninth identification information at the time of establishing the second default bearer for the first PDN connection, the PGW 30 may select the default access based on the ninth identification information transmitted at the time of establishing the first default bearer for the first PDN connection, and transmit and/or receive data using the selected default bearer.

In this way, in a case where the UE 10 and the PGE 30 are capable of acquiring the default access in the state where the second default bearer is not established, the PDN connectivity establishment procedure for establishing the second unnecessary default bearer is eliminated. For example, in a case that the communication path through the LTE access network is established by the additional PDN connection procedure, there may be a case in which no user data that selects the communication path through the LTE access network exists, and the communication path is not used, depending on the Routing Rule based on the TFT or the like. Learning a default access beforehand eliminates the establishment of such an unnecessary communication path between the UE 10 and the PGW 30, and therefore reduces transmission and/or reception of control messages for unnecessary communication path establishment, consumption of the resources for the communication path, and the like.

In this way, if the UE 10 and the PGE 30 can acquire the default access in the state where the second default bearer is not established, the UE 10 can determine whether performing the PDN connection establishment procedure for establishing a new default bearer for the multi-access PDN connection based on the information on the default access, when the UE 10 is newly located in a serving area of an LTE access network.

For example, in a case that the default access indicates a WLAN network, the multi-access access PDN connection is in the UE-Initiated mode, and the Routing Rule does not include user data to which priority is given to communicate by the communication path through the LTE, it is not necessary to immediately perform the additional transfer path establishment procedure for establishing the default bearer through the LTE.

3. Third Embodiment

A third embodiment of the present invention will be described. The PDN connection such as a multi-access PDN connection established by the UE 10 through the TWAG 74 is established through the ePDG 65, in the first embodiment.

Note that configurations of the mobile communication system in the present embodiment and the respective devices, such as the UE 10, the PGW 30, and the MME 40 included in the mobile communication system may be similar to those in the first embodiment, and the descriptions are omitted.

Note that the configuration of the ePDG 65 may be similar to the TWAG 74, which has been described in the first embodiment with reference to FIG. 3. A difference between the ePDG 65 and the TWAG 74 is that the ePDG 65, the WLAN ANb 75 connects with the core network 90 while the TWAG 74 connects the WLAN ANa 70 with the core network 90.

Note that the processes of the ePDG 65 in the present embodiment may be similar to the processes of the TWAG 74, which has been described in the first embodiment. The processes of the respective devices such as the UE 10, the PGW 30, the MME 40, and the PCRF 60 may be similar to the processes of the respective devices described in the first embodiment.

The processes performed for the TWAG 74 among the processes of the UE 10 and the PGW 30 is performed for the ePDG 65.

Furthermore, the PDN connectivity request message described in the first embodiment may be a control message in an IKEv2 tunnel establishment procedure and an IKEv2 authentication request message transmitted from the UE 10 to the ePDG 65.

Therefore, the various information items included in the IKEv2 authentication message in the present embodiment may be similar to the various information items included in the PDN connectivity request message described in the first embodiment. Furthermore, processes of the UE 10 and the ePDG 65 regarding transmission and/or reception of the IKEv2 authentication message may be similar to processes of the UE 10 and the TWAG 74 regarding transmission and/or reception of the PDN connectivity request message described in the first embodiment.

The PDN connectivity accept message described in the first embodiment may be a control message in the IKEv2 tunnel establishment procedure, and a permission message in response to the IKEv2 authentication request message transmitted from the ePDG 65 to the UE 10.

Therefore, the various information items included in the permission message in the present embodiment may be similar to the various information items included in the PDN connectivity accept message described in the first embodiment. Furthermore, processes of the UE 10 and the ePDG 65 regarding transmission and/or reception of the permission message may be similar to processes of the UE 10 and the TWAG 74 regarding transmission and/or reception of the PDN connectivity accept message described in the first embodiment.

The PDN connectivity reject message described in the first embodiment may be a control message in the IKEv2 tunnel establishment procedure, and a reject message in response to the IKEv2 authentication request message transmitted from the ePDG 65 to the UE 10.

Therefore, the various information items included in the permission message in the present embodiment may be similar to the various information items included in the PDN connectivity reject message described in the first embodiment. Furthermore, processes of the UE 10 and the ePDG 65 regarding transmission and/or reception of the reject message may be similar to processes of the UE 10 and the TWAG 74 regarding transmission and reception of the PDN connectivity reject message described in the first embodiment.

Thus, the UE 10 performs communication control regarding the multi-access PDN connection via the ePDG 65.

4. Fourth Embodiment

A fourth embodiment of the present invention will be described. The PDN connection such as a multi-access PDN connection established by the UE 10 through the TWAG 74 is established through the ePDG 65, in the second embodiment.

Note that configurations of the mobile communication system in the present embodiment and the respective devices such as the UE 10, the PGW 30, and the MME 40 included in the mobile communication system may be similar to those in the second embodiment, and the descriptions are omitted.

Note that the configuration of the ePDG 65 may be similar to the TWAG 74, which has been described in the second embodiment with reference to FIG. 3. A difference between the ePDG 65 and the TWAG 74 is that the ePDG 65, the WLAN ANb 75 connects with the core network 90 while the TWAG 74 connects the WLAN ANa 70 with the core network 90.

Note that the processes of the ePDG 65 in the present embodiment may be similar to the processes of the TWAG 74, which has been described in the second embodiment. The processes of the respective devices such as the UE 10, the PGW 30, the MME 40, and the PCRF 60 may be similar to the processes of respective devices described in the second embodiment. The processes performed for the TWAG 74 among the processes of the UE 10 and the PGW 30 is performed for the ePDG 65.

Furthermore, the PDN connectivity request message described in the second embodiment may be a control message in an IKEv2 tunnel establishment procedure and an IKEv2 authentication request message transmitted from the UE 10 to the ePDG 65.

Therefore, the various information items included in the IKEv2 authentication message in the present embodiment may be similar to the various information items included in the PDN connectivity request message described in the second embodiment. Furthermore, processes of the UE 10 and the ePDG 65 regarding transmission and/or reception of the IKEv2 authentication message may be similar to processes of the UE 10 and the TWAG 74 regarding transmission and/or reception of the PDN connectivity request message described in the second embodiment.

The PDN connectivity accept message described in the second embodiment may be a control message in the IKEv2 tunnel establishment procedure, and a permission message in response to the IKEv2 authentication request message transmitted from the ePDG 65 to the UE 10.

Therefore, the various information items included in the permission message in the present embodiment may be similar to the various information items included in the PDN connectivity accept message described in the second embodiment. Furthermore, processes of the UE 10 and the ePDG 65 regarding transmission and/or reception of the permission message may be similar to processes of the UE 10 and the TWAG 74 regarding transmission and/or reception of the PDN connectivity accept message described in the second embodiment.

The PDN connectivity reject message described in the second embodiment may be a control message in the IKEv2 tunnel establishment procedure, and a reject message in response to the IKEv2 authentication request message transmitted from the ePDG 65 to the UE 10.

Therefore, the various information items included in the permission message in the present embodiment may be similar to the various information items included in the PDN connectivity reject message described in the second embodiment. Furthermore, processes of the UE 10 and the ePDG 65 regarding transmission and/or reception of the reject message may be similar to processes of the UE 10 and the TWAG 74 regarding transmission and/or reception of the PDN connectivity reject message described in the second embodiment.

Thus, the UE 10 can perform communication control regarding the multi-access PDN connection via the ePDG 65.

5. Modification

Additionally, the programs run on the devices in the embodiments are each configured to control a CPU (program causing a computer to function) so as to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a digital versatile disc (DVD), a magneto optical disc (MO), a mini disc (MD), a compact disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

For delivering these programs to the market, the programs can be stored in a portable recording medium, or can be transferred to a server computer connected via a network such as the Internet. In this case, a storage device in a server computer is also included in the present invention.

Additionally, each device in the above-described embodiment may be partially or completely realized as large scale integration (LSI) circuit, which is a typical integrated circuit. The functional blocks of each device may be individually realized as chips, or may be partially or completely integrated into a chip. Furthermore, a circuit integration technique is not limited to the LSI, and may be realized with a dedicated circuit or a general-purpose processor. Furthermore, in a case where advances in semiconductor technology produce circuit integration technology capable of replacing the LSI, it is needless to say that such integrated circuits based on the technology are applicable.

Additionally, although, for the above-described embodiments, the LTE and the WLAN (IEEE 802.11a/b/n, for example) have been descried as examples of the radio access network, the connections may be made with WiMAX instead of the WLAN.

REFERENCE SIGNS LIST

9 Communication system
10 UE
30 PGW
35 SGW
40 MME
45 eNB
50 HSS
55 AAA
60 PCRF
65 ePDG
70 WLAN ANa
74 TWAG
75 WLAN ANb
80 LTE AN
90 Core network
100 PDN

The invention claimed is:

1. A User Equipment (UE) for establishing a Packet Data Network (PDN) connection over a WLAN, the UE comprising:
    LTE interface circuitry configured to:
    transmit a PDN connectivity request message to a Mobility Management Entity (MME), in a case where an Evolved Universal Terrestrial Radio Access Network (E-UTRAN) is added to the PDN connection being established over the WLAN, and
    receive an Activate default EPS bearer context request message from the MME; and
    a controller,
    wherein in a case that a Network-based IP flow mobility (NBIFOM) mode of the PDN connection is a UE-initiated NBIFOM mode, the PDN connectivity request message includes first information indicating a default access selected by the UE,
    the Activate default EPS bearer context request message includes second information indicating a default access determined by a Policy and Charging Rule Function (PCRF), and
    the controller is configured to:
    detect the default access indicated by the second information based on reception of the Activate default EPS bearer context request message; and
    route a packet not matching any routing filter to the default access indicated by the second information.

2. The UE according to claim 1, wherein the first information and the second information indicate a 3GPP access or a non-3GPP access, respectively.

3. The UE according to claim 2, wherein the second information is information determined by the PCRF verifying the first information.

4. The UE according to claim 1, wherein the second information is information determined by the PCRF verifying the first information.

5. The UE according to claim 1, the UE further comprising WLAN interface circuitry configured to: in order to setup the PDN connection, transmit a second PDN connectivity request message to a Trusted WLAN Access Gateway (TWAG); and receive a PDN connectivity accept message from the TWAG, wherein the second PDN connectivity request message includes third information indicating a requested NBIFOM mode, the PDN connectivity accept message includes fourth information indicating a NBIFOM mode selected by the PCRF or a PDN Gateway (PGW), and the controller considers a NBIFOM mode indicated by the fourth information as a NBIFOM mode of the PDN connection based on reception of the PDN connectivity accept message.

6. A communication method performed by a User Equipment (UE) for establishing a Packet Data Network (PDN) connection over a WLAN, the communication method comprising:
   transmitting a PDN connectivity request message to a Mobility Management Entity (MME), in a case where an Evolved Universal Terrestrial Radio Access Network (E-UTRAN) is added to the PDN connection being established over the WLAN, and
   receiving an Activate default EPS bearer context request message from the MME, wherein
   in a case that a Network-based IP flow mobility (NBIFOM) mode of the PDN connection is a UE-initiated NBIFOM mode, the PDN connectivity request message includes first information indicating a default access selected by the UE,
   the Activate default EPS bearer context request message includes second information indicating a default access determined by a Policy and Charging Rule Function (PCRF), and
   the communication method further comprising:
   detecting the default access indicated by the second information based on reception of the Activate default EPS bearer context request message; and
   routing a packet not matching any routing filter to the default access indicated by the second information.

7. The communication method according to claim 6, wherein the first information and the second information indicate a 3GPP access or a non-3GPP access, respectively.

8. The communication method according to claim 6, wherein the second information is information determined by the PCRF verifying the first information.

9. The communication method according to claim 6, the communication method further comprising: in order to setup the PDN connection, transmitting a second PDN connectivity request message to a Trusted WLAN Access Gateway (TWAG); and receiving a PDN connectivity accept message from the TWAG, wherein the second PDN connectivity request message includes third information indicating a requested NBIFOM mode, the PDN connectivity accept message includes fourth information indicating a NBIFOM mode selected by the PCRF or a PDN Gateway (PGW), and the UE considers a NBIFOM mode indicated by the fourth information as a NBIFOM mode of the PDN connection based on reception of the PDN connectivity accept message.

* * * * *